United States Patent
Cohen et al.

(10) Patent No.: US 11,132,064 B2
(45) Date of Patent: Sep. 28, 2021

(54) USER-DEFINED VIRTUAL INTERACTION SPACE AND MANIPULATION OF VIRTUAL CONFIGURATION

(71) Applicant: Ultrahaptics IP Two Limited, Bristol (GB)

(72) Inventors: Isaac Cohen, Oakland, CA (US); Maxwell Sills, San Francisco, CA (US)

(73) Assignee: Ultrahaptics IP Two Limited, Bristol (GB)

( * ) Notice: Subject to any disclaimer, the term of this patent is extended or adjusted under 35 U.S.C. 154(b) by 17 days.

(21) Appl. No.: 16/189,046

(22) Filed: Nov. 13, 2018

(65) Prior Publication Data
US 2019/0079594 A1 Mar. 14, 2019

Related U.S. Application Data

(63) Continuation of application No. 14/572,704, filed on Dec. 16, 2014, now Pat. No. 10,126,822.
(Continued)

(51) Int. Cl.
*G06F 3/01* (2006.01)
*G06F 3/03* (2006.01)
(Continued)

(52) U.S. Cl.
CPC .............. *G06F 3/017* (2013.01); *G06F 3/011* (2013.01); *G06F 3/0304* (2013.01);
(Continued)

(58) Field of Classification Search
CPC .... G06F 3/017; G06F 3/04845; G06F 3/0304; G06F 3/011; G06F 3/04842;
(Continued)

(56) References Cited

U.S. PATENT DOCUMENTS 5,454,043 A 9/1995 Freeman
5,594,469 A 1/1997 Freeman et al.
(Continued)

OTHER PUBLICATIONS

Pavlovic, V.I., et al., "Visual Interpretation of Hand Gestures for Human-Computer Interaction: A Review," IEEE Transactions on Pattern Analysis and Machine Intelligence, vol. 19, No. 7, Jul. 1997, pp. 677-695.

(Continued)

*Primary Examiner* — Jennifer N To
*Assistant Examiner* — Ashley M Fortino
(74) *Attorney, Agent, or Firm* — Haynes Beffel & Wolfeld LLP; Ernest J. Beffel, Jr.; Paul A. Durdik

(57) ABSTRACT

The technology disclosed relates to creating user-defined interaction spaces and modalities in a three dimensional (3D) sensor space in response to control gestures. It also relates to controlling virtual cameras in the 3D sensor space using control gestures and manipulating controls of the virtual cameras through the control gestures. In particular, it relates to defining one or more spatial attributes of the interaction spaces and modalities in response to one or more gesture parameters of the control gesture. It also particularly relates to defining one or more visual parameters of a virtual camera in response to one or more gesture parameters of the control gesture.

20 Claims, 34 Drawing Sheets

Path Creation                    Camera Control

1.  The user creates a starting point for the path, either using circle, voice command or similar selection gesture 2.  The user then follows a path that they wish to define, simply by moving their hand through 3D space 3.  The user ends the path with the same activate gesture they started with 4.  The camera can then move freely along the 2D object in moving 3D space

Related U.S. Application Data

(60) Provisional application No. 61/916,790, filed on Dec. 16, 2013.

(51) Int. Cl.
*G06F 3/0484* (2013.01)
*G06F 3/0481* (2013.01)
*G06T 15/20* (2011.01)

(52) U.S. Cl.
CPC ...... *G06F 3/04815* (2013.01); *G06F 3/04842* (2013.01); *G06F 3/04845* (2013.01); *G06T 15/20* (2013.01); *H05K 999/99* (2013.01); *G06F 2203/04806* (2013.01)

(58) Field of Classification Search
CPC ...... G06F 3/04815; G06F 2203/04806; H05K 999/99; G06T 15/20
See application file for complete search history.

(56) References Cited

U.S. PATENT DOCUMENTS

| | | | |
|---|---|---|---|
| 6,002,808 A | 12/1999 | Freeman | |
| 6,191,773 B1 | 2/2001 | Maruno et al. | |
| 6,788,809 B1 | 9/2004 | Grzeszczuk et al. | |
| 7,095,401 B2 | 8/2006 | Liu et al. | |
| 7,598,942 B2 | 10/2009 | Underkoffler et al. | |
| 8,150,102 B2 | 4/2012 | Zheng et al. | |
| 8,373,654 B2 | 2/2013 | Wang et al. | |
| 8,487,871 B2 | 7/2013 | Langridge et al. | |
| 8,933,876 B2 | 1/2015 | Galor et al. | |
| 9,600,078 B2 | 3/2017 | Rafii | |
| 10,275,039 B2 | 4/2019 | Cohen et al. | |
| 2002/0041327 A1 | 4/2002 | Hildreth et al. | |
| 2004/0046736 A1 | 3/2004 | Pryor et al. | |
| 2005/0071864 A1 | 3/2005 | Denoue et al. | |
| 2007/0216894 A1 | 9/2007 | Garcia et al. | |
| 2008/0056561 A1 | 3/2008 | Sawachi | |
| 2008/0244465 A1 | 10/2008 | Kongqiao et al. | |
| 2009/0040215 A1 | 2/2009 | Afzulpurkar et al. | |
| 2009/0217211 A1 | 8/2009 | Hildreth et al. | |
| 2009/0265671 A1 | 10/2009 | Sachs et al. | |
| 2010/0050134 A1 | 2/2010 | Clarkson | |
| 2010/0234094 A1 | 9/2010 | Gagner et al. | |
| 2010/0235786 A1 | 9/2010 | Maizels et al. | |
| 2010/0275159 A1 | 10/2010 | Matsubara et al. | |
| 2011/0066984 A1 | 3/2011 | Li | |
| 2011/0107270 A1 | 5/2011 | Wang et al. | |
| 2011/0173204 A1 | 7/2011 | Murillo et al. | |
| 2011/0234840 A1* | 9/2011 | Klefenz | G06K 9/00375 348/222.1 |
| 2011/0254765 A1 | 10/2011 | Brand | |
| 2011/0289456 A1* | 11/2011 | Reville | G06F 3/017 715/830 |
| 2012/0038549 A1 | 2/2012 | Mandella et al. | |
| 2012/0069168 A1 | 3/2012 | Huang et al. | |
| 2012/0079420 A1* | 3/2012 | Arriola | G06F 3/04883 715/784 |
| 2012/0086729 A1 | 4/2012 | Baseley et al. | |
| 2012/0121185 A1 | 5/2012 | Zavesky | |
| 2012/0179970 A1 | 7/2012 | Hayes | |
| 2012/0194517 A1 | 8/2012 | Izadi et al. | |
| 2012/0204133 A1 | 8/2012 | Guendelman et al. | |
| 2012/0206339 A1 | 8/2012 | Dahl | |
| 2012/0257035 A1 | 10/2012 | Larsen | |
| 2012/0268410 A1 | 10/2012 | King et al. | |
| 2012/0313848 A1 | 12/2012 | Galor et al. | |
| 2012/0322527 A1* | 12/2012 | Aoki | G07F 17/3209 463/16 |
| 2012/0324332 A1* | 12/2012 | Zaragoza | G06F 40/103 715/234 |
| 2013/0007616 A1 | 1/2013 | Bell et al. | |
| 2013/0033483 A1 | 2/2013 | Im et al. | |
| 2013/0182902 A1 | 7/2013 | Holz | |
| 2013/0278499 A1 | 10/2013 | Anderson | |
| 2013/0293454 A1 | 11/2013 | Jeon et al. | |
| 2013/0293683 A1 | 11/2013 | Zhou et al. | |
| 2013/0321401 A1* | 12/2013 | Piemonte | G06K 9/46 345/419 |
| 2014/0089849 A1 | 3/2014 | Choi et al. | |
| 2014/0137039 A1 | 5/2014 | Kroeger et al. | |
| 2014/0201666 A1 | 7/2014 | Bedikian et al. | |
| 2015/0103004 A1 | 4/2015 | Cohen et al. | |
| 2015/0135132 A1 | 5/2015 | Josephson | |
| 2015/0169076 A1 | 6/2015 | Cohen et al. | |
| 2015/0169175 A1 | 6/2015 | Cohen et al. | |
| 2015/0169176 A1 | 6/2015 | Cohen et al. | |
| 2015/0220776 A1 | 8/2015 | Cronholm | |
| 2015/0338998 A1 | 11/2015 | Chathoth et al. | |
| 2015/0346820 A1 | 12/2015 | Poupyrev et al. | |
| 2015/0355827 A1 | 12/2015 | Van Der Westhuizen et al. | |

OTHER PUBLICATIONS

U.S. Appl. No. 14/572,690—Office Action dated Jul. 14, 2016, 7 pages.

U.S. Appl. No. 14/572,668—Notice of Allowance dated Apr. 17, 2017, 25 pages.

U.S. Appl. No. 14/572,690—Response to Office Action dated Jul. 14, 2016 filed Dec. 7, 2016, 14 pages.

U.S. Appl. No. 14/572,690—Final Office Action dated Apr. 18, 2017, 13 pages.

U.S. Appl. No. 14/572,704—Office Action dated Sep. 12, 2017, 20 pages.

U.S. Appl. No. 14/516,493—Office Action dated May 9, 2016, 21 pages.

U.S. Appl. No. 14/516,493—Response to May 9 Office Action filed Aug 9, 2016, 18 pages.

U.S. Appl. No. 14/516,493—Office Action dated Nov. 17, 2016, 30 pages.

Wu, Y., et al., "Vision-Based Gesture Recognition: A Review," Beckman Institute, Copyright 1999, pp. 103-115.

U.S. Appl. No. 14/516,493—Response to Office Action dated Nov. 17, 2016 filed on Mar. 16, 2017, 20 pages.

U.S. Appl. No. 14/516,493—Office Action dated May 18, 2017, 38 pages.

U.S. Appl. No. 14/572,690—Response to Final Office Action dated Apr. 18, 2017, filed Aug. 18, 2017, 14 pages.

U.S. Appl. No. 14/572,690—Notice of Allowance dated Sep. 28, 2017, 17 pages.

U.S. Appl. No. 14/572,690—Advisory Action dated Sep. 13, 2017, 4 pages.

U.S. Appl. No. 14/572,690—Proposed Examiner's Amendment filed Sep. 13, 2017, 7 pages.

U.S. Appl. No. 14/516,493—Response to Office Action dated May 18, 2017, filed Sep. 29, 2017, 20 pages.

U.S. Appl. No. 14/516,493—Supplemental Response to Office Action dated May 18, 2017, filed Oct. 11, 2017, 20 pages.

U.S. Appl. No. 15/861,578—Office Action dated Jul. 5, 2018, 21 pages.

U.S. Appl. No. 14/572,704—Response to Office Action dated Sep. 12, 2017, filed Mar. 12, 2018, 19 pages.

Bowman, Doug A., et al., "3D User Interfaces: New Directions and Perspectives", Nov./Dec. 2008, IEEE Computer Society 17pages.

U.S. Appl. No. 14/572,704—Notice of Allowance dated Jul. 10, 2018, 26 pages.

U.S. Appl. No. 15/681,149—Office Action dated Jul. 11, 2018, 16 pages.

U.S. Appl. No. 15/861,578—Response to Office Action dated Jul. 5, 2018, filed Nov. 5, 2018, 9 pages.

U.S. Appl. No. 15/861,578—Notice of Allowance dated Dec. 20, 2018, 15 pages.

U.S. Appl. No. 15/681,149—Notice of Allowance dated Dec. 14, 16 pages.

U.S. Appl. No. 16/404,641—Office Action dated Jul. 11, 2019, 16 pages.

(56) References Cited

OTHER PUBLICATIONS

U.S. Appl. No. 14/516,493—Final Office Action dated Jan. 24, 2018, filed 38 pages.
U.S. Appl. No. 16/213,952—Office Action dated Mar. 7, 2019, 14 pages.
U.S. Appl. No. 16/213,952—Notice of Allowance dated Jun. 20, 2019, 17 pages.
U.S. Appl. No. 14/516,493—Notice of Allowance dated Jul. 27, 2018, filed 7 pages.
U.S. Appl. No. 15/681,149—Notice of Allowance dated Dec. 14, 2018, 16 pages.
U.S. Appl. No. 16/404,641—Notice of Allowance dated Oct. 23, 2019, 8 pages.
U.S. Appl. No. 16/404,641—Response to Office Action dated Jul. 11, 2019, filed Oct. 9, 2019 7 pages.
U.S. Appl. No. 16/404,641—Office Action dated Jul. 11, 2019, 10 pages.
U.S. Appl. No. 16/570,914—Notice of Allowance dated Jan. 10, 2020, 24 pages.
U.S. Appl. No. 16/398,130—Office Action dated May 29, 2020, 12 pages.
U.S. Appl. No. 16/805,639—Office Action dated Sep. 4, 2020, 11 pages.
U.S. Appl. No. 16/398,130—Notice of Allowance dated Sep. 21, 2020, 24 pages.
U.S. Appl. No. 16/805,639—Notice of Allowance dated Dec. 11, 2020, 21 pages.

\* cited by examiner

Possible iterations on gravitational attractors.

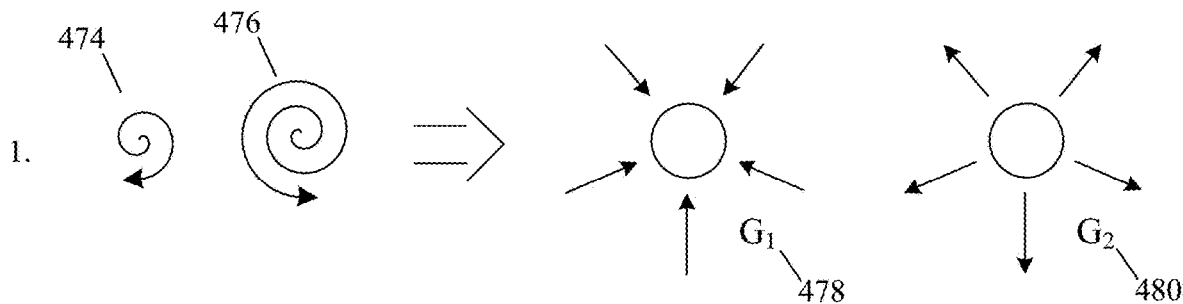

Depending on the direction of the creation gesture, the sign of the force from the gravitational attractor may be reversed.

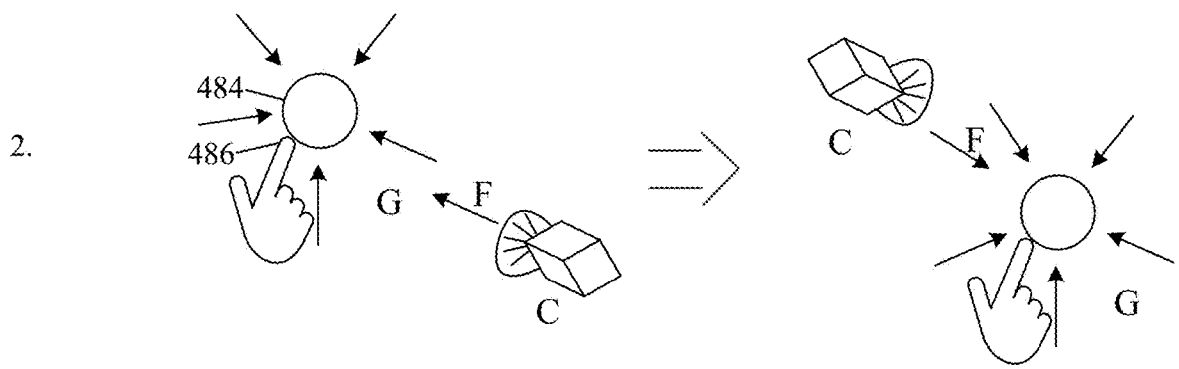

Another possible iteration is to always place the gravitational attractor at the tip of the active finger. This means as the camera is moved, the user may also move their finger to alter the force on the camera.

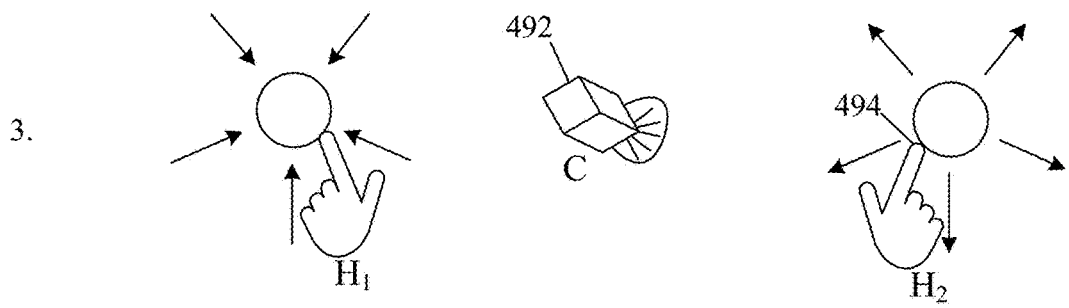

FIG. 4B

Spring Interaction whose static length a Spring Constant is user defined

1. User Circles object of intrest object of interest

2.  This circle is used to define radius of a sphere which is centered around center of user defined circle 3.  After sphere is defined, $\vec{a}$ vector from the cameras position to the center of the sphere 4.  Point I is determined by solving the integration point of vector $\vec{a}$ and the sphere equation

5.

The Camera is then moved to intersection point I

6.

depending on the size of the circle drawn, the radius of the sphere, and the fore point "I" will be further away or closer to the object, which allows for user to define how precise or rough they want their selection r1>r2

Problem:

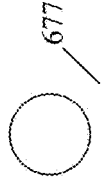

Camera at position ($\vec{P}$)

User would like to move Camera from position ($\vec{P}$) to Position ($\vec{O}$)

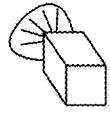

Object at Position ($\vec{O}$)

Solution:

1. User strokes field as if pushing water so that the object ($\vec{O}$) moves closer to ($\vec{P}$). In this iteration of the ideas it is actually point ($\vec{P}$) that is moving, but physically the two are interchangeable

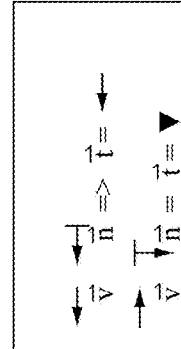

FIG. 1

Palm normal matches Palm Velocity 2. to reset the position of the hand, the user simply slides their hand back through the field, making sure the palm normal does not match the direction of the palm velocity

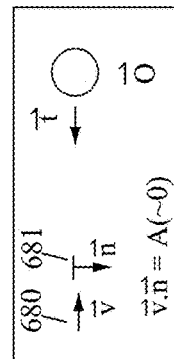

FIG. 2

Palm normal approximately perpendicular to palm velocity 3. in this way, the user can easily "Stroke" their way through the field moving ($\vec{P}$) to ($\vec{O}$) or converesely ($\vec{O}$) to ($\vec{P}$) without ever moving their hand from the field

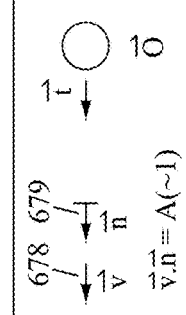

FIG. 3

Combing two movement types to provide an overall consistant trajectory

FIG. 6D

Sling Shot Camera movement

1. 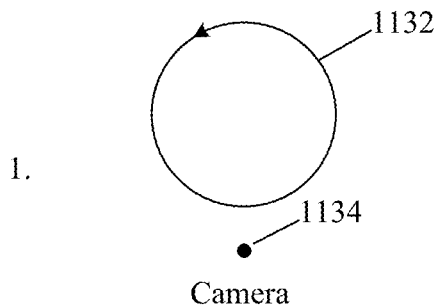

User defines circle somewhere in front of camera

2. 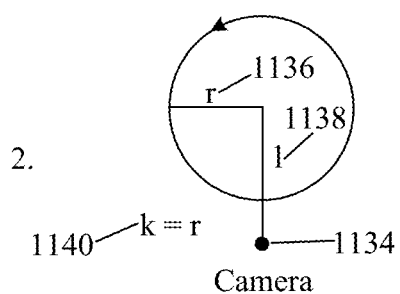

In one embodiment the radius of the circle will define the spring constant and static length of a spring equation 3. 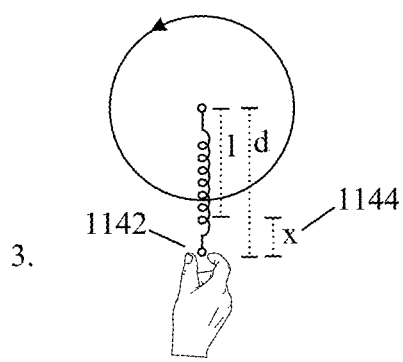

The user pulls the camera backwards, using the distance from the center of the spring as length d, the original distance from the center of the circle as length l, and the radius as spring constant k $F = 1/2\, k\, x^2$
where $k = r$
$x = d - l$

FIG. 11C

Sling Shot Camera movement

4.
$$F = 1/2\, r(d - l)^2$$
$$F = 1/2\, r(d^2 - 2dl + l^2)$$

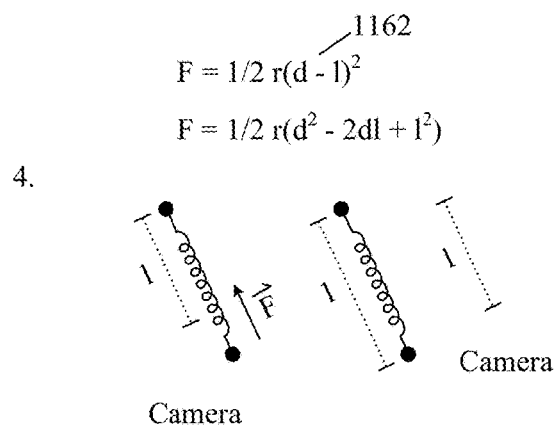

Camera

Solving Hooke's law results in a force equation that will be applied to the camera as it is released. As the camera pass its original position of when the circle was originally drawn, the spring is removed from the force equation, allowing the camera to move as it would if no other forces were applied 5.
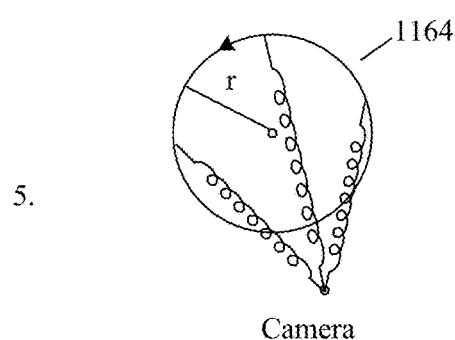

Camera another embodiment is connecting springs in the same fashion, but having the spring constant k remain fixed, and connect a number of identical springs, the number of which is propotional to the radius.

FIG. 11D

Check point Camera Controls

1. User defines an array of "check points" defined by circle gesture

2. User can then move from discreet "checkpoint" to discreet "checkpoint"

3. Checkpoints can be modified, moved, created or destroyed at any point in time Checkpoint Camera Controls 1. 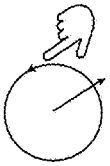 user creates a circle which has both a center point and a direction 2. 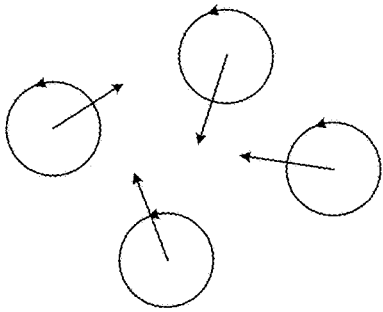 In a similar manner the user creates a series of circles, each with a center and a direction 3. 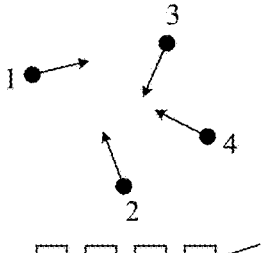 Each vector that has been defined is assigned a point in an array 4. 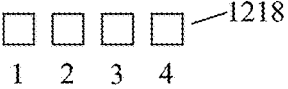 when one of the points in the array is selected (via mouse, keyboard or circling of box, the camera is moved to the point in space and pointed in the direction of the vector

FIG. 12B

Checkpoint Camera Controls

5. The active camera can easily and discretely be moved from point to point, by selection a new point in the array 6. New points can be dynamically created by circling a new point in space 7. Likewise, points can be dynamically removed by circling in the opposite direction around a preexisting checkpoint

| Path | Creation | Camera Control |
|---|---|---|
| 1. | 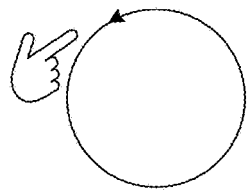 | The user creates a starting point for the path, either using circle, voice command or similar selection gesture |
| 2. | 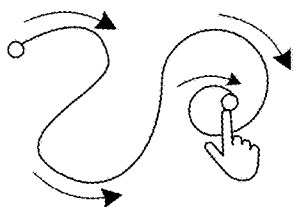 | The user then follows a path that they wish to define, simply by moving their hand through 3D space |
| 3. | 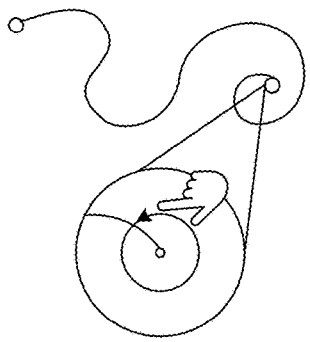 | The user ends the path with the same activate gesture they started with |
| 4. | 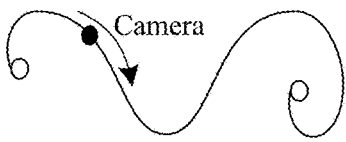 | The camera can then move freely along the 2D object in moving 3D space |

FIG. 15B

| Path | Creation | Camera Control |
|---|---|---|
| 5. | 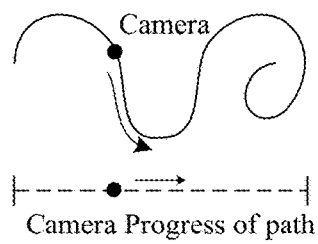<br>Camera Progress of path | In one embodiment the path is mapped to a straight line that the user can move easily along, instead of having to learn the intricacies of the path they created, and trying to exactly reproduce it. |
| 6. | 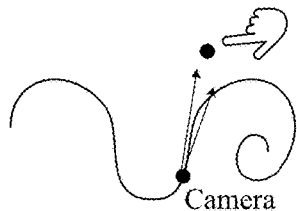 | In another embodiment the camera remains attach to the path, but a force is applied in the direction of the tip of the users index finger |
| 7. | Details to FIG.11<br>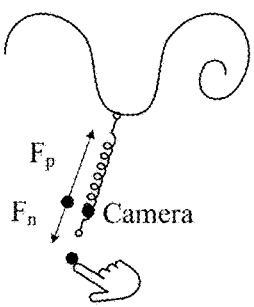 | In another embodiment, The camera is not rigidly attached to the path, but always has a restorative force acting on it ($F_p$) the user can create a force proportional to the distance to the hand ($F_n$) |
| 8. | 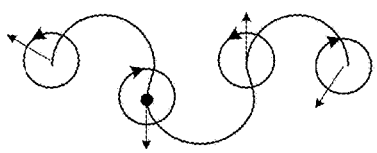 | In another embodiment, The path is defined by a series of user created circles which constructs a bezier curve based on a circle size and direction |

FIG. 15C

USER-DEFINED VIRTUAL INTERACTION SPACE AND MANIPULATION OF VIRTUAL CONFIGURATION

PRIORITY DATA

This application is a continuation of U.S. patent application Ser. No. 14/572,704, entitled "USER-DEFINED VIRTUAL INTERACTION SPACE AND MANIPULATION OF VIRTUAL CONFIGURATION", filed on Dec. 16, 2014, which claims the benefit of US Provisional Patent Application No. 61/916,790, entitled, "USER-DEFINED VIRTUAL INTERACTION SPACE AND MANIPULATION OF VIRTUAL CAMERAS IN THE INTERACTION SPACE," filed on Dec. 16, 2013. The non-provisional and provisional applications are hereby incorporated by reference for all purposes.

INCORPORATIONS

Materials incorporated by reference in this filing include the following:

"Contactless Cursor Control Using Free-Space Motion Detection," U.S. Prov. App. No. 61/825,480, filed May 20, 2013, "Predictive Information for Free Space Gesture Control and Communication," U.S. Prov. App. No. 61/871,790, filed Aug. 29, 2013, "Predictive Information for Free-space Gesture Control and Communication," U.S. Prov. App. No. 61/873,758, filed Sep. 4, 2013, "Predictive Information for Free Space Gesture Control and Communication," U.S. Non. Prov. application Ser. No. 14/474,077, filed Aug. 29, 2014, "Velocity Field Interaction for Free Space Gesture Interface and Control," U.S. Prov. App. No. 61/891,880, filed Oct. 16, 2013, "Velocity Field Interaction for Free Space Gesture Interface and Control," U.S. Non. Prov. application Ser. No. 14/516,493, filed Oct. 16, 2014, "Virtual Interactions for Machine Control," U.S. Prov. App. No. 61/897,186, filed Oct. 29, 2013, "Virtual Interactions For Machine Control," U.S. Non Prov. application Ser. No. 14/527,742, filed Oct. 29, 2014, "Interactions with Virtual Objects for Machine Control," U.S. Prov. App. No. 61/898,464, filed Oct. 31, 2013, "Interactions With Virtual Objects For Machine Control," U.S. Non Prov. application Ser. No. 14/530,364, filed Oct. 31, 2014, "Improving Predictive Information For Free Space Gesture Control And Communication," U.S. Prov. App. No. 61/898,462, filed Oct. 31, 2013, "Improving Predictive Information for Free Space Gesture Control and Communication," U.S. Non Prov. application Ser. No. 14/530,690, filed Oct. 31, 2014, "Interaction Strength Using Virtual Objects For Machine Control," U.S. Prov. App. No. 61/905,103, filed Nov. 15, 2013, "Interaction Strength Using Virtual Objects For Machine Control," U.S. Non Prov. application Ser. No. 14/541,078, filed Nov. 13, 2014, "Vehicle Motion Sensory Control," U.S. Prov. App. No. 62/005,981, filed May 30, 2014, "Free-Space User Interface And Control Using Virtual Constructs," U.S. Non. Prov. application Ser. No. 14/154,730, filed Jan. 14, 2014, "Free-Space User Interface and Control Using Virtual Constructs," U.S. Prov. App. No. 61/873,351, filed Sep. 3, 2013, "Free-Space User Interface and Control Using Virtual Constructs," U.S. Prov. App. No. 61/877,641, filed Sep. 13, 2013, "Systems and Methods for Machine Control," U.S. Non. Prov. application Ser. No. 14/280,018, filed May 16, 2014, "Dynamic, Free-Space User Interactions For Machine Control," U.S. Non. Prov. application Ser. No. 14/155,722, filed Jan. 15, 2014, "Interactive Training Recognition of Free Space Gestures for Interface and Control," U.S. Prov. App. No. 61/872,538, filed Aug. 30, 2013, "Methods and systems for identifying position and shape of objects in three-dimensional space," U.S. Prov. App. No. 61/587,554, filed Jan. 17, 2012, "Systems and methods for capturing motion in three-dimensional space," U.S. Prov. App. No. 61/724,091, filed Nov. 8, 2012, "Non-tactile interface systems and methods," U.S. Prov. App. No. 61/816,487, filed Apr. 26, 2013, "Dynamic user interactions for display control," U.S. Prov. App. No. 61/752,725, filed Jan. 15, 2013, "Motion capture using cross-sections of an object," U.S. application Ser. No. 13/414,485, filed Mar. 7, 2012, "System and methods for capturing motion in three-dimensional space," U.S. application Ser. No. 13/742,953, filed Jan. 16, 2013, "User-Defined Virtual Interaction Space and Manipulation of Virtual Cameras in the Interaction Space," U.S. application Ser. No. 14/572,668, filed Dec. 16, 2014.

"User-Defined Virtual Interaction Space and Manipulation of Virtual Cameras with Vectors," U.S. application Ser. No. 14/572,690, filed Dec. 16, 2014.

TECHNICAL FIELD

The technology described relates to machine user interfaces, and more specifically to the use of virtual objects as user input to machines.

DISCUSSION

Conventional machine interfaces are in common daily use. Every day, millions of users type their commands, click their computer mouse and hope for the best.

Unfortunately, however, these types of interfaces are very limited.

Therefore, what is needed is a remedy to this and other shortcomings of the traditional machine interface approaches.

SUMMARY

Aspects of the systems and methods described provide for improved control of machines or other computing resources based at least in part on determining whether positions and/or motions of an object (e.g., hand, tool, hand and tool combinations, other detectable objects or combinations thereof) might be interpreted as an interaction with one or more virtual objects, controls or content. Implementations can enable modeling of physical objects, created objects and interactions with various combinations thereof for machine control or other purposes.

In one implementation, a method is described for creating user-defined interface modalities in a three dimensional (3D)

sensor space. The method includes detecting a control gesture of a control object, calculating gesture parameters of the control gesture that was detected, and defining spatial attributes of an interaction modality in the 3D sensor space responsive to the gesture parameters of the control gesture. The gesture parameters include at least length and width of the control gesture. The gesture parameters also can include at least structure, scale, orientation, or density of the control object. The spatial attributes include at least height and width of an interaction space. The spatial attributes can also include at least numerosity of elements in the interaction modality.

Aspects of this implementation that are described below are not repeated for each different implementation, for the sake of brevity.

A context-setting control gesture can be detected, which identifies a context for interpreting a subsequent control gesture that defines spatial attributes of the interaction modality. The context-setting control gesture can be a voice, visual, or device command. Subsequent control gestures can apply to an entire interaction space. Subsequent control gestures can also apply to an element of the interaction space.

Context-aware elements of the interaction modality can be created that automatically interpret a context-setting control gesture and subsequent control gestures to define spatial attributes of the interaction modality. The control gesture can be a stroke of a user appendage. In another implementation, the control object is a detectable object and the control gesture defines a collection of continuous points that have at least one parameter in common within a threshold deviation. The threshold deviation can be determined by a variation in angle along velocity vectors that are continuous in time. The control gesture can also be a circular sweep that defines a collection of points within a radial distance to a fixed point.

In some implementations, a method is described for creating user-defined interface modalities in a 3D sensor space using a stroke of a control object that manipulate controls in a physical interaction space. The method includes detecting a vertical sweep of a control object responsive to a first control gesture in a 3D sensor space, defining a vertical extent of a virtual interaction space in proportion to length of vertical sweep of the control object, detecting a horizontal sweep of the control object responsive to a second control gesture in the 3D sensor space, defining a horizontal extent of the virtual interaction space in proportion to width of horizontal sweep of the control object, and manipulating controls in a physical interaction space by superimposing the virtual interaction space on the physical interaction space responsive to the vertical extent and horizontal extent.

A method can be described for creating user-defined interface modalities in a 3D sensor space using a stroke of a control object that manipulate controls in a synthetic interaction space. The method includes detecting a vertical sweep of a control object responsive to a first control gesture in a 3D sensor space, defining a vertical extent of a virtual interaction space in proportion to length of vertical sweep of the control object, detecting a horizontal sweep of the control object responsive to a second control gesture in the 3D sensor space, defining a horizontal extent of the virtual interaction space in proportion to width of horizontal sweep of the control object, and manipulating controls in a synthetic interaction space by linking the virtual interaction space to an image responsive to the vertical extent and horizontal extent A method also can be described for creating user-defined interface modalities in a 3D sensor space using a circular sweep of a control object that manipulate controls in a physical interaction space. The method includes circular sweep of a control object responsive to a control gesture in a 3D sensor space, calculating a radius of the circular sweep based on a found point that is equidistant to a plurality of points defined on contour of the control gesture, constructing a radial-based virtual interaction modality in the 3D sensor space that is in proportion to the radius of the circular sweep, and manipulating controls in a physical interaction space by superimposing the radial-based virtual interaction modality on the physical interaction space responsive to the circular sweep.

A method can further be described for creating user-defined interface modalities in a 3D sensor space using a circular sweep of a control object that manipulate controls in a synthetic interaction space. The method includes circular sweep of a control object responsive to a control gesture in a 3D sensor space, calculating a radius of the circular sweep based on a found point that is equidistant to a plurality of points defined on contour of the control gesture, constructing a radial-based virtual interaction modality in the 3D sensor space that is in proportion to the radius of the circular sweep, and manipulating controls in a synthetic interaction space by linking the radial-based virtual interaction modality to an image responsive to the vertical extent and horizontal extent.

In some implementations, a method is described for creating user-defined interface modalities in a 3D sensor space using lateral outward movement of control objects. The method includes identifying a pair of starting points in respective centers of two control objects that are detected in a 3D sensor space, wherein the pair of starting points are fixed distance apart, detecting an outward expanding movement of the control objects in the 3D sensor space, identifying a pair of resting points in respective centers of the two control objects when the control objects come to rest, defining a horizontal extent of a virtual interaction space in proportion to distance between the starting points and the resting points, defining a vertical extent of the virtual interaction space in proportion to width of the control objects, and presenting the interaction space responsive to the vertical extent and horizontal extent. In one implementation, the two control objects are two user appendages.

A method can be described for creating user-defined interface modalities in a 3D sensor space using lateral outward movement of control points of control objects. The method includes identifying a pair of starting points in respective centers of control points of one or more control objects that are detected in a 3D sensor space. In one implementation, the pair of starting points is a fixed distance apart. It also includes detecting an outward expanding movement of the control points in the 3D sensor space, identifying a pair of resting points in respective centers of the control points when the control points come to rest, defining a horizontal extent of a virtual interaction space in proportion to distance between the starting points and the resting points, defining a vertical extent of the virtual interaction space in proportion to width of the control objects, and presenting the interaction space responsive to the vertical extent and horizontal extent. In one implementation, the control objects are hands and control points are finger tips.

In one implementation, a method is described for interacting with a virtual vector field in a 3D sensor space. The method includes defining a vector field at least responsive to curling of fingers of a hand and degrees of freedom between fingers of the curled fingers. The vector field is centered with respect to a fixed point proximate to the hand and magnitude of the vector field is calculated at least in part by a scale of curling of the fingers and degrees of freedom between the fingers. It also includes constructing a virtual sphere along a plurality of points on contour of curled fingers in the 3D sensor space, extending radially, inward or outward, one or more interaction vectors on the virtual sphere, wherein magnitudes of the interaction vectors are determined by radius of the virtual sphere, and compounding interactions of the vector field with the interaction vector based on their respective magnitudes, wherein the interactions include at least one of adding, multiplying, or taking dot-product of at least one vector in the vector field and the interaction vector.

In some implementations, a method is described for creating a virtual spring in a 3D sensor space. The method includes detecting a lateral movement of a control object responsive to a lateral movement of a hand in a 3D sensor space, defining a static length of a virtual spring that is in proportion to length of the lateral movement, and defining a spring constant of the virtual spring at least responsive to curling of fingers of the hand and degrees of freedom between fingers of the hand. The spring constant is centered with respect to a fixed point proximate to the curled fingers and magnitude of the spring constant is calculated at least in part by a scale of curling of the fingers and degrees of freedom between the fingers. It further includes compounding interactions of the virtual spring with other virtual elements of the 3D sensor space.

A method can be described for controlling a virtual camera in a 3D sensor space. The method includes detecting a circular sweep around a virtual object responsive to a control gesture of a control object in a 3D sensor space, calculating a radius of the circular sweep responsive to a found point that is equidistant to a plurality of points defined on contour of the control gesture, determining a focal length of a virtual camera towards the virtual object responsive to the radius of the circular sweep by constructing a virtual sphere in the 3D sensor space that is in proportion to the radius of the circular sweep, defining a vector from the virtual camera to the center of the virtual sphere, and determining a point of intersection between the sphere and the vector. It also includes defining a field of view and orientation of the virtual camera responsive to orientation of the control object and interpolating the virtual camera through time to a new position that coincides with the point of intersection.

A method also can be described for spring-zooming a virtual camera in a 3D sensor space. The method includes detecting a circular sweep responsive to a first control gesture of a control object in a 3D sensor space and calculating a radius of the circular sweep responsive to a found point that is equidistant to a plurality of points defined on contour of the control gesture. The radius of the circular sweep defines a spring constant of a virtual camera launcher of a virtual camera and a first distance between center of the circular sweep and the virtual camera defines a static length of the spring movement. It also includes detecting a backward pull of the virtual camera launcher to a second distance in response to a second control gesture of the control object in the 3D space and accelerating the virtual camera through time responsive to releasing the virtual camera launcher by a third control gesture. The control object is a hand and orientation of the virtual camera is responsive to orientation of at least one finger of the hand.

A method can further be described for defining and controlling multiple virtual cameras in a 3D sensor space. The method includes detecting circular sweeps in response to control gestures of a control object in a 3D sensor space, wherein the circular sweeps have respective center points and direction vectors, constructing multiple virtual cameras in the 3D space with different fields of view that are proportional to respective direction vectors of the circular sweeps, assigning each of the virtual cameras a virtual camera checkpoint from an array of virtual camera selectors created in the 3D space by one or more control gestures, and selecting and controlling visual parameters of a particular virtual camera in response to selection of corresponding camera selector. The visual parameters include at least position, orientation, focal length, deviation relative to the virtual camera, or maximum aperture.

Some methods further include linking the virtual camera selectors to one or more real camera in a physical space and selecting and controlling visual parameters of a particular real camera in response to selection of corresponding camera selector.

In one implementation, a method is described for manipulating a virtual camera in a 3D sensor space. The method includes determining a focal length of a virtual camera in a 3D sensor space responsive to at least one of radius of a circular sweep of hands, distance between midpoints of the hands, scale of curling of fingers of the hands, and degree of freedom between fingers. It also includes defining a field of view and orientation of the virtual camera responsive to orientation of the hands, constructing a virtual sphere along a plurality of points on a non-intersecting contour of the hands, defining a view vector from the center of the virtual sphere to a point on virtual sphere's surface that is equidistant to a plurality of points on the hands, and manipulating the virtual camera by at least rotating, translating, compressing, or scaling the view vector responsive to subsequent control gestures of the hands.

In some implementations, a method is described for manipulating a virtual camera in a 3D sensor space. The method includes detecting a first control gesture of a control object that defines a starting point of a virtual camera in a 3D sensor space, detecting a second control gesture of the control object that defines a continuous contour through time in the 3D sensor space, detecting a third control gesture of the control object that defines a finishing point of the virtual camera in the 3D sensor space, and moving the virtual camera along the continuous contour between the starting point and the finishing point.

The method also can include determining a focal length of the virtual camera responsive to distance of a finger of the hand from the continuous contour. The method also includes defining a field of view and orientation of the virtual camera responsive to orientation of the finger.

The method can further include mapping the continuous contour to a straight line and moving the virtual camera along the straight line. The method further includes defining a plurality of points on the continuous contour to construct a Bezier curve responsive to respective sizes and directions of the points.

In yet another implementation, a method is described for manipulating virtual objects in a 3D sensor space. The method includes creating a virtual vector field in response to a control gesture that makes swirling motions in a 3D sensor space, creating a plurality of virtual objects in response to subsequent control gestures that make circular sweeps in the 3D sensor space and define object vectors on respective virtual objects, and compounding interactions of the vector field with the object vectors based on their respective magnitudes, wherein the interactions include at least one of adding, multiplying, or taking dot-product of at least one vector in the vector field and an object vectors. In one implementation, the virtual vector field is a vortex. In another implementation, the size of the vortex is directly proportional to scale of the swirling motions in the 3D space.

In some implementations, a method is described for performing augmented interactions with virtual objects in a 3D sensor space. The method includes creating a synthetic space by overlaying a virtual space on a physical space, defining vectors on portions of the synthetic, virtual, and physical space, and compounding augmented interactions of vectors in the physical space with vectors in the synthetic space, wherein the augmented interactions modify at least one of positional, material, or other property of virtual objects in synthetic space. In one implementation, the interactions include at least one of adding, multiplying, or taking dot-product of at least one vector in the physical space and at least one vector in the synthetic space.

Among other aspects, implementations can enable improved control of machines or other computing resources based at least in part upon determining whether positions and/or motions of an object (e.g., hand, tool, hand and tool combinations, other detectable objects or combinations thereof) might be interpreted as an interaction with one or more virtual objects. Implementations can enable modeling of physical objects, created objects and interactions with combinations thereof for interfacing with a variety of machines (e.g., a computing systems, including desktop, laptop, tablet computing devices, special purpose computing machinery, including graphics processors, embedded microcontrollers, gaming consoles, audio mixers, or the like; wired or wirelessly coupled networks of one or more of the foregoing, and/or combinations thereof).

BRIEF DESCRIPTION OF THE DRAWINGS

A more complete understanding of the subject matter can be derived by referring to the detailed description and claims when considered in conjunction with the following Figures, wherein like reference numbers refer to similar elements throughout the Figures.

FIG. 4B illustrates potential gravitational attractors in accordance with an implementation.

FIGS. 6A, 6B, 6C, 6D and 6E show one implementation of controlling a virtual camera in a three dimensional (3D) sensor space.

FIGS. 11A, 11B, 11C, and 11D illustrate one implementation of a spring zooming camera movement of a virtual camera in a three dimensional (3D) sensor space.

FIGS. 12A, 12B and 12C illustrate defining and controlling multiple virtual cameras in a three dimensional (3D) sensor space.

FIGS. 15A, 15B and 15C illustrate path creation camera controls in a three dimensional (3D) sensor space.

DETAILED DESCRIPTION

Figure 1:
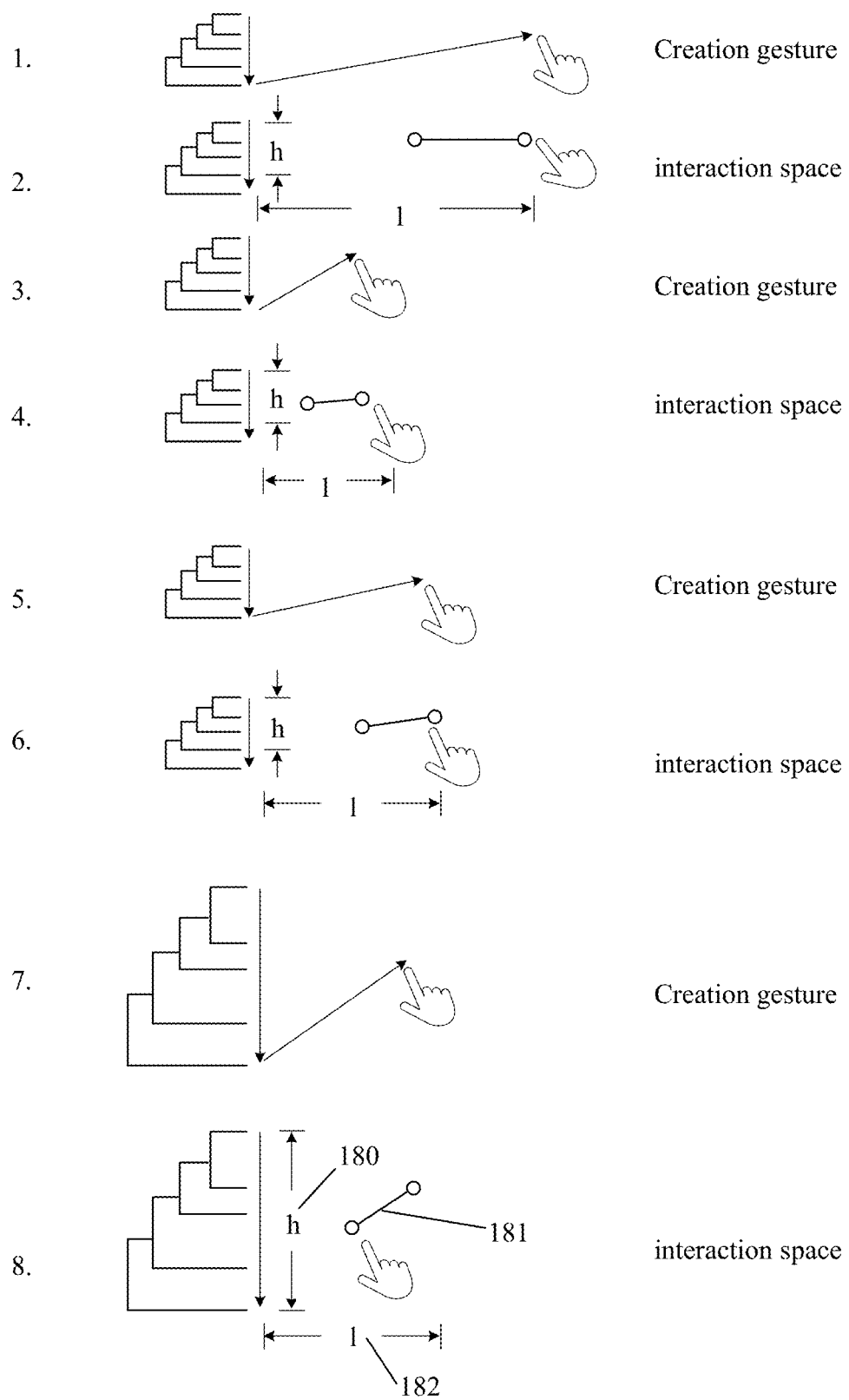
FIG. 1 illustrates a three-dimensional multi-stroke user-defined interaction widget.

Techniques described herein can be implemented as one or a combination of methods, systems or processor executed code to form implementations capable of improved control of machines or other computing resources based at least in part upon determining whether positions and/or motions of an object (e.g., hand, tool, hand and tool combinations, other detectable objects or combinations thereof) might be interpreted as an interaction with one or more virtual objects. Implementations can enable modeling of physical objects, created objects and interactions with combinations thereof for machine control or other purposes.

A user can interact with a device incorporating a 3D sensor such as described in U.S. Prov. App. No. 61/816,487 and U.S. Prov. App. No. 61/872,538 by using gestures in a 3D sensor space monitored by the 3D sensor. Interacting with the device often requires the control object (e.g., a hand) exiting the 3D sensor space (a "resetting" gesture) to specify a control (or engagement of a control) of the device. The technology disclosed relates to methods for interpreting gestures of a control object in a 3D sensor space, without requiring the control object exiting the 3D sensor space.

In this application, a 3D interaction space is part of a sensor space. A sensor space is a 3D volume in which a sensor, such as an upward looking binocular sensor, can track gestures of a control object. One control object can be a hand, including the palm, fingers and thumb. Another control object can be a pointer.

Gesture tracking involves tracking multiple dimensions of gestures made with the control object. The overall path of the control object through three-dimensional space is tracked. The speed and acceleration with which the control object moves is tracked. When the control object is a hand or other object with appendages, multiple degrees of freedom for orientation of the hand and of the individual fingers are tracked.

Gesture tracking can involve measuring additional parameters of the gesture. The sections that follow identify parameters of various gestures. Examples of gesture parameters for a control object such as a hand that can be characterized include a twist of the wrist, an orientation of the hand relative to the control surface, an orientation of the palm or back of the hand, positions of fingers relative to the palm, and positions of fingers relative to one another. In this sense, a thumb can be considered one of the fingers or an opposable thumb may have a special meaning distinct from the meaning of fingers. Individual fingers can have individual meanings.

Gestures link to controls or content that can be visualized with a visual display. In some implementations, the visual display begins with controls that become connected to gestures. For instance, a graphic user interface that has controls can be connected to gestures in the interaction space that manipulate the controls. In other implementations, gestures cause controls to appear on the visual display and then allow the user to interact with those new controls. For instance, applying gestures and interaction spaces to augmented reality can involve users superimposing controls or content over real scenes creating controls or display areas in thin air. The position of the superimposed controls can remain constant as the viewer looks around. Similarly, augmented virtual reality may involve users superimposing controls over virtual scenes.

Gestures take on meaning in context. In some implementations, context is set before the gesture is made. Context can be selected with keystrokes, spoken commands, eye movement, facial expressions, gestures of control objects and the like. In other implementations, context is inferred from the gesture. When a series of gestures are made, some of the gestures can be dedicated to setting a context for subsequent gestures.

Gestures can also link to virtual cameras in the sensor space. A virtual camera's properties such as focal length, position, orientation, or movement can be connected to the gestures. In one instance, curling of the fingers of a hand can be used to define zoom level of a virtual camera in the sensor space.

This general framework can be, but is not necessary, to the various gesture implementations described below.

Stroke

FIG. 1 illustrates a three-dimensional multi-stroke user-defined interaction widget. A stroke is represented by a collection of points output by a Machine Sensory and Control System (MSCS) FIGS. 7A, 7B, 7C, 8A, 8D, and 8E. This collection of points has at least one parameter in common within some threshold deviation. In one implementation, a stroke can be defined by a group of points which are continuous in time with velocity vectors within a threshold angle of each other. In another implementation, such velocity vectors can represent the difference vector between successive positions of the control object at points in time. In yet another implementation, a stroke can include a collection of points within a given radial distance to a fixed point.

FIG. 1 shows an implementation where the height 180 of an interaction space is defined in proportion to the height of a stroke sensed in an interaction space defining context. In some implementations, any spatial attribute of an interaction space can be defined in proportion to any defining characteristic of a stroke. At least one parameter of a second stroke can define a further attribute of the interaction space, such as its width 182, so that the first stroke defines the height and the second stroke the width of an interaction space. At least one parameter of a third stroke can define a further attribute of the interaction space, such as its depth 181. Interaction elements (e.g. but without limitation buttons, dials, panels etc.) placed within such a user-defined interaction space can expand or shrink in a predetermined way in proportion to the dimensions of the interaction space.

Density of a control object can refer to concentration of skin color pigments on a user appendage such as a hand. In another implementation, scale of the control object refers to level of relative separation of control points in a control object like fingertips in a hand.

Interaction includes a location in virtual space; in implementations this virtual space may be associated with a physical space for example as described in commonly owned U.S. Provisional Patent Applications, entitled "Velocity Field Interaction for Free Space Gesture Interface and Control" to Isaac Cohen (61/891,880). An interaction can include one or more quantities representing various attributes, such as for example a manipulation point "strength" attribute.

Definition of an interaction space can either be linked to an existing control or can cause a control to appear. For instance, a pull down menu can be linked to an interaction space. A small interaction space can be defined for just a few items. A large interaction space can make it easier to select from a long list of items. In augmented reality, an interaction space can cause a window to be superimposed over a real scene. The window can be filled with predetermined content or a user can select the content to be displayed in the window. The window also or alternatively can be filled with controls.

Radial Gesture

Figure 2:
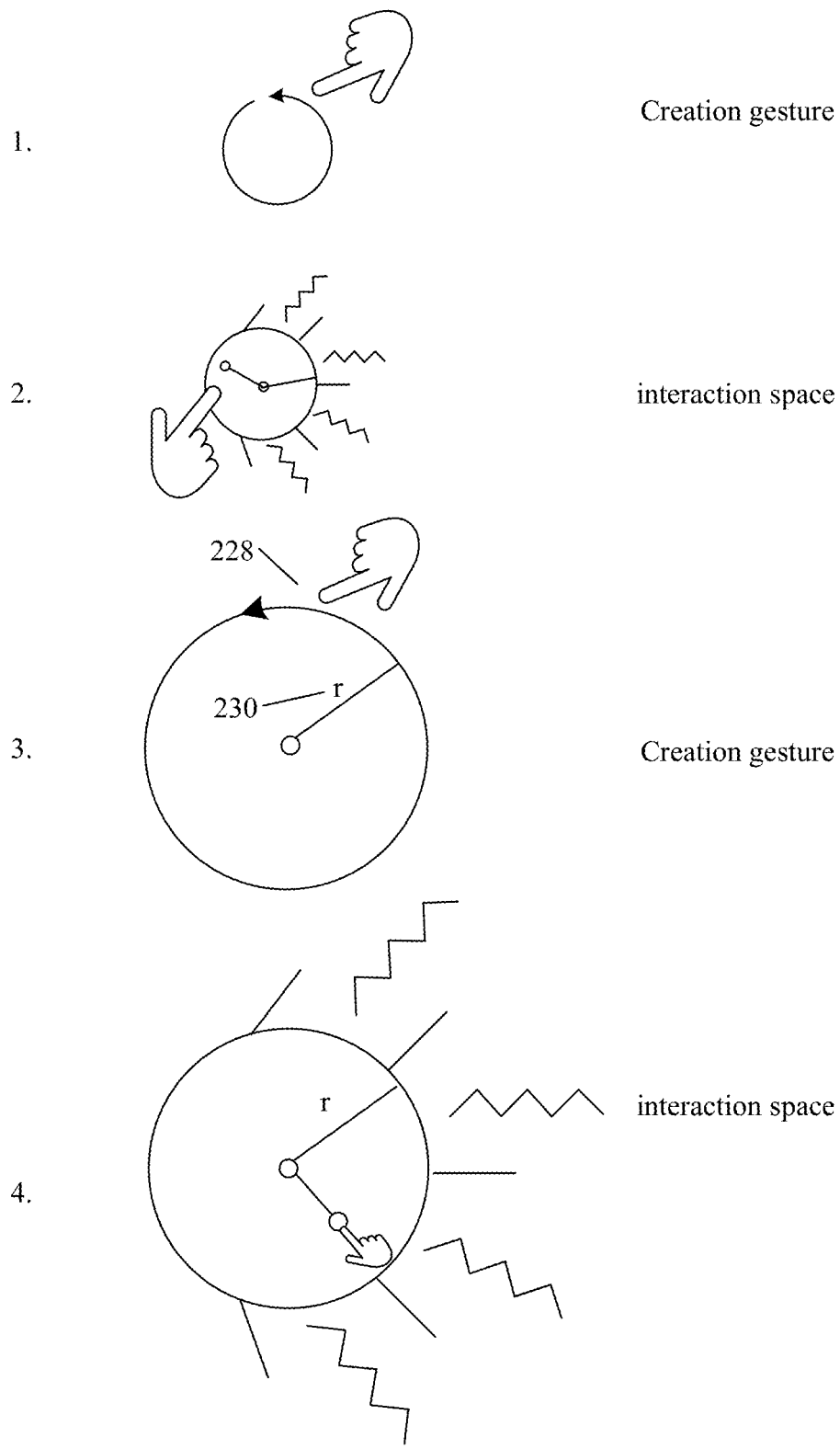
FIG. 2 illustrates an interaction space whose size is defined in proportion to a radius of a user's stroke.

FIG. 2 illustrates in frame 1 a creation gesture to create an interaction space. Now with reference to frame 2, an interaction space is specified to include one or more elements (saw tooth lines). Now with reference to frame 3, an interaction space whose size is defined in proportion to a radius of a user's stroke 230 in a creation gesture. In one implementation, radius can refer to a radius about a found point that is equidistant to a plurality of points defined on the stroke contour 228. In some implementations, as shown in frames 3 and 4, a radial dial can be defined in relation to the stroke contour and subsequently manipulated. In other implementations, the radial gesture defines a circular window that is superimposed over a real scene and populated with content or controls.

Hand Separation

Implementations can permit the use of two-handed manipulations of virtual objects. A user can hold a virtual object in place with one hand while manipulating the object with the other hand. Users can stretch, shrink, contort and otherwise transform virtual objects in the same ways as the virtual object manipulations. A virtual construct (i.e., plane) can be defined in proximity to the virtual object to enable engagements with the object. One use of such virtual constructs is further described in commonly owned U.S. Provisional Patent Applications Nos. 61/825,480, 61/825,418, 61/873,351, 61/877,641, 61/825,515. Real and/or virtual objects can be used in conjunction with a manipulated object. For example a real or virtual keyboard can be used with a virtual screen.

Figure 3:
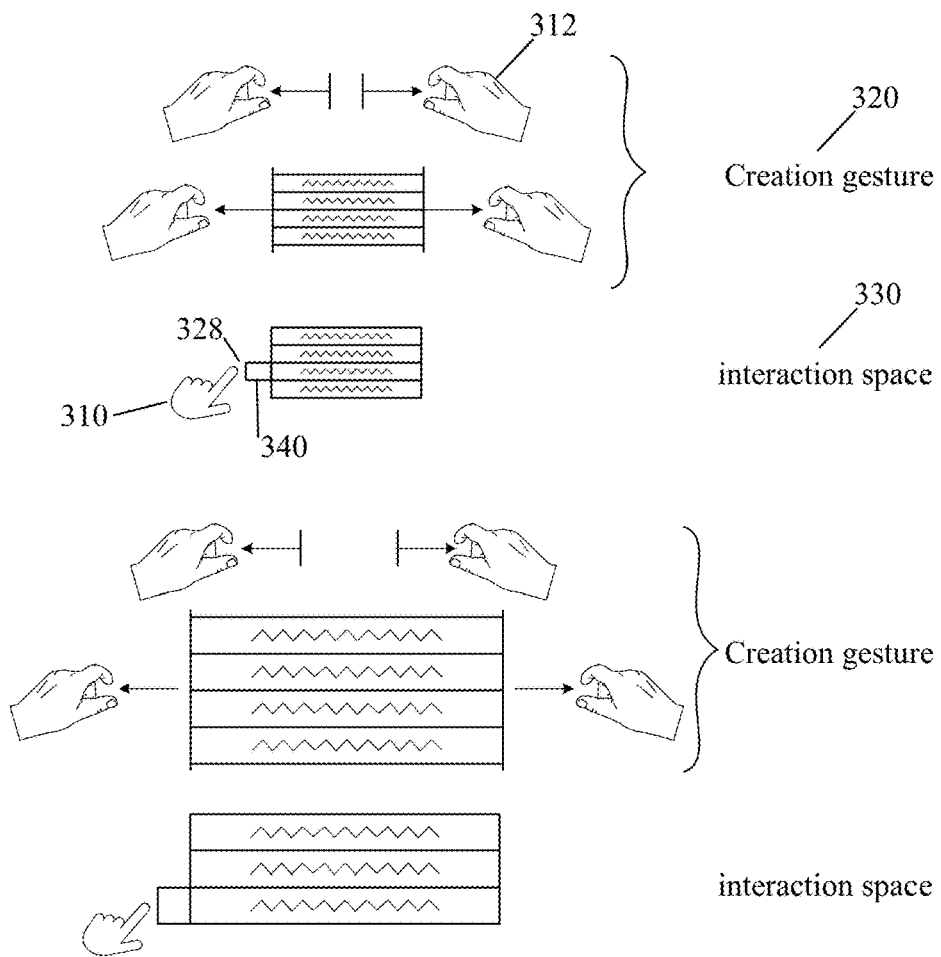
FIG. 3 shows an interaction space that is defined in response to outward expanding movement of hands.

FIG. 3 illustrates an implementation where two user appendages 310, 312, as identified by an MSCS, start at a fixed distance apart, expand outward, and then come to rest. The length at which they come to rest defines at least one parameter of a user interaction space. In one implementation, points defined at the center of the users palms are used to measure the outward expanding gesture. In another implementation, the two appendages are two fingertips of one hand.

Thus for example as illustrated in FIG. 3, a creation gesture 320 comprising drawing apart of hands 310, 312 defines one dimension of an interaction space 330, in this example the horizontal or ("length") dimension. Other dimensions can be specified gesturally using similar motions of hands 310, 312 to specify different dimensions of the interaction space.

Yet further, in FIG. 3, a creation gesture 328 comprising a pointing on by a single finger of hand 310 creates a new virtual object 340 in the interaction space 330. In implementations, creation of virtual objects can include describing a perimeter or circumference using a pointing finger, or fist or the like. In other implementations, virtual objects of a particular set size can be created by a tapping of a finger or fist.

Gravitational Attractor

Figure 4A:
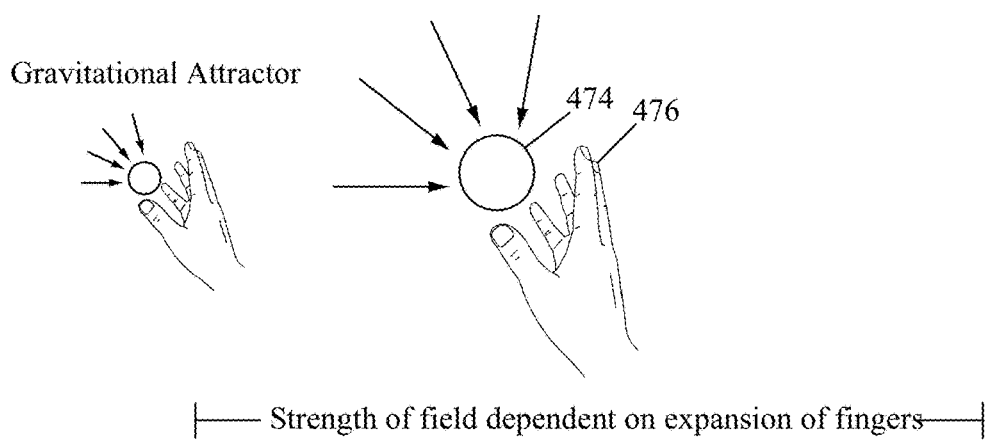
FIG. 4A illustrates a vector field defined by the curvature of a user's hand.

FIG. 4A illustrates a vector field defined at least in part by the curvature of a user's hand 476 and centered with respect to some point proximate to the hand. In one implementation, the vector is defined in response to curling of fingers of a hand and degrees of freedom or separation between fingers of the curled fingers. In another implementation, a sphere of best-fit is fit to a plurality of points on a user's hand as detected by the MSCS. The radius of this sphere 474 is used, along with other optional parameters, to define the magnitude of a vector on the sphere. In some implementations, at least one vector extends radially outward or inward between the center and surface of the sphere. In some applications, user-hand defined vector fields can enable compound interactions with the vector fields in interaction spaces is further described in commonly owned U.S. patent application Ser. No. 14/516,493, filed Oct. 16, 2014. In one implementation, such interactions include adding, multiplying, or taking the dot-product of at least one vector on the sphere and at least one vector in an interaction space. These vector operations can be applied to tensors represented by vectors.

Tensors can be a kind of vector and tensor spaces can be implementations of vector spaces. A tensor can include stress, strain, shear, or other object properties which can describe complex interactions with virtual objects. In one implementation, the vectors can include tensors. Such tensors can describe material properties of object portions in the virtual, physical, synthetic space, or any combination, such as stress, strain, shear, or other material properties.

Further, a vector field can be based upon virtual forces (e.g., virtual gravity, virtual electromagnetism, virtual charisma, etc.) enabling interactions with virtual objects over distances. For example, a "gravity grab" interaction in an astronomy genre gaming engine or physics teaching implementations includes emulating the force of gravity by selecting a function in which the strength is proportional to a "virtual mass" of the virtual object but declines with the square of the distance between the hand and the virtual object. In implementations employing strength to emulate virtual properties of objects, virtual flexibility/rigidity enable interactions with virtual objects emulating one type of material to have different interactions than virtual objects emulating another type of material. For example, a virtual steel sphere will behave differently to a virtual "squeeze" than a virtual rubber sphere. Virtual properties (e.g., virtual mass, virtual distance, virtual flexibility/rigidity, etc.) and virtual forces (e.g., virtual gravity, virtual electromagnetism, virtual charisma, etc.), like virtual objects, can be created (i.e., having no analog in the physical world) or modeled (i.e., having an analog in the physical world). Normal vectors or gradients can be used.

FIG. 4B illustrates potential gravitational attractors in accordance with an implementation. In frame 1 of FIG. 4B is depicted an implementation in which depending on the direction of the creation gesture, the sign of the force from the gravitation may be reversed. For example, clockwise 474 and counter clockwise 476 spiral gestures can be used to specify for example a positive (e.g., inward) gravitation G1 478 and a negative (e.g., outward) gravitation G2 480, respectively. In frame 2, another possible implementation places a gravitational attractor G 484 at the tip of the active finger 486. In frame 3, an implementation is depicted wherein when the camera 492 is moved, the user may also move their finger 494 to alter the force on the camera.

Spring Interaction

Figure 5:
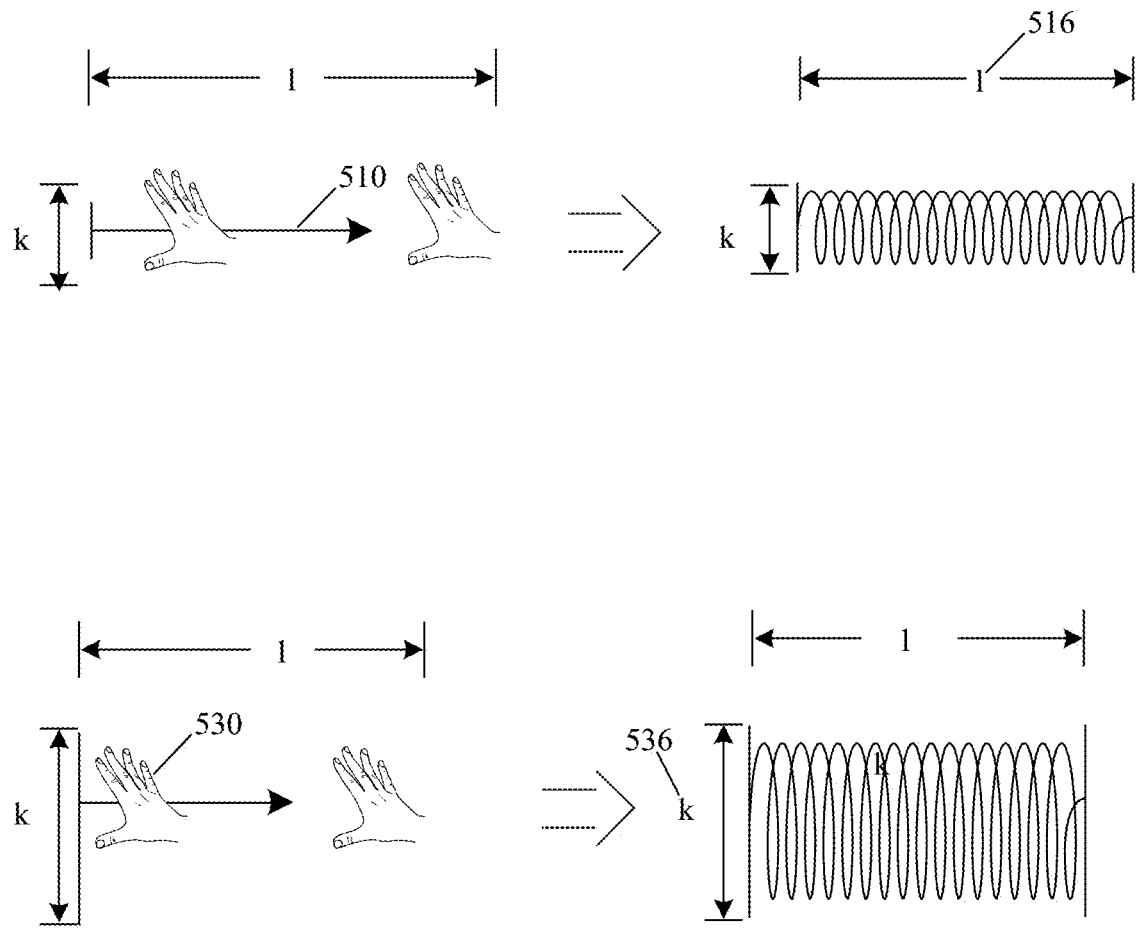
FIG. 5 illustrates a user-defined spring interaction element in a three dimensional (3D) sensor space.

FIG. 5 illustrates a user-defined virtual system that reflects properties of physical systems. In the example of FIG. 5, a spring interaction element is defined virtually in a three dimensional (3D) sensor space. In one implementation, one stroke 510 is used to define the length of the spring 516. In other implementations, one stroke 530, the opening of the fingers from the thumb, is used to define at least one other parameter of the spring, e.g., a stiffness of the spring 536 which, in this example, is designated as 'k'. Once-defined, such spring can be attached to and interact with other user-interaction elements of the 3D space.

Circle Tween Camera Movement

Figure 6A:
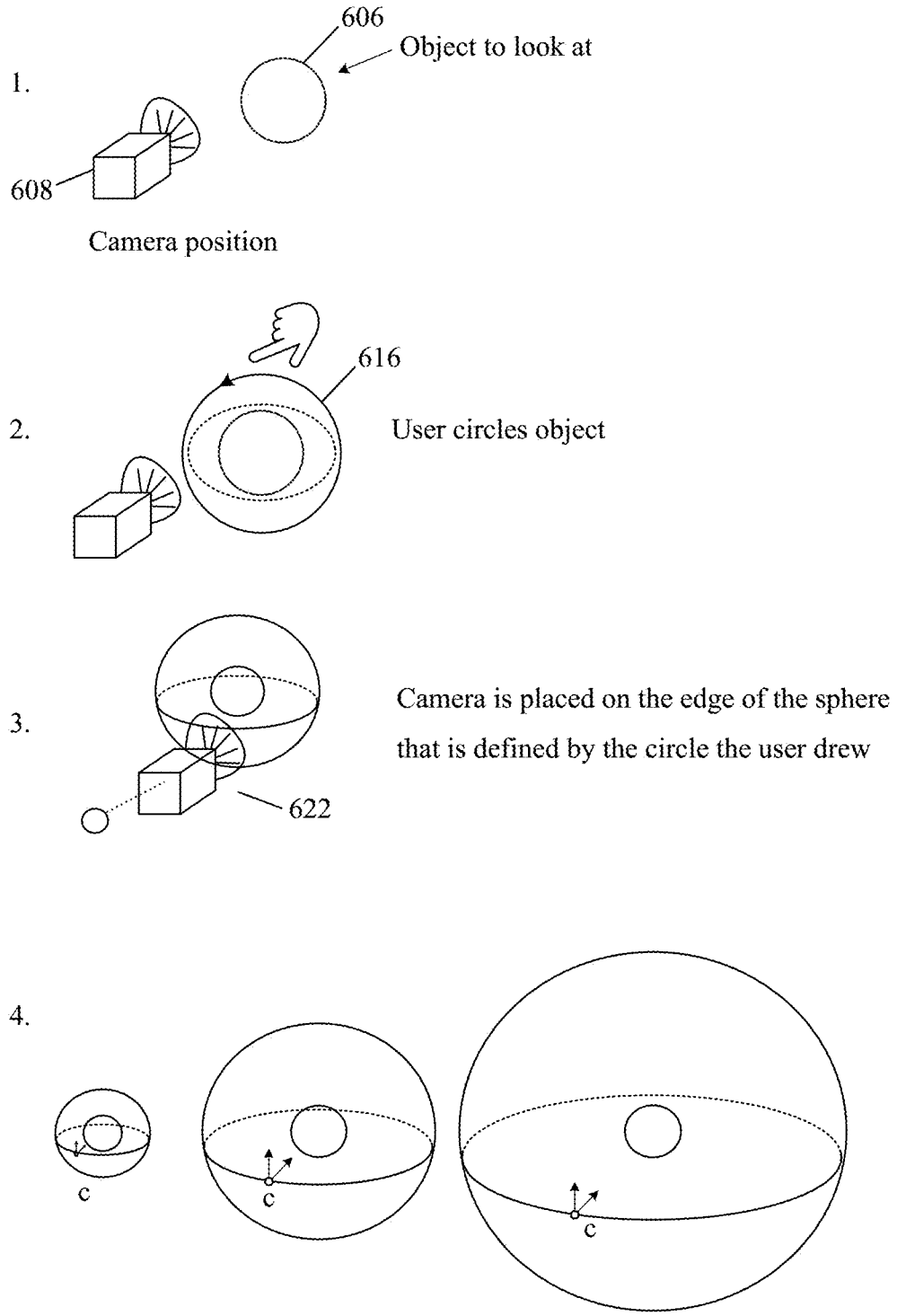

FIGS. 6A-6E show one implementation of controlling a virtual camera in a three dimensional (3D) sensor space. FIG. 6A illustrates a "tween" function for camera movement in 4 Frames. In Frame 1, an object of interest 606 is disposed in view of camera 608. In Frame 2 a user defines a stroke 616 relative to the movement of at least one parameter of a hand through time, as captured by a MSCS, around the object of interest 606 identified in Frame 1. In one implementation, a user describes any non-intersecting contour around an object of interest. In another implementation, a circle of best-fit is fit to a plurality of points on this contour. Frame 3 illustrates the placement of a camera 622 on the edge of the sphere defined in Frame 2. Frame 4 illustrates how the radius of the circle 616 can be used to control the precession of the camera 622 around the object of interest 606.

Figure 6B:
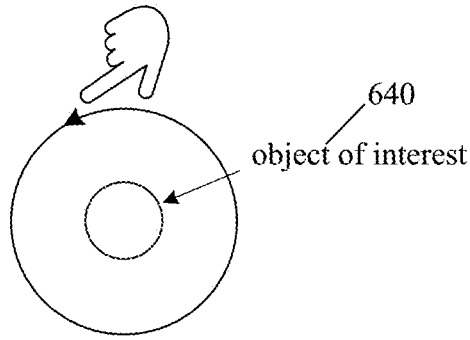
Figure 6B:
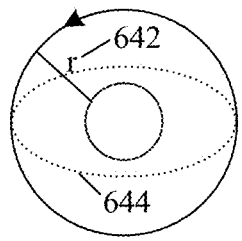
Figure 6B:
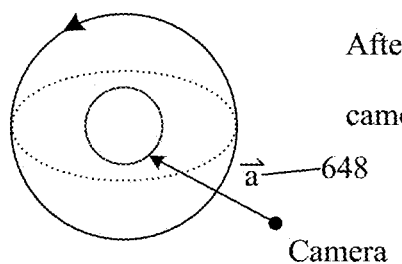
Figure 6B:
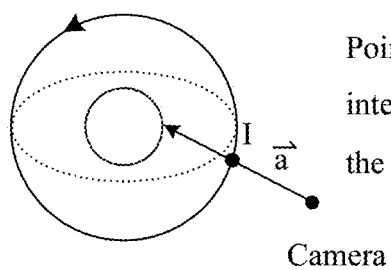

FIG. 6B illustrates how the radius of a stroke determines the "zoom" level and orientation of a camera control in 4 Frames. A circle is drawn around an object of interest 640 in Frame 1. In one implementation, a user describes any non-intersecting contour around an object of interest. In another implementation, a circle of best-fit is fit to a plurality of points on this contour. In Frame 2, from the circle an equator is determined for a sphere 644, which encloses the object of interest 640. In a Frame 3, a vector 648 is defined from the camera's current position to the center of the enclosing sphere. In a Frame 4, a point I on the circle with radius r 642 can then be calculated by solving the integration point of vector a 648 and the sphere equation.

Figure 6C:
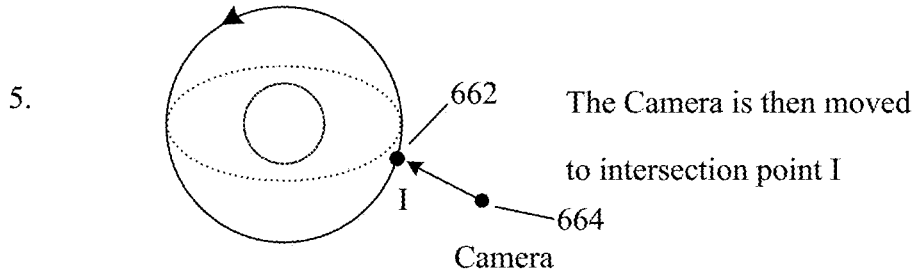
Figure 6C:
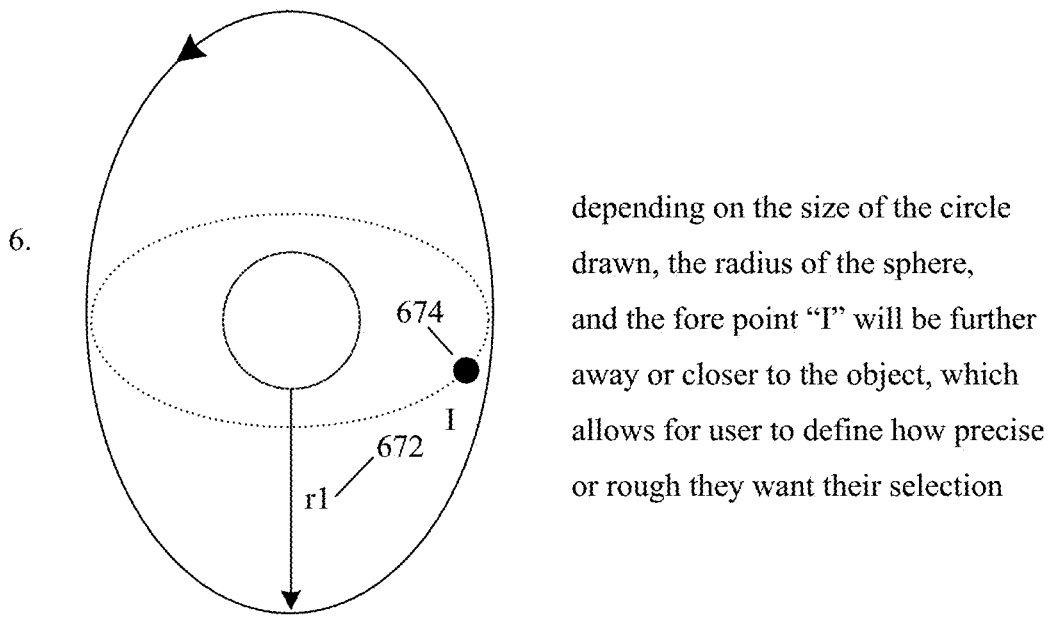
Figure 6C:
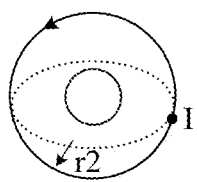

Now with reference to FIG. 6C, shown is the "tween" function in frames 5, 6, which illustrate how a camera's position is interpolated through time as it moves "tween" two points, beginning with a fore point 664 and eventually reaches the intersection point I 662 on the sphere's surface. In other applications, the camera instantly moves from one location to a new location. As shown in Frame 6, depending on the size of the circle drawn, the radius of the sphere 672 and the fore point 664, the intersection point "I" 674 will be further away or closer to the object 640, which allows a definition of camera position relative to the object as closely as the user desires to specify it.

Figure 6E:
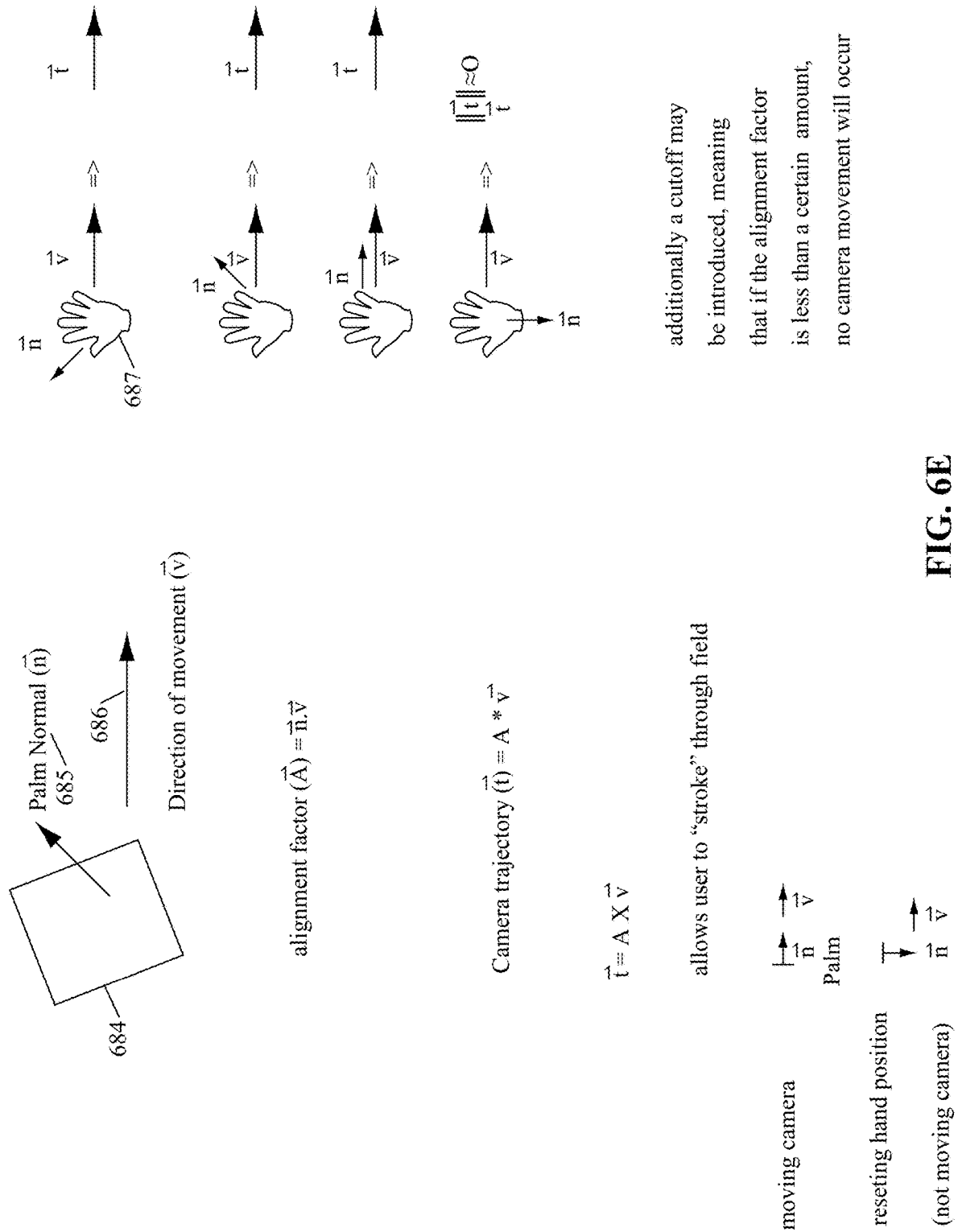

FIGS. 6D-6E show another example of controlling a virtual camera in a three dimensional space. Applying the technology disclosed, more than one hand attribute (velocity vector, palm normal, curvature of a finger, rotation matrix of hand, etc., and combinations) in the 3D sensor space can be mapped to more than one context hierarchy at the same time by the computing device with the 3D sensor. For example, frames 1-3 illustrate moving a camera from position P 676 to position O 677 by "stroking" a vector field with the palm as if pushing water. As shown in frame 1, the user positions their palm normal vector n approximately matching the palm velocity vector v, and strokes the field as if pushing water so that the object O moves closer to point P. In one implementation, point P is actually moved, however, the result is the same whether point P or object O is moved. In frame 2, the user's palm normal vector n is positioned approximately perpendicular to the palm velocity vector v, when the user simply slides their hand back through the field, making sure the palm normal does not match the direction of the palm velocity in order to reset the position of the hand. In frame 3, it is shown that the combination of the movement types in frames 1 and 2 provide an overall trajectory (e.g., the palm engages the field when gesture input is desired, disengages from the field when returning to a starting position within the view of the camera.

FIG. 6E illustrates the application of the technology disclosed, where the computing device automatically interprets a gesture of a control object 687 in a 3D sensor space by discerning a control plane 686 of the control object 687, according to one implementation. The computing device first senses a control object such as a user's hand 687 in the 3D sensor space. The computing device then senses an orientation of the control object 687 and determines a surface 684 of the control object 687. For example, a surface 684 of a hand 687 can be the palm back of the hand 687. The computing device defines a palm normal plane 685 that has an orientation to the surface 684 of the control object 687.

The computing device then interprets a gesture in the 3D sensor space based on whether the movement of the palm normal plane 685 is more normal to the control plane 686 or more parallel to the control plane 686. In some implementations, the computing device calculates a trajectory (an angular trajectory) of the movement of the palm normal plane, and determines whether the gesture engages a virtual control based on whether the trajectory is more normal or more parallel to the control plane 686.

FIG. 6D illustrates in frame 1 that the palm normal plane 679 is more normal to the control object's trajectory 678. The palm normal plane 679 is more normal to the trajectory 687 of FIG. 6E when a normal vector of the palm normal plane 679 is within a pre-determined range from a tangent vector of the trajectory 678 intersecting the palm normal plane 679. For example, the control plane 679 is more normal to the trajectory 678 when the normal vector of the palm normal plane 679 is within +/−10 degrees from the tangent vector of the trajectory 678. For example, the palm normal plane 679 is more normal to the trajectory 678 when the normal vector of the palm normal plane 679 is within +/−20 degrees or within +/−30 degrees from the tangent vector of the trajectory 678.

FIG. 6D depicts in frame 2 that the palm normal plane 681 is more perpendicular to the control object's trajectory 680. The palm normal plane 681 is more perpendicular to the trajectory 680 when the palm normal plane 681 is within a pre-determined range from a perpendicular vector of the trajectory 680 intersecting the palm normal plane 681. In one example, the palm normal plane 681 is more perpendicular to the trajectory 680 when the palm normal plane 681 is within +/−10 degrees from the perpendicular vector of the trajectory 680. In another example, the palm normal plane 681 is more perpendicular to the trajectory 680 when the palm normal plane 681 is within +/−20 degrees or within +/−30 degrees from the perpendicular vector of the trajectory 680.

Moving the control object 687 back through the three dimensional space so that the velocity of the hand does not match the normal of the palm resets the position of the hand. Additional examples include traversing menus with one hand and traversing menu paths with more than one hand. For example, a user can use one hand to change channel and the other hand to set volume at the same time. Another example has a user can changing channel by pushing with one hand, while turning down the volume by rotation motion of a finger on the one hand.

Machine Sensory and Control System

FIGS. 7A, 7B, 7C, 8A, 8D, and 8E illustrate an example machine sensory and control system in embodiments. In one embodiment, a motion sensing and controller system provides for detecting that some variation(s) in one or more portions of interest of a user has occurred, for determining that an interaction with one or more machines corresponds to the variation(s), for determining if the interaction should occur, and, if so, for affecting the interaction. The Machine Sensory and Control System (MSCS) typically includes a portion detection system, a variation determination system, an interaction system and an application control system.

Figure 7A:
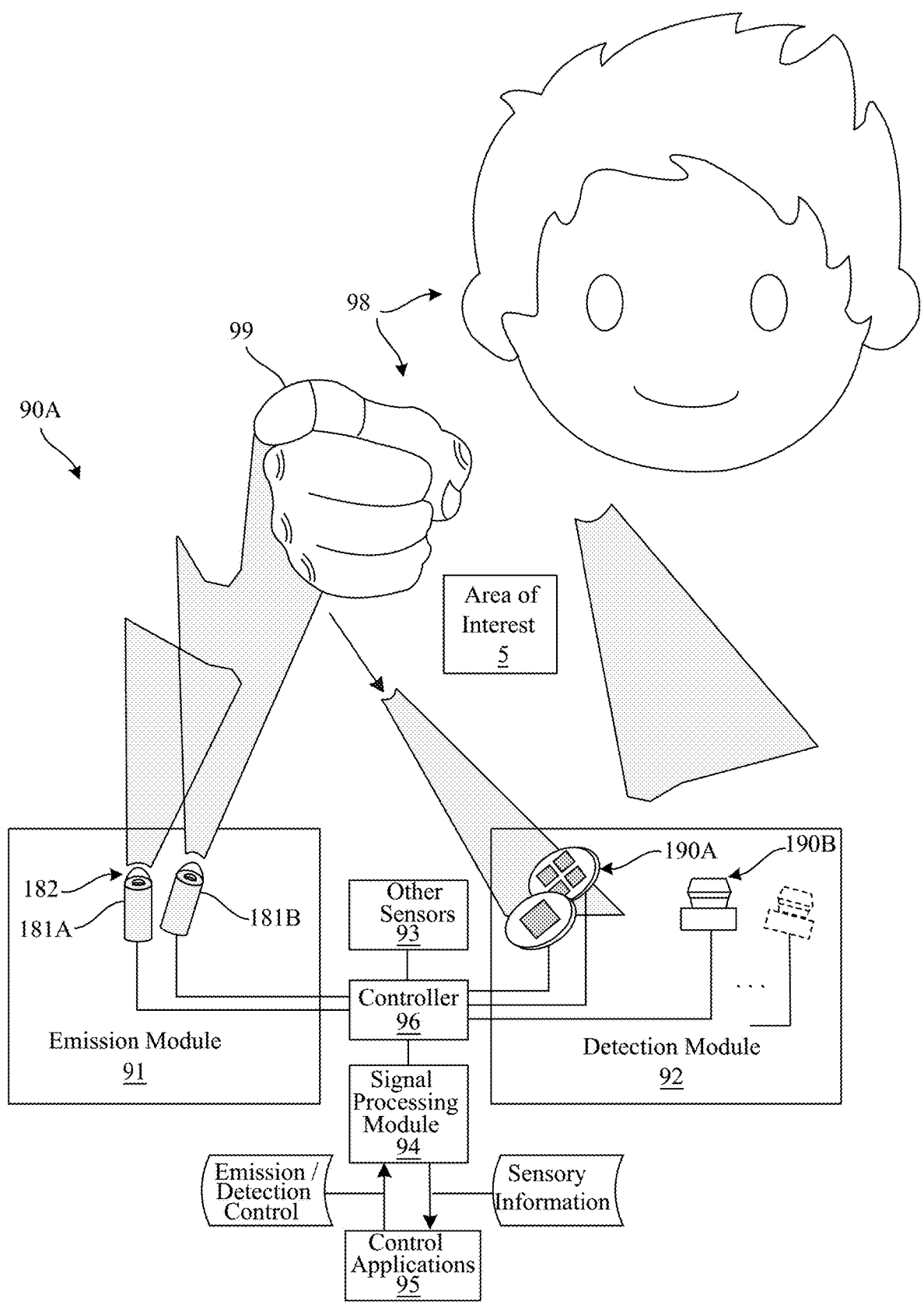
FIGS. 7A, 7B, 7C, 8A, 8B, 8C, 8D and 8E illustrate an example machine sensory and control system according to implementations.
Figure 7B:
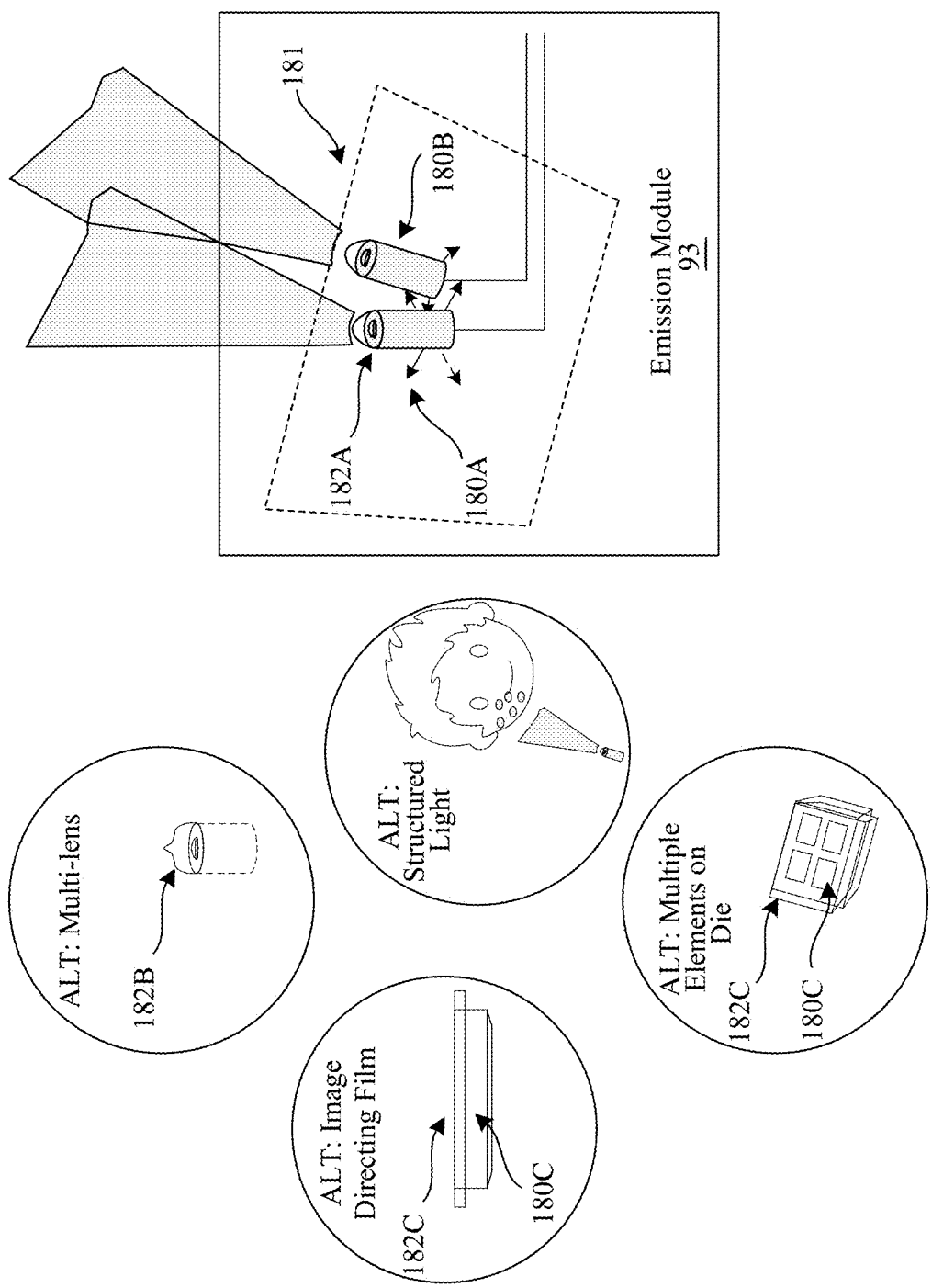
Figure 7C:
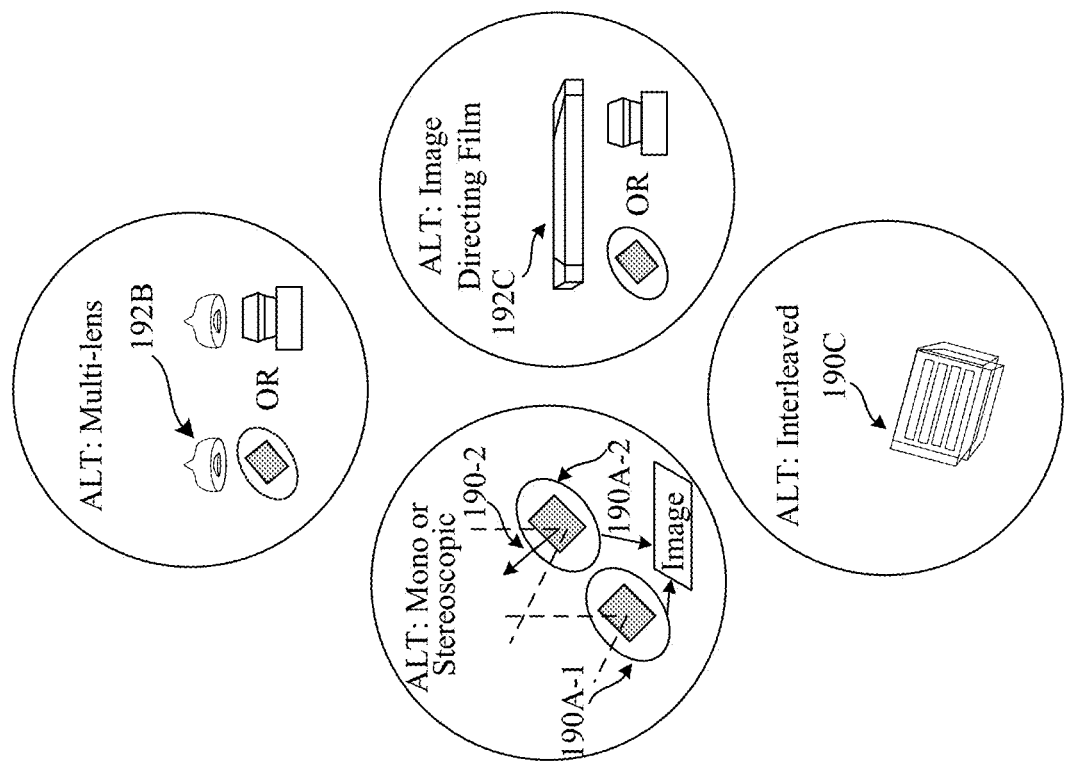
Figure 7C:
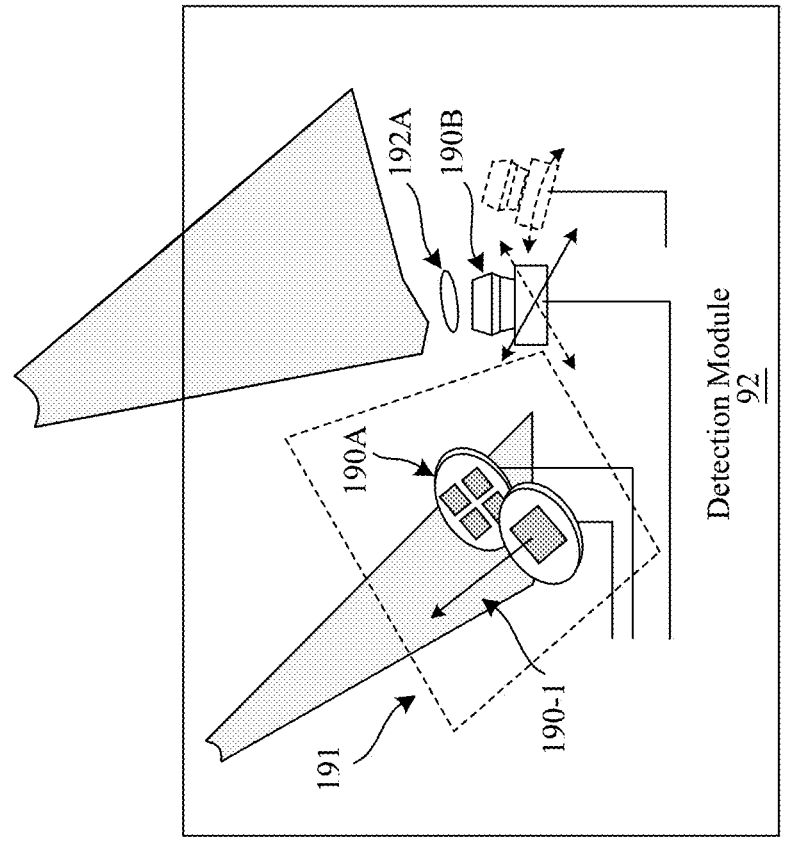

As FIG. 7A shows, one detection system 90A embodiment includes an emission module 91, a detection module 92, a controller 96, a signal processing module 94 and a machine control module 95. In one embodiment, the emission module 91 includes one or more emitter(s) 181A, 181B (e.g., LEDs or other devices emitting light in the IR, visible, or other spectrum regions, or combinations thereof; radio and/or other electromagnetic signal emitting devices) that are controllable via emitter parameters (e.g., frequency, activation state, firing sequences and/or patterns, etc.) by the controller 96. However, other existing/emerging emission mechanisms and/or some combination thereof can also be utilized in accordance with the requirements of a particular implementation. The emitters 180A, 180B can be individual elements coupled with materials or devices 182 (and/or materials) (e.g., lenses 182, multi-lenses (of FIG. 7A), image directing film (IDF) 182C (of FIG. 7B), liquid lenses, combinations thereof, and/or others) with varying or variable optical properties to direct the emission, one or more arrays 180C of emissive elements (combined on a die or otherwise), with or without the addition of devices 182C for directing the emission, or combinations thereof, and positioned within an emission region 181 (of FIG. 7B) according to one or more emitter parameters (i.e., either statically (e.g., fixed, parallel, orthogonal or forming other angles with a work surface, one another or a display or other presentation mechanism) or dynamically (e.g., pivot, rotate and/or translate) mounted, embedded (e.g., within a machine or machinery under control) or otherwise coupleable using an interface (e.g., wired or wireless)). In some embodiments, structured lighting techniques can provide improved surface feature capture capability by casting illumination according to a reference pattern onto the object 98. Image capture techniques described in further detail herein can be applied to capture and analyze differences in the reference pattern and the pattern as reflected by the object 98. In yet further embodiments, detection system 90A may omit emission module 91 altogether (e.g., in favor of ambient lighting).

In one embodiment, the detection module 92 includes one or more capture device(s) 190A, 190B (e.g., light (or other electromagnetic radiation sensitive devices) that are controllable via the controller 96. The capture device(s) 190A, 190B can comprise individual or multiple arrays of image capture elements 190A (e.g., pixel arrays, CMOS or CCD photo sensor arrays, or other imaging arrays) or individual or arrays of photosensitive elements 190B (e.g., photodiodes, photo sensors, single detector arrays, multi-detector arrays, or other configurations of photo sensitive elements) or combinations thereof. Arrays of image capture device(s) 190C (of FIG. 7C) can be interleaved by row (or column or a pattern or otherwise addressable singly or in groups). However, other existing/emerging detection mechanisms and/or some combination thereof can also be utilized in accordance with the requirements of a particular implementation. Capture device(s) 190A, 190B each can include a particular vantage point 190-1 from which objects 98 within area of interest 5 are sensed and can be positioned within a detection region 191 (of FIG. 7C) according to one or more detector parameters (i.e., either statically (e.g., fixed, parallel, orthogonal or forming other angles with a work surface, one another or a display or other presentation mechanism) or dynamically (e.g. pivot, rotate and/or translate), mounted, embedded (e.g., within a machine or machinery under control) or otherwise coupleable using an interface (e.g., wired or wireless)). Capture devices 190A, 190B can be coupled with devices 192A, 192B, 192C (and/or materials) (of FIG. 7C) (e.g., lenses 192A (of FIG. 7C), multi-lenses 192B (of FIG. 7C), image directing film (IDF) 192C (of FIG. 7C), liquid lenses, combinations thereof, and/or others) with varying or variable optical properties for directing the reflectance to the capture device for controlling or adjusting resolution, sensitivity and/or contrast. Capture devices 190A, 190B can be designed or adapted to operate in the IR, visible, or other spectrum regions, or combinations thereof; or alternatively operable in conjunction with radio and/or other electromagnetic signal emitting devices in various applications. In an embodiment, capture devices 190A, 190B can capture one or more images for sensing objects 98 and capturing information about the object (e.g., position, motion, etc.). In embodiments comprising more than one capture device, particular vantage points of capture devices 190A, 190B can be directed to area of interest 5 so that fields of view 190-2 of the capture devices at least partially overlap. Overlap in the fields of view 190-2 provides capability to employ stereoscopic vision techniques (see, e.g., FIG. 7C), including those known in the art to obtain information from a plurality of images captured substantially contemporaneously.

While illustrated with reference to a particular embodiment in which control of emission module 91 and detection module 92 are co-located within a common controller 96, it should be understood that these functions will be separate in some embodiments, and/or incorporated into one or a plurality of elements comprising emission module 91 and/or detection module 92 in some embodiments. Controller 96 comprises control logic (hardware, software or combinations thereof) to conduct selective activation/de-activation of emitter(s) 180A, 180B (and/or control of active directing devices) in on-off, or other activation states or combinations thereof to produce emissions of varying intensities in accordance with a scan pattern which can be directed to scan an area of interest 5. Controller 96 can comprise control logic (hardware, software or combinations thereof) to conduct selection, activation and control of capture device(s) 190A, 190B (and/or control of active directing devices) to capture images or otherwise sense differences in reflectance or other illumination. Signal processing module 94 determines whether captured images and/or sensed differences in reflectance and/or other sensor-perceptible phenomena indicate a possible presence of one or more objects of interest 98, including control objects 99, the presence and/or variations thereof can be used to control machines and/or other applications 95.

In various embodiments, the variation of one or more portions of interest of a user can correspond to a variation of one or more attributes (position, motion, appearance, surface patterns) of a user hand 99, finger(s), points of interest on the hand 99, facial portion 98 other control objects (e.g., styli, tools) and so on (or some combination thereof) that is detectable by, or directed at, but otherwise occurs independently of the operation of the machine sensory and control system. Thus, for example, the system is configurable to 'observe' ordinary user locomotion (e.g., motion, translation, expression, flexing, deformation, and so on), locomotion directed at controlling one or more machines (e.g., gesturing, intentionally system-directed facial contortion, etc.), attributes thereof (e.g., rigidity, deformation, fingerprints, veins, pulse rates and/or other biometric parameters). In one embodiment, the system provides for detecting that some variation(s) in one or more portions of interest (e.g., fingers, fingertips, or other control surface portions) of a user has occurred, for determining that an interaction with one or more machines corresponds to the variation(s), for determining if the interaction should occur, and, if so, for at least one of initiating, conducting, continuing, discontinuing and/or modifying the interaction and/or a corresponding interaction.

Figure 8A:
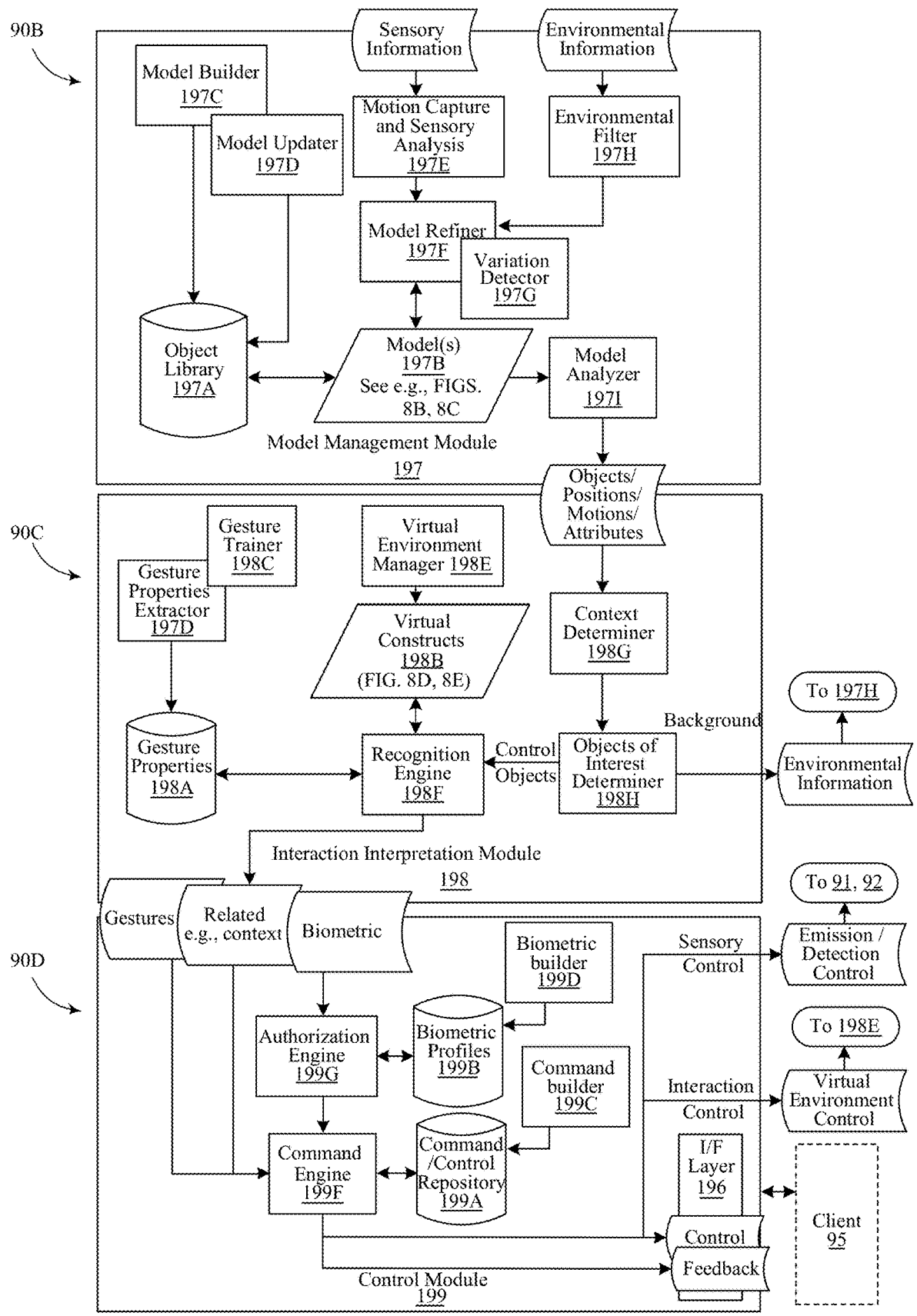

For example and with reference to FIG. 8A, a variation determination system 90B embodiment comprises a model management module 197 that provides functionality to build, modify, customize one or more models to recognize variations in objects, positions, motions and attribute state and/or change in attribute state (of one or more attributes) from sensory information obtained from detection system 90A. A motion capture and sensory analyzer 197E finds motions (i.e., translational, rotational), conformations, and presence of objects within sensory information provided by detection system 90A. The findings of motion capture and sensory analyzer 197E serve as input of sensed (e.g., observed) information from the environment with which model refiner 197F can update predictive information (e.g., models, model portions, model attributes, etc.).

A model management module 197 embodiment comprises a model refiner 197F to update one or more models 197B (or portions thereof) from sensory information (e.g., images, scans, other sensory-perceptible phenomenon) and environmental information (i.e., context, noise, etc.); enabling a model analyzer 197I to recognize object, position, motion and attribute information that might be useful in controlling a machine. Model refiner 197F employs an object library 197A to manage objects including one or more models 197B (i.e., of user portions (e.g., hand, face), other control objects (e.g., styli, tools)) or the like (see e.g., model 197B-1, 197B-2 of FIGS. 8B, 8C)), model components (i.e., shapes, 2D model portions that sum to 3D, outlines 194 and/or outline portions 194A, 194B (i.e., closed curves), attributes 197-5 (e.g., attach points, neighbors, sizes (e.g., length, width, depth), rigidity/flexibility, torsional rotation, degrees of freedom of motion and others) and so forth) (see e.g., 197B-1 197B-2 of FIGS. 8B-8C), useful to define and update models 197B, and model attributes 197-5. While illustrated with reference to a particular embodiment in which models, model components and attributes are co-located within a common object library 197A, it should be understood that these objects will be maintained separately in some embodiments.

Figure 8B:
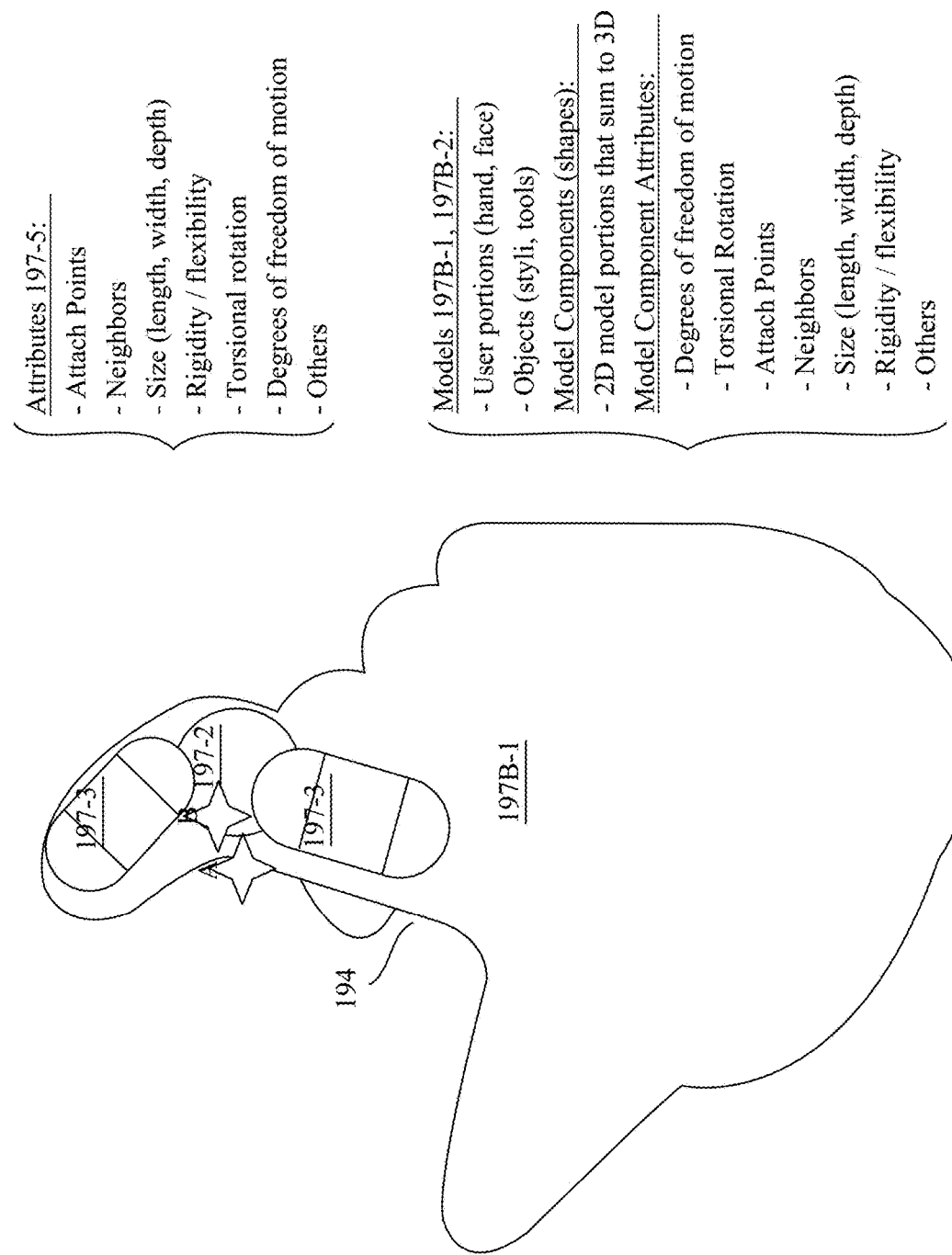

FIG. 8B illustrates prediction information including a model 197B-1 of a control object (e.g., FIG. 7A: 99) constructed from one or more model subcomponents 197-2, 197-3 selected and/or configured to represent at least a portion of a surface of control object 99, a virtual surface portion 194 and one or more attributes 197-5. Other components can be included in prediction information 197B-1 not shown in FIG. 8B for clarity sake. In an embodiment, the model subcomponents 197-2, 197-3 can be selected from a set of radial solids, which can reflect at least a portion of a control object 99 in terms of one or more of structure, motion characteristics, conformational characteristics, other types of characteristics of control object 99, and/or combinations thereof. In one embodiment, radial solids include a contour and a surface defined by a set of points having a fixed distance from the closest corresponding point on the contour. Another radial solid embodiment includes a set of points normal to points on a contour and a fixed distance therefrom. In an embodiment, computational technique(s) for defining the radial solid include finding a closest point on the contour and the arbitrary point, then projecting outward the length of the radius of the solid. In an embodiment, such projection can be a vector normal to the contour at the closest point. An example radial solid (e.g., 197-3) includes a "capsuloid", i.e., a capsule shaped solid including a cylindrical body and semi-spherical ends. Another type of radial solid (e.g., 197-2) includes a sphere. Other types of radial solids can be identified based on the foregoing teachings.

One or more attributes 197-5 can define characteristics of a model subcomponent 197-3. Attributes can include e.g., attach points, neighbors, sizes (e.g., length, width, depth), rigidity, flexibility, torsion, zero or more degrees of freedom of motion with respect to one or more defined points, which can include endpoints for example, and other attributes defining a salient characteristic or property of a portion of control object 99 being modeled by predictive information 197B-1. In an embodiment, predictive information about the control object can include a model of the control object together with attributes defining the model and values of those attributes.

In an embodiment, observation information including observation of the control object can be compared against the model at one or more of periodically, randomly or substantially continuously (i.e., in real time). Observational information can include without limitation observed values of attributes of the control object corresponding to the attributes of one or more model subcomponents in the predictive information for the control object. In an embodiment, comparison of the model with the observation information provides an error indication. In an embodiment, an error indication can be computed by determining a closest distance determined between a first point A belonging to a set of points defining the virtual surface 194 and a second point B belonging to a model subcomponent 197-2 determined to be corresponding to the first point (e.g., nearest to the first point for example). In an embodiment, the error indication can be applied to the predictive information to correct the model to more closely conform to the observation information. In an embodiment, error indication can be applied to the predictive information repeatedly until the error indication falls below a threshold, a measure of conformance with the observation information rises above a threshold, or a fixed or variable number of times, or a fixed or variable number of times per time period, or combinations thereof.

Figure 8C:
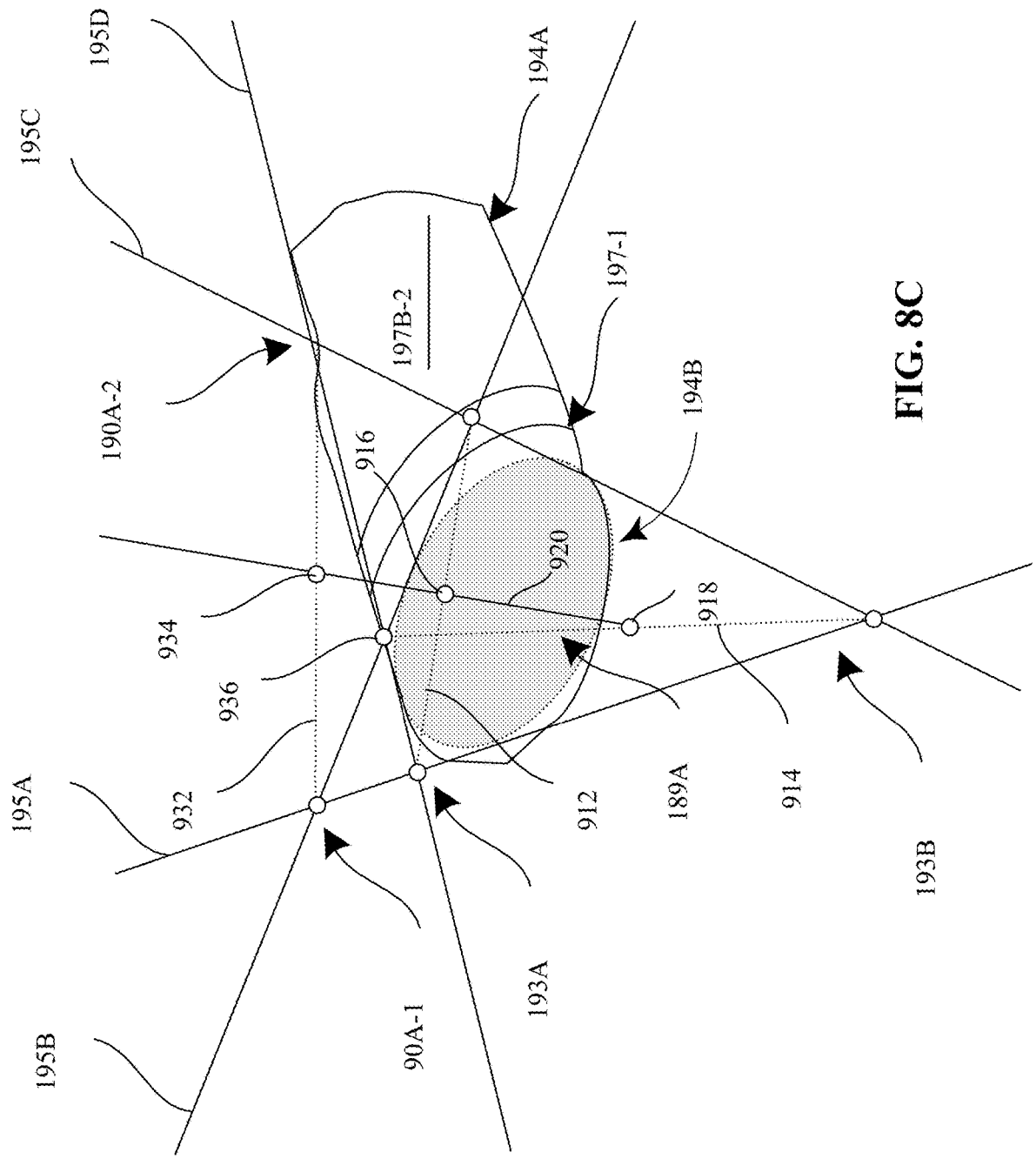

In an embodiment and with reference to FIGS. 7A, 8C, updating predictive information to observed information comprises selecting one or more sets of points (e.g., FIG. 8C: 193A, 193B) in space surrounding or bounding the control object within a field of view of one or more image capture device(s). As shown by FIG. 8C, points 193A can be determined using one or more sets of lines 195A, 195B, 195C, and 195D originating at vantage point(s) (e.g., FIG. 7A: 190-1, 190-2) associated with the image capture device(s) (e.g., FIG. 7A: 190A-1, 190A-2) and determining therefrom one or more intersection point(s) defining a bounding region (i.e., region formed by lines FIG. 8C: 195A, 195B, 195C, and 195D) surrounding a cross-section of the control object. The bounding region can be used to define a virtual surface (FIG. 8C: 194) to which model subcomponents 197-1, 197-2 and 197-3 can be compared. The virtual surface 194 can include a visible portion 194A and a non-visible "inferred" portion 194B. Virtual surfaces 194 can include straight portions and/or curved surface portions of one or more virtual solids (i.e., model portions) determined by model refiner 197F on FIG. 8.

For example and according to one embodiment illustrated by FIG. 8C, model refiner 197F determines to model sub-component 197-1 of an object portion (happens to be a finger) using a virtual solid, an ellipse in this illustration, or any of a variety of 3D shapes (e.g., ellipsoid, sphere, or custom shape) and/or 2D slice(s) that are added together to form a 3D volume. Accordingly, beginning with generalized equations for an ellipse (1) with (x, y) being the coordinates of a point on the ellipse, $(x_C, y_C)$ the center, a and b the axes, and θ the rotation angle. The coefficients $C_1$, $C_2$ and $C_3$ are defined in terms of these parameters, as shown:

$$C_1 x^2 + C_2 xy + C_3 y^2 - (2C_1 x_c + C_2 y_c)x - \qquad (1)$$
$$(2C_3 y_c + C_2 x_c)y + (C_1 x_c^2 + C_2 x_c y_c + C_3 y_c^2 - 1) = 0$$

$$C_1 = \frac{\cos^2\theta}{a^2} + \frac{\sin^2\theta}{b^2}$$

$$C_2 = -2\cos\theta\sin\theta\left(\frac{1}{a^2} - \frac{1}{b^2}\right)$$

$$C_3 = \frac{\sin^2\theta}{a^2} + \frac{\cos^2\theta}{b^2}$$

The ellipse equation (1) is solved for θ, subject to the constraints that: (1) $(x_C, y_C)$ must lie on the centerline determined from the four tangents 195A, 195B, 195C, and 195D (i.e., centerline 189A of FIG. 8C); and (2) is fixed at the assumed value $a_0$. The ellipse equation can either be solved for θ analytically or solved using an iterative numerical solver (e.g., a Newtonian solver as is known in the art). An analytic solution can be obtained by writing an equation for the distances to the four tangent lines given a $y_C$ position, then solving for the value of $y_C$ that corresponds to the desired radius parameter $a=a_0$. Accordingly, equations (2) for four tangent lines in the x-y plane (of the slice), in which coefficients $A_i$, $B_i$ and $D_i$ (for i=1 to 4) are determined from the tangent lines 195A, 195B, 195C, and 195D identified in an image slice as described above.

$$A_1 x + B_1 y + D_1 = 0$$
$$A_2 x + B_2 y + D_2 = 0$$
$$A_3 x + B_3 y + D_3 = 0$$
$$A_4 x + B_4 y + D_4 = 0 \qquad (2)$$

Four column vectors $r_{12}$, $r_{23}$, $r_{14}$ and $r_{24}$ are obtained from the coefficients $A_i$, $B_i$ and $D_i$ of equations (2) according to equations (3), in which the "\" operator denotes matrix left division, which is defined for a square matrix M and a column vector v such that M\v=r, where r is the column vector that satisfies Mr=v:

$$r_{13} = \begin{bmatrix} A_1 & B_1 \\ A_3 & B_3 \end{bmatrix} \setminus \begin{bmatrix} -D_1 \\ -D_3 \end{bmatrix}$$

$$r_{23} = \begin{bmatrix} A_2 & B_2 \\ A_3 & B_3 \end{bmatrix} \setminus \begin{bmatrix} -D_{21} \\ -D_3 \end{bmatrix}$$

$$r_{14} = \begin{bmatrix} A_1 & B_1 \\ A_4 & B_4 \end{bmatrix} \setminus \begin{bmatrix} -D_1 \\ -D_4 \end{bmatrix}$$

$$r_{24} = \begin{bmatrix} A_2 & B_2 \\ A_4 & B_4 \end{bmatrix} \setminus \begin{bmatrix} -D_2 \\ -D_4 \end{bmatrix} \quad (3)$$

Four component vectors G and H are defined in equations (4) from the vectors of tangent coefficients A, B and D and scalar quantities p and q, which are defined using the column vectors $r_{12}$, $r_{23}$, $r_{14}$ and $r_{24}$ from equations (3).

$c1 = (r_{13} + r_{24})/2$ $c2 = (r_{14} + r_{23})/2$ $\delta 1 = c2_1 - c1_1$ $\delta 2 = c2_2 - c1_2$ $p = \delta 1/\delta 2$ $q = c1_1 - c1_2 * p$ $G = Ap + B$ $H = Aq + D \quad (4)$ Six scalar quantities $v_{A2}$, $v_{AB}$, $v_{B2}$, $w_{A2}$, $w_{AB}$, and $w_{B2}$ are defined by equation (5) in terms of the components of vectors G and H of equation (4).

$$v = \begin{bmatrix} G_2^2 & G_3^2 & G_4^2 \\ (G_2 H_2)^2 & (G_3 H_3)^2 & (G_4 H_4)^2 \\ H_2^2 & H_3^2 & H_4^2 \end{bmatrix} \setminus \begin{bmatrix} 0 \\ 0 \\ 1 \end{bmatrix} \quad (5)$$

$$w = \begin{bmatrix} G_2^2 & G_3^2 & G_4^2 \\ (G_2 H_2)^2 & (G_3 H_3)^2 & (G_4 H_4)^2 \\ H_2^2 & H_3^2 & H_4^2 \end{bmatrix} \setminus \begin{bmatrix} 0 \\ 1 \\ 0 \end{bmatrix}$$

$v_{A2} = (v_1 A_1)^2 + (v_2 A_2)^2 + (v_3 A_3)^2$ $v_{AB} = (v_1 A_1 B_1)^2 + (v_2 A_2 B_2)^2 + (v_3 A_3 B_3)^2$ $v_{B2} = (v_1 B_1)^2 + (v_2 B_2)^2 + (v_3 B_3)^2$ $w_{A2} = (w_1 A_1)^2 + (w_2 A_2)^2 + (w_3 A_3)^2$ $w_{AB} = (w_1 A_1 B_1)^2 + (w_2 A_2 B_2)^2 + (w_3 A_3 B_3)^2$ $w_{B2} = (w_1 B_1)^2 + (w_2 B_2)^2 + (w_3 B_3)^2$

Using the parameters defined in equations (1)-(5), solving for θ is accomplished by solving the eighth-degree polynomial equation (6) for t, where the coefficients $Q_i$ (for i=0 to 8) are defined as shown in equations (7)-(15).

$0 = Q_8 t^8 + Q_7 t^7 + Q_6 t^6 + Q_5 t^5 + Q_4 t^4 + Q_3 t^3 + Q_2 t^2 + Q_1 t + Q_0 \quad (6)$ The parameters $A_1$, $B_1$, $G_1$, $H_1$, $v_{A2}$, $v_{AB}$, $v_{B2}$, $w_{A2}$, $w_{AB}$, and $w_{B2}$ used in equations (7)-(15) are defined as shown in equations (1)-(4). The parameter n is the assumed semi-major axis (in other words, $a_0$). Once the real roots t are known, the possible values of θ are defined as θ=atan(t).

$Q_8 = 4A_1^2 n^2 v_{B2}^2 + 4v_{B2} B_1^2 (1 - n^2 v_{A2}) - (G_1 (1 - n^2 v_{A2}) w_{B2} + n^2 v_{B2} w_{A2} + 2H_1 v_{B2})^2 \quad (7)$ $Q_7 = -(2(2n^2 v_{AB} w_{A2} + 4H_1 v_{AB} + 2G_1 n^2 v_{AB} w_{B2} + 2G_1 (1 - n^2 v_{A2}) w_{AB}))(G_1 (1 - n^2 v_{A2}) w_{B2} + n^2 v_{B2} w_{A2} + 2H_1 v_{B2}) - 8A_1 B_1 n^2 v_{B2}^2 + 16A_1^2 n^2 v_{AB} v_{B2} + (4(2A_1 B_1 (1 - n^2 v_{A2}) + 2B_1^2 n^2 v_{AB})) v_{B2} + 8B_1^2 (1 - n^2 v_{A2}) v_{AB} \quad (8)$ $Q_6 = -(2(2H_1 v_{B2} + 2H_1 v_{A2} + n^2 v_{A2} w_{A2} + n^2 v_{B2} (-2w_{AB} + w_{B2}) + G_1 (n^2 v_{B2} + 1) w_{B2} + 4G_1 n^2 v_{AB} w_{AB} + G_1 (1 - n^2 v_{A2}) v_{A2}) x (G_1 (1 - n^2 v_{A2}) w_{B2} + n^2 v_{B2} w_{A2} + 2H_1 v_{B2}) - (2n^2 v_{AB} w_{A2} + 4H_1 v_{AB} + 2G_1 n^2 v_{AB} w_{B2} + 2G_1 (1 - n^2 v_{A2}) w_{AB})^2 + 4B_1^2 n^2 v_{B2}^2 - 32A_1 B_1 n^2 v_{AB} v_{B2} + 4A_1^2 n^2 (2v_{A2} v_{B2} + 4v_{AB}^2) + 4A_1^2 n^2 v_{B2}^2 + (4(A_1^2 (1 - n^2 v_{A2}) + 4A_1 B_1 n^2 v_{AB} + B_1^2 (-n^2 v_{B2} + 1) + B_1^2 (1 - n^2 v_{A2}))) v_{B2} + (8(2A_1 B_1 (1 - n^2 v_{A2}) + 2B_1^2 n^2 v_{AB})) v_{AB} + 4B_1^2 (1 - n^2 v_{A2}) v_{A2} \quad (9)$ $Q_5 = -(2(4H_1 v_{AB} + 2G_1 (-n^2 v_{B2} + 1) w_{AB} + 2G_1 n^2 v_{AB} v_{A2} + 2n^2 v_A (-2w_{AB} + w_{B2})))(G_1 (1 - n^2 v_{A2}) w_{B2} + n^2 v_{B2} w_{A2} + 2H_1 v_{B2}) - (2(2H_1 v_{B2} + 2H_1 v_{A2} + n^2 v_{A2} w_{A2} + n^2 v_{B2} (-2w_{AB} + w_{B2}) + G_1 (-n^2 v_{B2} + 1) w_{B2} + 4G_1 n^2 v_{AB} w_{AB} + G_1 (1 - n^2 v_{A2}) v_{A2}) x (2n^2 v_{AB} w_{A2} + 4H_1 v_{AB} + 2G_1 n^2 v_{AB} w_{B2} + 2G_1 (1 - n^2 v_{A2}) w_{AB}) + 16B_1^2 n^2 v_{AB} v_{B2} - 8A_1 B_1 n^2 (2v_{A2} v_{B2} + 4v_{AB}^2) + 16A_1^2 n^2 v_{A2} v_{AB} - 8A_1 B_1 n^2 v_{B2}^2 + 16A_1^2 n^2 v_{AB} v_{B2} + (4(2A_1^2 n^2 v_{AB} + 2A_1 B_1 (-n^2 v_{B2} + 1) + 2A_1 B_1 (1 - n^2 v_{A2}) + 2B_1^2 n^2 v_{AB})) v_{B2} + (8(A_1^2 (1 - n^2 v_{A2}) + 4A_1 B_1 n^2 v_{AB} + B_1^2 (-n^2 v_{B2} + 1) + B_1^2 (1 - n^2 v_{A2}))) v_{AB} + (4(2A_1 B_1 (1 - n^2 v_{A2}) + 2B_1^2 n^2 v_{AB})) v_{A2} \quad (10)$ $Q_4 = (4(A_1^2 (-n^2 v_{B2}) + A_1^2 (1 - n^2 v_{A2}) + 4A_1 B_1 n^2 v_{AB} + B_1^2 (-n^2 v_{B2} + 1))) v_{B2} + (8(2A_1^2 n^2 v_{AB} + 2A_1 B_1 (-n^2 v_{B2} + 1) + 2A_1 B_1 (1 - n^2 v_{A2}) + 2B_1^2 n^2 v_{AB})) v_{AB} + (4(A_1^2 (1 - n^2 v_{A2}) + 4A_1 B_1 n^2 v_{AB} + B_1^2 (-n^2 v_{B2} + 1) + B_1^2 (1 - n^2 v_{A2}))) v_{A2} + 4B_1^2 n^2 (2v_{A2} v_{B2} + 4v_{AB}^2) - 32A_1 B_1 n^2 v_{A2} v_{AB} + 4A_1^2 n^2 v_{A2}^2 + 4B_1^2 n^2 v_{B2}^2 - 32A_1 B_1 n^2 v_{AB} v_{B2} + 4A_1^2 n^2 (2v_{A2} v_{B2} + 4v_{AB}^2) - (2(G_1 (-n^2 v_{B2} + 1) v_{A2} + n^2 v_{B2} (-2w_{AB} + w_{B2}) + 2H_1 v_{A2}))(G_1 (1 - n^2 v_{A2}) w_{B2} + n^2 v_{B2} w_{A2} + 2H_1 v_{B2}) - (2)(4H_1 v_{AB} + 2G_1 (-n^2 v_{B2} + 1) w_{AB} + 2G_1 n^2 v_{AB} v_{A2} + 2n^2 v_{AB} (-2w_{AB} w_{B2})) x (2n^2 v_{AB} w_{A2} + 4H_1 v_{AB} + 2G_1 n^2 v_{AB} w_{B2} + 2G_1 (1 - n^2 v_{A2}) w_{AB}) - (2H_1 v_{B2} + 2H_1 v_{A2} n^2 v_{A2} w_{A2} + n^2 v_{B2} (-2w_{AB} + w_{B2}) + G_1 (-n^2 v_{B2} + 1) w_{B2} + 4G_1 n^2 v_{AB} w_{AB} + G_1 (1 - n^2 v_{A2}) v_{A2})^2 \quad (11)$ $Q_3 = -(2(G_1 (-n^2 v_{B2} + 1) v_{A2} + n^2 v_{A2} (-2w_{AB} + w_{B2}) + 2H_1 v_{A2}))(2n^2 v_{AB} w_{A2} + 4H_1 v_{AB} + 2G_1 n^2 v_{AB} w_{B2} + 2G_1 (1 - n^2 v_{A2}) w_{AB}) - (2(4H_1 v_{AB} + 2G_1 (-n^2 v_{B2} + 1) w_{AB} + 2G_1 n^2 v_{AB} v_{A2} + 2n^2 v_{AB} (-2w_{AB} + w_{B2}))) x (2H_1 v_{B2} + 2H_1 v_{A2} + n^2 v_{A2} w_{A2} + n^2 v_{B2} (-2w_{AB} + w_{B2}) + G_1 (-n^2 v_{B2} + 1) w_{B2} + 4G_1 n^2 v_{AB} w_{AB} + G_1 (1 - n^2 v_{A2}) v_{A2}) + 16B_1^2 n^2 v_{A2} v_{AB} - 8A_1 B_1 n^2 v_{A2}^2 + 16B_1^2 n^2 v_{AB} v_{B2} - 8A_1 B_1 n^2 (2v_{A2} v_{B2} + 4v_{AB}^2) + 16A_1^2 n^2 v_{A2} v_{AB} + (4(2A_1^2 n^2 v_{AB} + 2A_1 B_1 (-n^2 v_{B2} + 1)))) v_{B2} + (8(A_1^2 (-n^2 v_{B2} + 1) + A_1^2 (1 - n^2 v_{A2}) + 4A_1 B_1 n^2 v_{AB} + B_1^2 (-n^2 v_{B2} + 1))) v_{AB} + (4(2A_1^2 n^2 v_{AB} + 2A_1 B_1 (-n^2 v_{B2} + 1) + 2A_1 B_1 (1 - n^2 v_{A2}) + 2B_1^2 n^2 v_{AB})) v_{A2} \quad (12)$ $Q_2 = 4A_1^2 (-n^2 v_{B2} + 1) v_{B2} + (8(2A_1^2 n^2 v_{AB} + 2A_1 B_1 (-n^2 v_{B2} + 1))) v_{AB} + (4(A_1^2 (-n^2 v_{B2} + 1) + A_1^2 (1 - n^2 v_{A2}) + 4A_1 B_1 n^2 v_{AB} + B_1^2 (-n^2 v_{B2} + 1))) v_{A2} + 4B_1^2 n^2 v_{A2}^2 + 4B_1^2 n^2 (2v_{A2} v_{B2} + 4v_{AB}^2) - 32A_1 B_1 n^2 v_{A2} v_{AB} + 4A_1^2 n^2 v_{A2}^2 - (2(G_1 (-n^2 v_{B2} + 1) v_{A2} + n^2 v_{A2} (-2w_{AB} + w_{B2}) + 2H_1 v_{A2})) x (2H_1 v_{B2} + 2H_1 v_{A2} + n^2 v_{A2} w_{A2} + n^2 v_{B2} (-2w_{AB} + w_{B2}) + G_1 (-n^2 v_{B2} + 1) w_{B2} + 4G_1 n^2 v_{AB} w_{AB} + G_1 (1 - n^2 v_{A2}) v_{A2}) - (4H_1 v_{AB} + 2G_1 (-n^2 v_{B2} + 1) w_{AB} + 2G_1 n^2 v_{AB} v_{A2} + 2n^2 v_{AB} (-2w_{AB} + w_{B2}))^2 \quad (13)$ $$Q_1 = 8A_1^2(-n^2v_{B2}+1)v_{AB}+(4(2A_1^2n^2v_{AB}+2A_1B_1 \\ (-n^2v_{B2}+1)))v_{A2}+16B_1^2n^2v_{A2}v_{AB}-BA_1B_1n^2v^2{}_{A2} \\ -(2(G_1(-n^2v_{B2}+1)v_{A2}+n^2v_{A2}(-2w_{AB}+w_{B2})+ \\ 2H_1v_{A2}))(4H_1v_{AB}+2G_1(-n^2v_{B2}+1)w_{AB}+ \\ 2G_1n^2v_{AB}v_{A2}+2n^2v_{AB}(-2w_{AB}+w_{B2})) \quad (14)$$

$$Q_0 = 4A_1^2(-n^2v_{B2}+1)v_{A2}-(G_1(-n^2v_{B2}+1)v_{A2}+n^2v_{A2} \\ (-2w_{AB}+w_{B2})+2H_1v_{A2})^2+4B_1^2n^2v^2{}_{A2} \quad (15)$$

In this example embodiment, equations (6)-(15) have at most three real roots; thus, for any four tangent lines, there are at most three possible ellipses that are tangent to all four lines and that satisfy the $a=a_0$ constraint. (In some instances, there may be fewer than three real roots.) For each real root $\theta$, the corresponding values of $(x_C, y_C)$ and b can be readily determined. Depending on the particular inputs, zero or more solutions will be obtained; for example, in some instances, three solutions can be obtained for a typical configuration of tangents. Each solution is completely characterized by the parameters $\{\theta, a=a_0, b, (x_C, y_C)\}$. Alternatively, or additionally, a model builder 197C and model updater 197D provide (FIG. 8A) functionality to define, build and/or customize model(s) 197B using one or more components in object library 197A. Once built, model refiner 197F updates and refines the model, bringing the predictive information of the model in line with observed information from the detection system 90A.

The model subcomponents 197-1, 197-2 and 197-3 can be scaled, sized, selected, rotated, translated, moved, or otherwise re-ordered to enable portions of the model corresponding to the virtual surface(s) to conform within the points 193 in space. Model refiner 197F employs a variation detector 197G to substantially continuously determine differences between sensed information and predictive information and provide to model refiner 197F a variance useful to adjust the model 197B accordingly. Variation detector 197G and model refiner 197F are further enabled to correlate among model portions to preserve continuity with characteristic information of a corresponding object being modeled, continuity in motion, and/or continuity in deformation, conformation and/or torsional rotations.

In an embodiment, when the control object morphs, conforms, and/or translates, motion information reflecting such motion(s) is included into the observed information. Points in space can be recomputed based on the new observation information. The model subcomponents can be scaled, sized, selected, rotated, translated, moved, or otherwise re-ordered to enable portions of the model corresponding to the virtual surface(s) to conform within the set of points in space.

In an embodiment, motion(s) of the control object can be rigid transformation, in which case, points on the virtual surface(s) remain at the same distance(s) from one another through the motion. Motion(s) can be non-rigid transformations, in which points on the virtual surface(s) can vary in distance(s) from one another during the motion. In an embodiment, observation information can be used to adjust (and/or recomputed) predictive information thereby enabling "tracking" the control object. In embodiments, control object can be tracked by determining whether a rigid transformation or a non-rigid transformation occurs. In an embodiment, when a rigid transformation occurs, a transformation matrix is applied to each point of the model uniformly. Otherwise, when a non-rigid transformation occurs, an error indication can be determined, and an error minimization technique such as described herein above can be applied. In an embodiment, rigid transformations and/or non-rigid transformations can be composed. One example composition embodiment includes applying a rigid transformation to predictive information. Then an error indication can be determined, and an error minimization technique such as described herein above can be applied. In an embodiment, determining a transformation can include calculating a rotation matrix that provides a reduced RMSD (root mean squared deviation) between two paired sets of points. One embodiment can include using Kabsch Algorithm to produce a rotation matrix. In an embodiment and by way of example, one or more force lines can be determined from one or more portions of a virtual surface.

Collisions

In an embodiment, predictive information can include collision information concerning two or more capsoloids. By means of illustration, several possible fits of predicted information to observed information can be removed from consideration based upon a determination that these potential solutions would result in collisions of capsoloids. In an embodiment, a relationship between neighboring capsoloids, each having one or more attributes (e.g., determined minima and/or maxima of intersection angles between capsoloids) can be determined. In an embodiment, determining a relationship between a first capsoloid having a first set of attributes and a second capsoloid having a second set of attributes includes detecting and resolving conflicts between first attribute and second attributes. For example, a conflict can include a capsoloid having one type of angle value with a neighbor having a second type of angle value incompatible with the first type of angle value. Attempts to attach a capsoloid with a neighboring capsoloid having attributes such that the combination will exceed what is allowed in the observed—or to pair incompatible angles, lengths, shapes, or other such attributes—can be removed from the predicted information without further consideration.

Lean Model

In an embodiment, predictive information can be artificially constrained to capsoloids positioned in a subset of the observed information thereby enabling creation of a "lean model". For example, as illustrated in FIG. 8B, capsoloid 197-3 could be used to denote the portion of the observed without addition of capsoloids 197-2. In a yet further embodiment, connections can be made using artificial constructs to link together capsoloids of a lean model. In another embodiment, the predictive information can be constrained to a subset of topological information about the observed information representing the control object to form a lean model. In an embodiment, a lean model can be associated with a full predictive model. The lean model (or topological information, or properties described above) can be extracted from the predictive model to form a constraint. Then, the constraint can be imposed on the predictive information thereby enabling the predictive information to be constrained in one or more of behavior, shape, total (system) energy, structure, orientation, compression, shear, torsion, other properties, and/or combinations thereof.

Occlusions

In an embodiment, the observed can include components reflecting portions of the control object which are occluded from view of the device ("occlusions" or "occluded components"). In one embodiment, the predictive information can be "fit" to the observed as described herein above with the additional constraint(s) that some total property of the predictive information (e.g., potential energy) be minimized or maximized (or driven to lower or higher value(s) through iteration or solution). Properties can be derived from nature, properties of the control object being viewed, others, and/or combinations thereof. In another embodiment, as shown by FIGS. 8B and 8C, a deformation of the predictive information subcomponent 197-2, 197-3 can be allowed subject to an overall permitted value of compression, deformation, flexibility, others, and/or combinations thereof.

Friction

In an embodiment, a "friction constraint" is applied on the model 197B-1. For example, if fingers of a hand being modeled are close together (in position or orientation), corresponding portions of the model will have more "friction". The more friction a model subcomponent has in the model, the less the subcomponent moves in response to new observed information. Accordingly the model is enabled to mimic the way portions of the hand that are physically close together move together, and move less overall.

An environmental filter 197H reduces extraneous noise in sensed information received from the detection system 90A using environmental information to eliminate extraneous elements from the sensory information. Environmental filter 197H employs contrast enhancement, subtraction of a difference image from an image, software filtering, and background subtraction (using background information provided by objects of interest determiner 198H (see below) to enable model refiner 197F to build, refine, manage and maintain model(s) 197B of objects of interest from which control inputs can be determined.

A model analyzer 197I determines that a reconstructed shape of a sensed object portion matches an object model in an object library; and interprets the reconstructed shape (and/or variations thereon) as user input. Model analyzer 197I provides output in the form of object, position, motion and attribute information to an interaction system 90C.

Figure 8D:
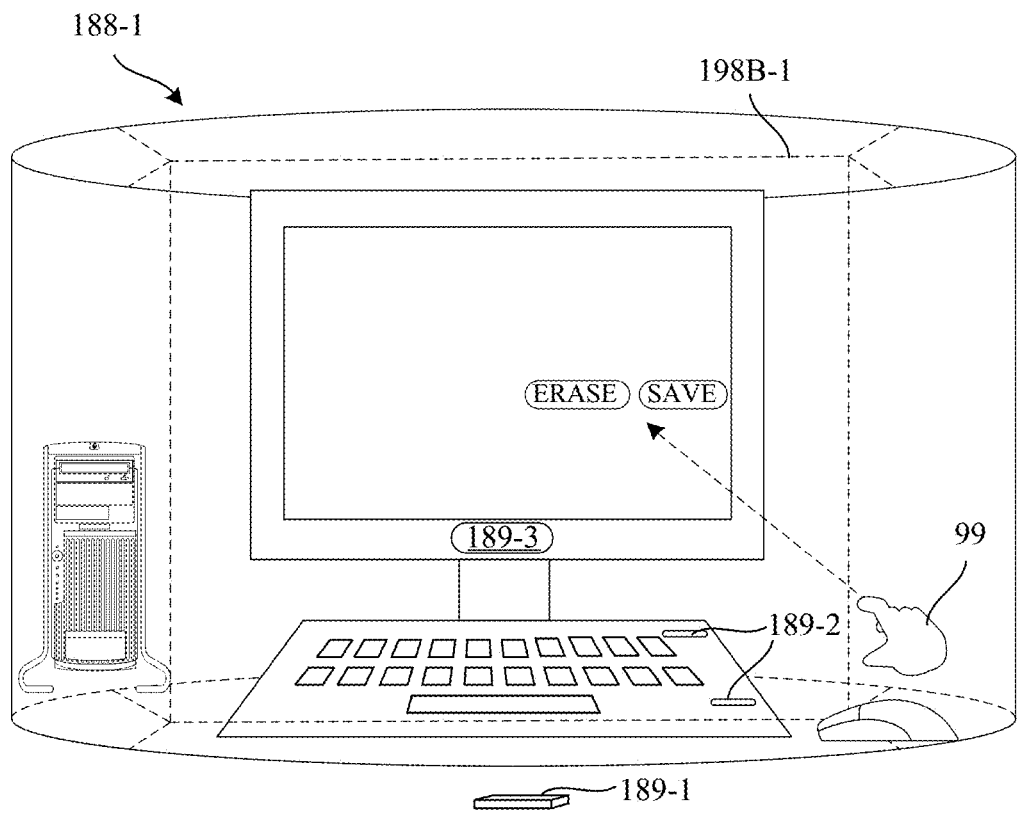
Figure 8E:
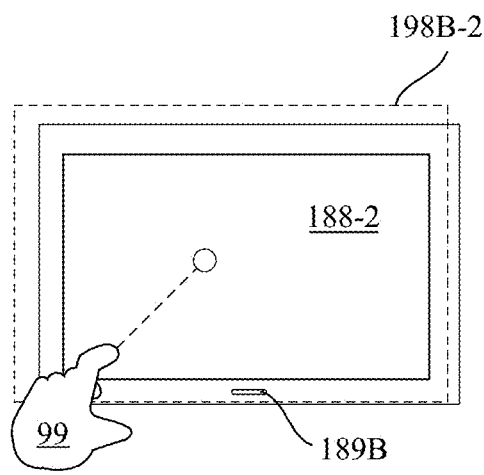

Again with reference to FIG. 8A, an interaction system 90C includes an interaction interpretation module 198 that provides functionality to recognize command and other information from object, position, motion and attribute information obtained from variation system 90B. An interaction interpretation module 198 embodiment comprises a recognition engine 198F to recognize command information such as command inputs (i.e., gestures and/or other command inputs (e.g., speech, etc.)), related information (i.e., biometrics), environmental information (i.e., context, noise, etc.) and other information discernable from the object, position, motion and attribute information that might be useful in controlling a machine. Recognition engine 198F employs gesture properties 198A (e.g., path, velocity, acceleration, etc.), control objects determined from the object, position, motion and attribute information by an objects of interest determiner 198H and optionally one or more virtual constructs 198B (see e.g., FIGS. 8D, 8E: 198B-1, 198B-2) to recognize variations in control object presence or motion indicating command information, related information, environmental information and other information discernable from the object, position, motion and attribute information that might be useful in controlling a machine. With reference to FIGS. 8D, 8E, virtual construct 198B-1, 198B-2 implement an engagement target with which a control object 99 interacts enabling MSCS 189 to discern variations in control object (i.e., motions into, out of or relative to virtual construct 198B) as indicating control or other useful information. A gesture trainer 198C and gesture properties extractor 198D provide functionality to define, build and/or customize gesture properties 198A.

A context determiner 198G and object of interest determiner 198H provide functionality to determine from the object, position, motion and attribute information objects of interest (e.g., control objects, or other objects to be modeled and analyzed), objects not of interest (e.g., background) based upon a detected context. For example, when the context is determined to be an identification context, a human face will be determined to be an object of interest to the system and will be determined to be a control object. On the other hand, when the context is determined to be a fingertip control context, the finger tips will be determined to be object(s) of interest and will be determined to be a control objects whereas the user's face will be determined not to be an object of interest (i.e., background). Further, when the context is determined to be a styli (or other tool) held in the fingers of the user, the tool tip will be determined to be object of interest and a control object whereas the user's fingertips might be determined not to be objects of interest (i.e., background). Background objects can be included in the environmental information provided to environmental filter 197H of model management module 197.

A virtual environment manager 198E provides creation, selection, modification and de-selection of one or more virtual constructs 198B (see FIGS. 8D, 8E). In some embodiments, virtual constructs (e.g., a virtual object defined in space; such that variations in real objects relative to the virtual construct, when detected, can be interpreted for control or other purposes (see FIGS. 8D, 8E)) are used to determine variations (i.e., virtual "contact" with the virtual construct, breaking of virtual contact, motion relative to a construct portion, etc.) to be interpreted as engagements, dis-engagements, motions relative to the construct(s), and so forth, enabling the system to interpret pinches, pokes and grabs, and so forth. Interaction interpretation module 198 provides as output the command information, related information and other information discernable from the object, position, motion and attribute information that might be useful in controlling a machine from recognition engine 198F to an application control system 90D. Further with reference to FIG. 8A, an application control system 90D includes a control module 199 that provides functionality to determine and authorize commands based upon the command and other information obtained from interaction system 90C.

A control module 199 embodiment comprises a command engine 199F to determine whether to issue command(s) and what command(s) to issue based upon the command information, related information and other information discernable from the object, position, motion and attribute information, as received from an interaction interpretation module 198. Command engine 199F employs command/control repository 199A (e.g., application commands, OS commands, commands to MSCS, misc. commands) and related information indicating context received from the interaction interpretation module 198 to determine one or more commands corresponding to the gestures, context, etc. indicated by the command information. For example, engagement gestures can be mapped to one or more controls, or a control-less screen location, of a presentation device associated with a machine under control. Controls can include imbedded controls (e.g., sliders, buttons, and other control objects in an application), or environmental level controls (e.g., windowing controls, scrolls within a window, and other controls affecting the control environment). In embodiments, controls may be displayed using 2D presentations (e.g., a cursor, cross-hairs, icon, graphical representation of the control object, or other displayable object) on display screens and/or presented in 3D forms using holography, projectors or other mechanisms for creating 3D presentations, or audible (e.g., mapped to sounds, or other mechanisms for conveying audible information) and/or touchable via haptic techniques.

Further, an authorization engine 199G employs biometric profiles 199B (e.g., users, identification information, privileges, etc.) and biometric information received from the interaction interpretation module 198 to determine whether commands and/or controls determined by the command engine 199F are authorized. A command builder 199C and biometric profile builder 199D provide functionality to define, build and/or customize command/control repository 199A and biometric profiles 199B.

Selected authorized commands are provided to machine(s) under control (i.e., "client") via interface layer 196. Commands/controls to the virtual environment (i.e., interaction control) are provided to virtual environment manager 198E. Commands/controls to the emission/detection systems (i.e., sensory control) are provided to emission module 91 and/or detection module 92 as appropriate.

In various embodiments and with reference to FIGS. 8D, 8E, a Machine Sensory Controller System 189 can be embodied as a standalone unit(s) 189-1 coupleable via an interface (e.g., wired or wireless)), embedded (e.g., within a machine 188-1, 188-2 or machinery under control) (e.g., FIG. 8D: 189-2, 189-3, FIG. 8E: 189B) or combinations thereof.

Figure 9:
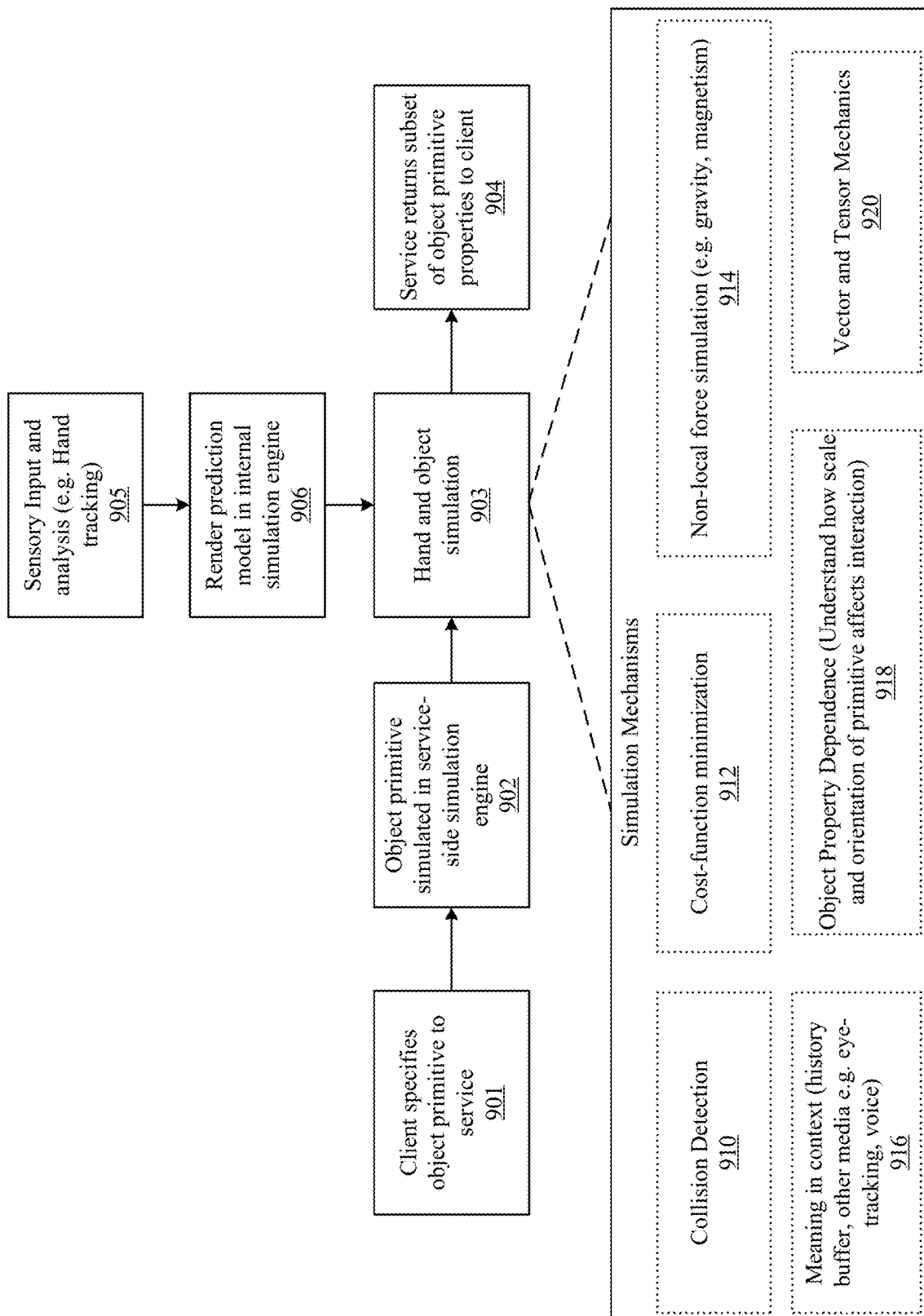
FIG. 9 illustrates a sensory augmentation system to add simulated sensory information to a virtual reality input according to an implementation.

FIG. 9 illustrates a sensory augmentation system to add simulated sensory information to a virtual reality input. The system is adapted to receive a virtual reality input including a primitive (901). Virtual reality primitives can include e.g., virtual character, virtual environment, others, or properties thereof. The primitive is simulated by a service side simulation engine (902). Information about a physical environment is sensed and analyzed (905). See also FIGS. 7A, 7B, 7C, 8A, 8D, and 8E. A predictive information (e.g., model, etc.) is rendered in an internal simulation engine (906). Predictive information and processes for rendering predictive models are described in further detail with reference to FIGS. 8D, 8E. Hands and/or other object types are simulated (903) based upon results of the object primitive simulation in the service side simulation engine and the results of the prediction information rendered in an internal simulation engine. (See also FIG. 8A: 197I). In embodiments, various simulation mechanisms 910-920 are employed alone or in conjunction with one another as well as other existing/emerging simulation mechanisms and/or some combination thereof can also be utilized in accordance with the requirements of a particular implementation. The service returns as a result a subset of object primitive properties to the client (904). Object primitive properties can be determined from the simulation mechanisms 910-920, the predictive information, or combinations thereof.

In an embodiment, a simulation mechanism comprises simulating the effect of a force (914). In an embodiment, a simulation mechanism comprises minimizing a cost function (912).

In an embodiment, a simulation mechanism comprises detecting a collision (910).

In an embodiment, a simulation mechanism comprises determining a meaning in context (916). Sometimes, determining a meaning in context further comprises eye tracking.

In some applications determining a meaning in context further comprises recognizing at least one parameter of the human voice.

In an embodiment, a simulation mechanism comprises recognizing an object property dependence (e.g., understanding how scale and orientation of primitive affects interaction.

In an embodiment, a simulation mechanism comprises vector or tensor mechanics (920).

Figure 10:
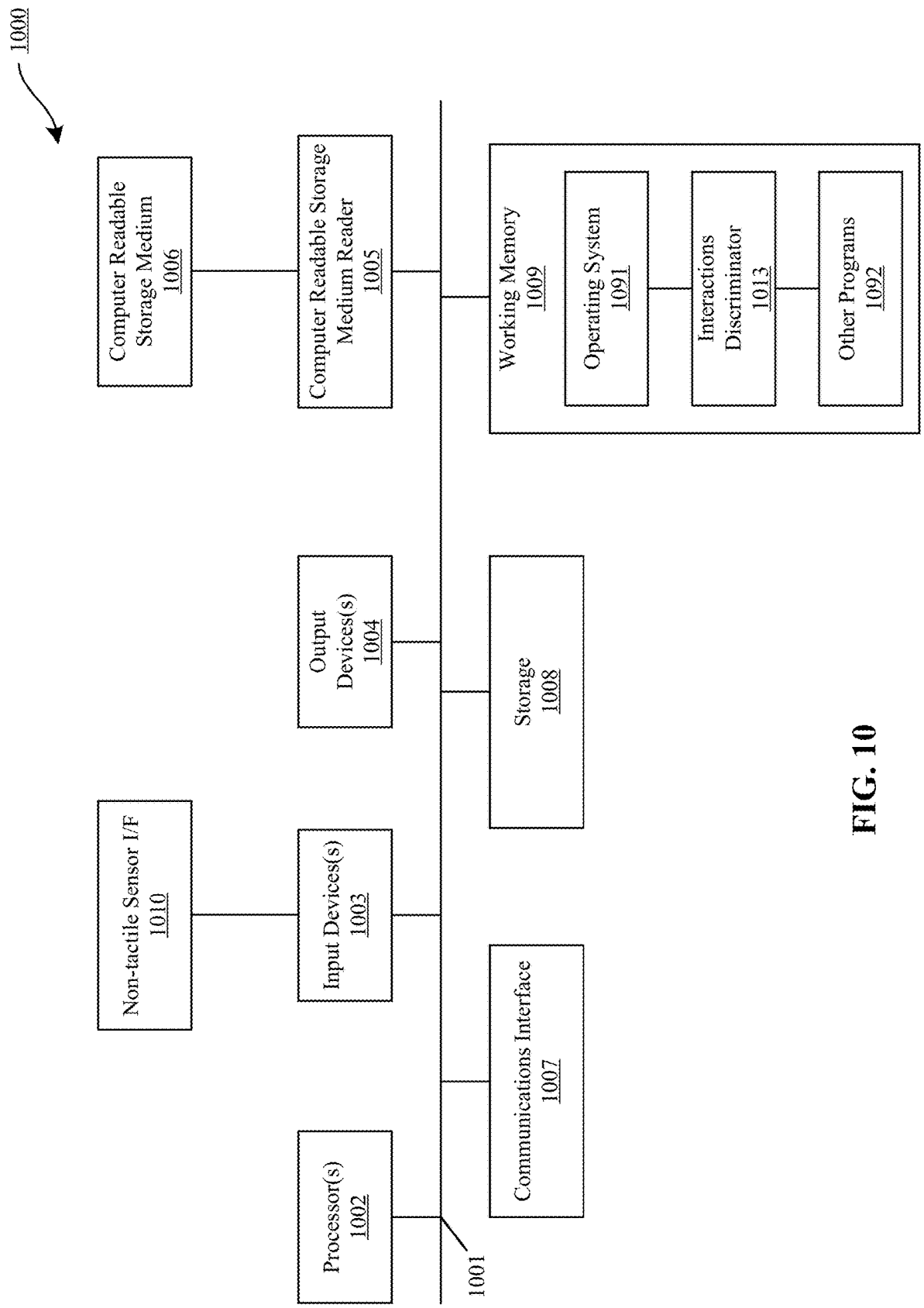
FIG. 10 illustrates an example computing system according to an implementation.

FIG. 10 illustrates an example computing system 1000, such as a PC (or other suitable "processing" system), that can comprise one or more of the MSCS elements shown in FIGS. 7A, 7B, 7C, 8A, 8D, and 8E according to an embodiment. While other application-specific device/process alternatives might be utilized, such as those already noted, it will be presumed for clarity sake that systems 90A-90D elements (FIGS. 7A, 7B, 7C, 8A, 8D, and 8E) are implemented by one or more processing systems consistent therewith, unless otherwise indicated.

As shown, computer system 1000 comprises elements coupled via communication channels (e.g. bus 1001) including one or more general or special purpose processors 1002, such as a Pentium® or Power PC®, digital signal processor ("DSP"), or other processing. System 1000 elements also include one or more input devices 1003 (such as a mouse, keyboard, joystick, microphone, remote control unit, (Non-) tactile sensors 1010, biometric or other sensors 93 of FIG. 7A, and so on), and one or more output devices 1004, such as a suitable display, joystick feedback components, speakers, biometric or other actuators, and so on, in accordance with a particular application.

System 1000 elements also include a computer readable storage media reader 1005 coupled to a computer readable storage medium 1006, such as a storage/memory device or hard or removable storage/memory media; examples are further indicated separately as storage device 1008 and non-transitory memory 1009, which can include hard disk variants, floppy/compact disk variants, digital versatile disk ("DVD") variants, smart cards, read only memory, random access memory, cache memory or others, in accordance with a particular application (e.g. see data store(s) 197A, 198A, 199A and 199B of FIG. 8A). One or more suitable communication devices 1007 can also be included, such as a modem, DSL, infrared, etc. for providing inter-device communication directly or via suitable private or public networks, such as the Internet. Working memory 1009 is further indicated as including an operating system ("OS") 1091, interaction discriminator 1013 and other programs 1092, such as application programs, mobile code, data, or other information for implementing systems 90A-90D elements, which might be stored or loaded therein during use.

System 1000 element implementations can include hardware, software, firmware or a suitable combination. When implemented in software (e.g. as an application program, object, downloadable, servlet, and so on, in whole or part), a system 1000 element can be communicated transitionally or more persistently from local or remote storage to memory for execution, or another suitable mechanism can be utilized, and elements can be implemented in compiled, simulated, interpretive or other suitable forms. Input, intermediate or resulting data or functional elements can further reside more transitionally or more persistently in a storage media or memory, (e.g. storage device 1008 or memory 1009) in accordance with a particular application.

Certain potential interaction determination, virtual object selection, authorization issuances and other aspects enabled by input/output processors and other element embodiments disclosed herein can also be provided in a manner that enables a high degree of broad or even global applicability; these can also be suitably implemented at a lower hardware/software layer. Note, however, that aspects of such elements can also be more closely linked to a particular application type or machine, or might benefit from the use of mobile code, among other considerations; a more distributed or loosely coupled correspondence of such elements with OS processes might thus be more desirable in such cases.

Figure 11A:
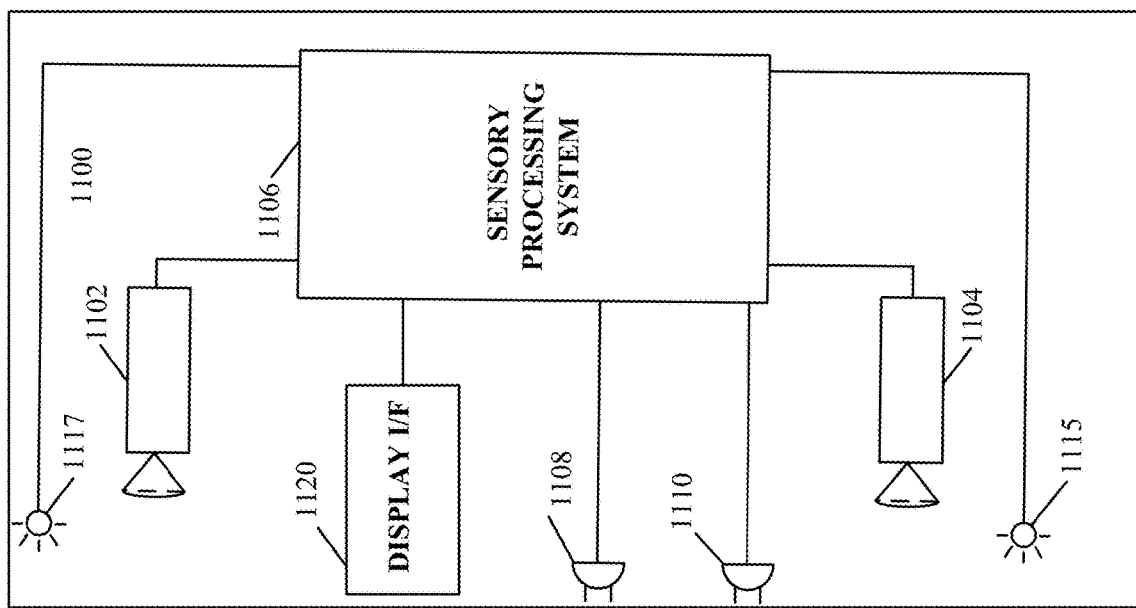
Figure 11A:
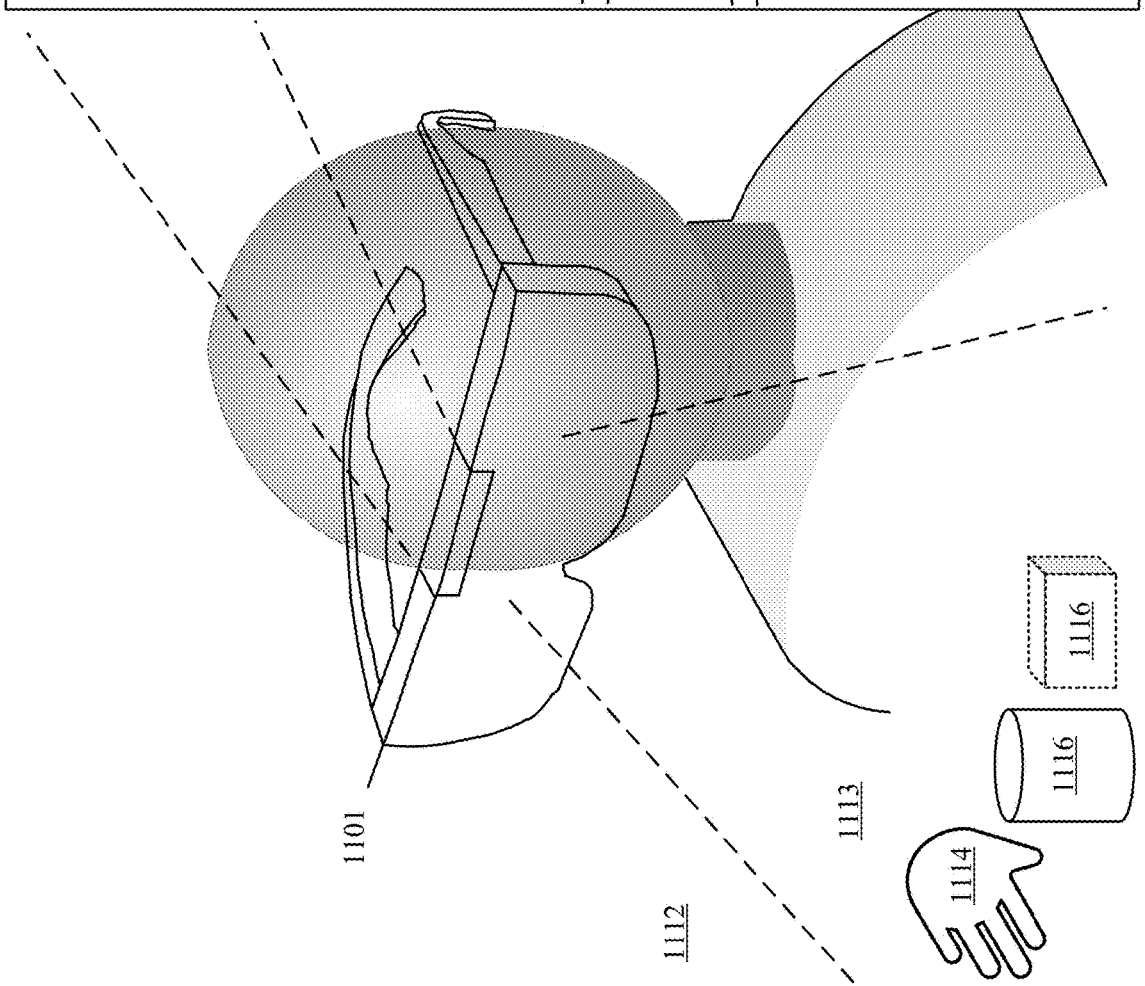

FIG. 11A illustrates a system for capturing image and other sensory data according to an implementation of the technology disclosed.

Refer first to FIG. 11A, which illustrates a system for capturing image data according to one implementation of the technology disclosed. System 1100 is preferably coupled to a wearable device 1101 that can be a personal head mounted display (HMD) having a goggle form factor such as shown in FIG. 11A, a helmet form factor, or can be incorporated into or coupled with a watch, smartphone, or other type of portable device.

In various implementations, the system and method for capturing 3D motion of an object as described herein can be integrated with other applications, such as a head-mounted device or a mobile device. Referring again to FIG. 11A, a head-mounted device 1101 can include an optical assembly that displays a surrounding environment or a virtual environment to the user; incorporation of the motion-capture system 1100 in the head-mounted device 1101 allows the user to interactively control the displayed environment. For example, a virtual environment can include virtual objects that can be manipulated by the user's hand gestures, which are tracked by the motion-capture system 1100. In one implementation, the motion-capture system 1100 integrated with the head-mounted device 1101 detects a position and shape of user's hand and projects it on the display of the head-mounted device 1100 such that the user can see her gestures and interactively control the objects in the virtual environment. This can be applied in, for example, gaming or Internet browsing.

In one embodiment, information about the interaction with a virtual object can be shared by a first HMD user with a HMD of a second user. For instance, a team of surgeons can collaborate by sharing with each other virtual incisions to be performed on a patient. In some embodiments, this is achieved by sending to the second user the information about the virtual object, including primitive(s) indicating at least one of a type, size, and/or features and other information about the calculation point(s) used to detect the interaction. In other embodiments, this is achieved by sending to the second user information about the predictive model used to track the interaction.

System 1100 includes any number of cameras 1102, 1104 coupled to sensory processing system 1106. Cameras 1102, 1104 can be any type of camera, including cameras sensitive across the visible spectrum or with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 1102, 1104 are preferably capable of capturing video images (i.e., successive image frames at a constant rate of at least 15 frames per second); although no particular frame rate is required. The capabilities of cameras 1102, 1104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

As shown, cameras 1102, 1104 can be oriented toward portions of a region of interest 1112 by motion of the device 1101, in order to view a virtually rendered or virtually augmented view of the region of interest 1112 that can include a variety of virtual objects 1116 as well as contain an object of interest 1114 (in this example, one or more hands) moves within the region of interest 1112. One or more sensors 1108, 1110 capture motions of the device 1101. In some implementations, one or more light sources 1115, 1117 are arranged to illuminate the region of interest 1112. In some implementations, one or more of the cameras 1102, 1104 are disposed opposite the motion to be detected, e.g., where the hand 1114 is expected to move. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Sensory processing system 1106, which can be, e.g., a computer system, can control the operation of cameras 1102, 1104 to capture images of the region of interest 1112 and sensors 1108, 1110 to capture motions of the device 1101. Information from sensors 1108, 1110 can be applied to models of images taken by cameras 1102, 1104 to cancel out the effects of motions of the device 1101, providing greater accuracy to the virtual experience rendered by device 1101. Based on the captured images and motions of the device 1101, sensory processing system 1106 determines the position and/or motion of object 1114.

For example, as an action in determining the motion of object 1114, sensory processing system 1106 can determine which pixels of various images captured by cameras 1102, 1104 contain portions of object 1114. In some implementations, any pixel in an image can be classified as an "object" pixel or a "background" pixel depending on whether that pixel contains a portion of object 1114 or not. Object pixels can thus be readily distinguished from background pixels based on brightness. Further, edges of the object can also be readily detected based on differences in brightness between adjacent pixels, allowing the position of the object within each image to be determined. In some implementations, the silhouettes of an object are extracted from one or more images of the object that reveal information about the object as seen from different vantage points. While silhouettes can be obtained using a number of different techniques, in some implementations, the silhouettes are obtained by using cameras to capture images of the object and analyzing the images to detect object edges. Correlating object positions between images from cameras 1102, 1104 and cancelling out captured motions of the device 1101 from sensors 1108, 1110 allows sensory processing system 1106 to determine the location in 3D space of object 1114, and analyzing sequences of images allows sensory processing system 1106 to reconstruct 3D motion of object 1114 using conventional motion algorithms or other techniques. See, e.g., U.S. patent application Ser. No. 13/414,485 (filed on Mar. 7, 2012) and U.S. Provisional Patent Application Nos. 61/724,091 (filed on Nov. 8, 2012) and 61/587,554 (filed on Jan. 7, 2012), the entire disclosures of which are hereby incorporated by reference.

Presentation interface 1120 employs projection techniques in conjunction with the sensory based tracking in order to present virtual (or virtualized real) objects (visual, audio, haptic, and so forth) created by applications loadable to, or in cooperative implementation with, the device 1101 to provide a user of the device with a personal virtual experience. Projection can include an image or other visual representation of an object.

One implementation uses motion sensors and/or other types of sensors coupled to a motion-capture system to monitor motions within a real environment. A virtual object integrated into an augmented rendering of a real environment can be projected to a user of a portable device 1101. Motion information of a user body portion can be determined based at least in part upon sensory information received from imaging 1102, 1104 or acoustic or other sensory devices. Control information is communicated to a system based in part on a combination of the motion of the portable device 1101 and the detected motion of the user determined from the sensory information received from imaging 1102, 1104 or acoustic or other sensory devices. The virtual device experience can be augmented in some implementations by the addition of haptic, audio and/or other sensory information projectors. For example, an optional video projector 1120 can project an image of a page (e.g., virtual device) from a virtual book object superimposed upon a real world object, e.g., desk 1116 being displayed to a user via live video feed; thereby creating a virtual device experience of reading an actual book, or an electronic book on a physical e-reader, even though no book nor e-reader is present. Optional haptic projector can project the feeling of the texture of the "virtual paper" of the book to the reader's finger. Optional audio projector can project the sound of a page turning in response to detecting the reader making a swipe to turn the page. Because it is a virtual reality world, the back side of hand 1114 is projected to the user, so that the scene looks to the user as if the user is looking at the user's own hand(s).

A plurality of sensors 1108, 1110 coupled to the sensory processing system 1106 to capture motions of the device 1101. Sensors 1108, 1110 can be any type of sensor useful for obtaining signals from various parameters of motion (acceleration, velocity, angular acceleration, angular velocity, position/locations); more generally, the term "motion detector" herein refers to any device (or combination of devices) capable of converting mechanical motion into an electrical signal. Such devices can include, alone or in various combinations, accelerometers, gyroscopes, and magnetometers, and are designed to sense motions through changes in orientation, magnetism or gravity. Many types of motion sensors exist and implementation alternatives vary widely.

The illustrated system 1100 can include any of various other sensors not shown in FIG. 11A for clarity, alone or in various combinations, to enhance the virtual experience provided to the user of device 1101. For example, in low-light situations where free-form gestures cannot be recognized optically with a sufficient degree of reliability, system 1106 may switch to a touch mode in which touch gestures are recognized based on acoustic or vibrational sensors. Alternatively, system 1106 may switch to the touch mode, or supplement image capture and processing with touch sensing, when signals from acoustic or vibrational sensors are sensed. In still another operational mode, a tap or touch gesture may act as a "wake up" signal to bring the image and audio analysis system 1106 from a standby mode to an operational mode. For example, the system 1106 may enter the standby mode if optical signals from the cameras 1102, 1104 are absent for longer than a threshold interval.

It will be appreciated that the objects shown in FIG. 11A are illustrative. In some implementations, it may be desirable to house the system 1100 in a differently shaped enclosure or integrated within a larger component or assembly. Furthermore, the number and type of image sensors, motion detectors, illumination sources, and so forth are shown schematically for the clarity, but neither the size nor the number is the same in all implementations.

Reference in the specification to "one embodiment" or "an embodiment" means that a particular feature, structure, or characteristic described in connection with the embodiment is included in at least one embodiment of the technology disclosed. The appearances of the phrase "in one embodiment" in various places in the specification are not necessarily all referring to the same embodiment.

Spring Zooming Camera Movement

Figure 11B:
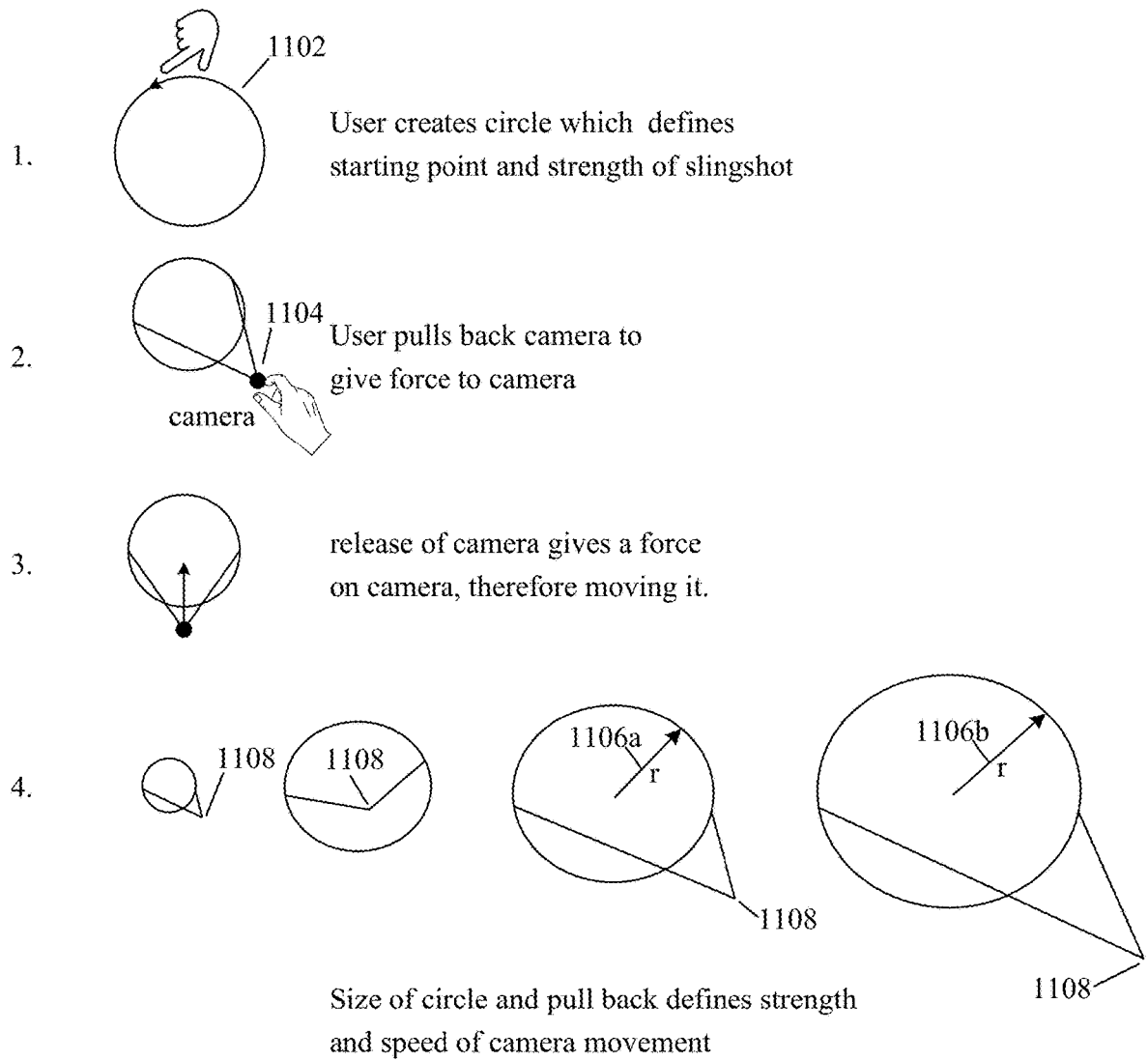

FIGS. 11B, 11C and 11D illustrate an example of a "spring zooming" camera movement of a virtual camera in a three dimensional (3D) sensor space. In one implementation, a user can "pull" the virtual camera 1142 (as enabled by MSCS), using manipulation points, analytic fits, or other type of mechanics that emulate spring dynamics. When the user "releases" the camera, the camera can then move as if it were a bob of constant mass on a spring. In other implementations, the camera movement stops after a fixed number of oscillations of this virtual spring. In yet another implementation, such spring movement describes a one-directional camera trajectory from one fixed point to another.

FIG. 11B illustrates the configuration of an example "slingshot" in 4 frames, where the slingshot moves the camera from a one-directional camera trajectory from one fixed point to another. This motion is calculated by both the radius of the control circle and the "pull back" of the camera. The first frame indicates the creation of a control circle 1102, which defines a starting point and strength of the "slingshot". In frame 2, the user pulls back the camera 1104 to provide an input of force to be applied to the camera 1104. In frame 3, release of the camera 1104 applies the virtual force to the camera thereby moving the camera to a new position in space. In frame 4, depicted is where the radius of the control circle 1106 as well as the distance of the pullback 1108 of the camera 1104 identifies the force that will be applied to the camera 1104 when the camera is released.

FIG. 11C illustrates an alternative example of a slingshot camera movement implementation in which a virtual spring is employed where the camera moves as if it were a bob of constant mass on a spring. In a frame 1, a user stroke 1132 defines some contour relative to the camera 1134. In one implementation, a circle of best-fit is fit to a plurality of points on this contour. In frame 2, the radius 1136 of the circle 1132 defines at least one parameter of a spring, the spring constant k. The static length of a spring 1 is defined by a length 1138 which extends from the center of the circle to the current position of the camera 1134. In this example, the spring constant k 1140 is equal to the radius of the circle 1136.

In frame 3, illustrated is using Hooke's law, which is stated as F=−kX where k is the spring constant 1142 and X 1144 is the distance that the spring is extended, the potential energy in the spring after it is pulled back will be equal to ½ kX². Once the camera is released this potential energy will move the camera toward the center of the circle. In one implementation the camera will have a given mass, and acceleration will be constant. This allows the calculation of the velocity of the camera once it is released. In this example the camera will move along the trajectory defined by the pull back, FIG. 11D illustrates in frame 4 a slingshot camera movement result where the camera is released once it traverses the vector created by the pull back. Once the camera has travelled the distance X 1144 of FIG. 11C, which can be defined as the distance of the camera from the center of the circle 'd' minus the starting point of the camera '1' 1162 the spring is effectively removed from the force equation, allowing the camera to move as it would if no other forces were applied. In frame 5 of FIG. 11D, the spring constant 'k' can be multiplied by a relationship between the spring constant and the radius of the circle, where a larger radius 1164 signifies a larger number of springs. For example, a radius of 2 can indicate 1 spring, a radius of 4 can indicate 2 springs, and so on.

Camera Selection Controls

Figure 12A:
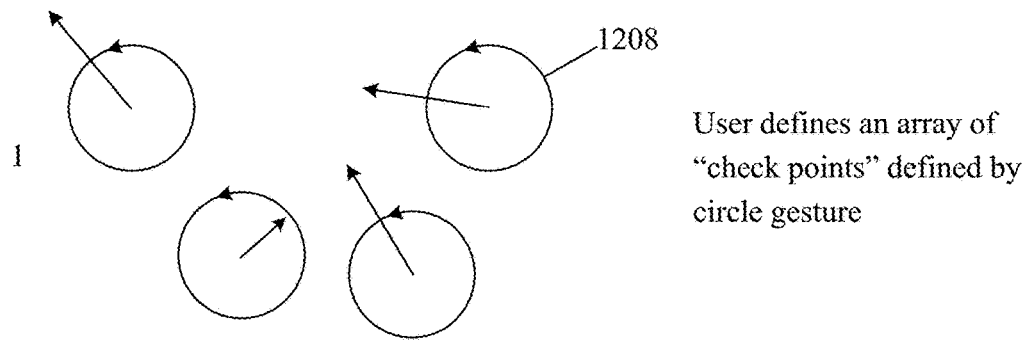
Figure 12A:
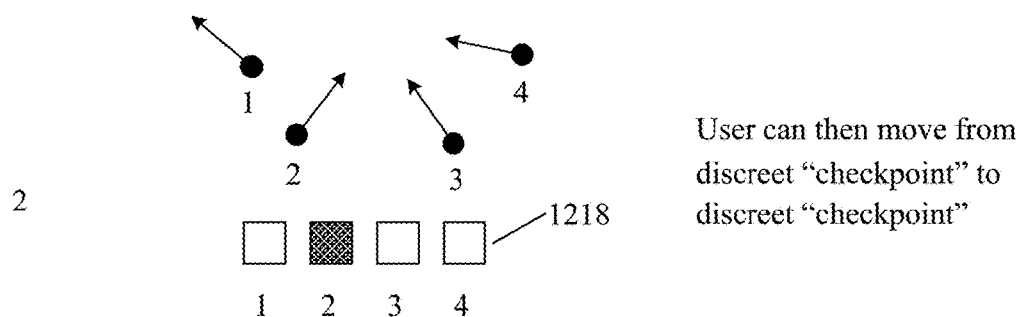
Figure 12A:
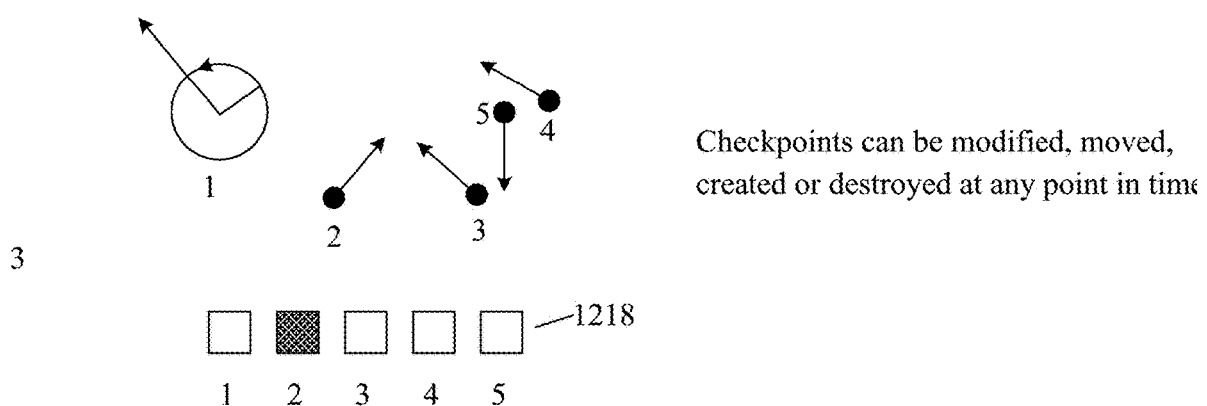
Figure 12C:
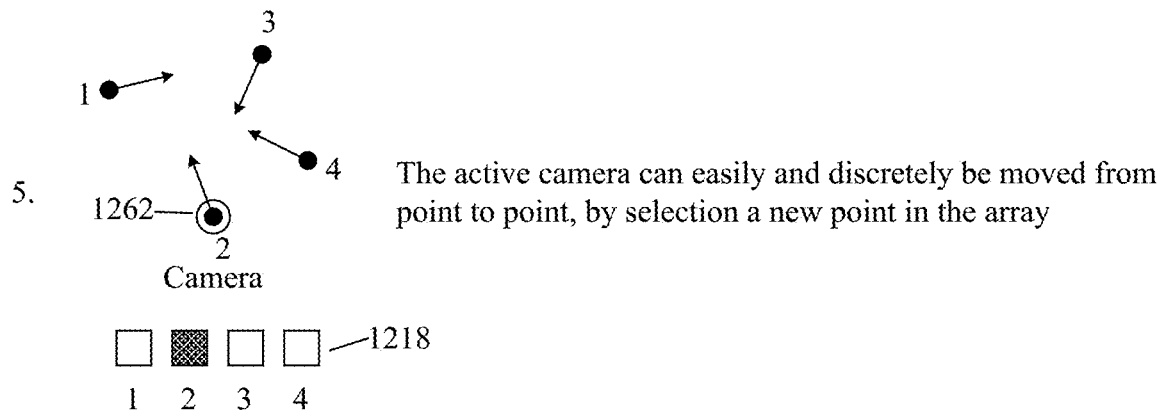
Figure 12C:
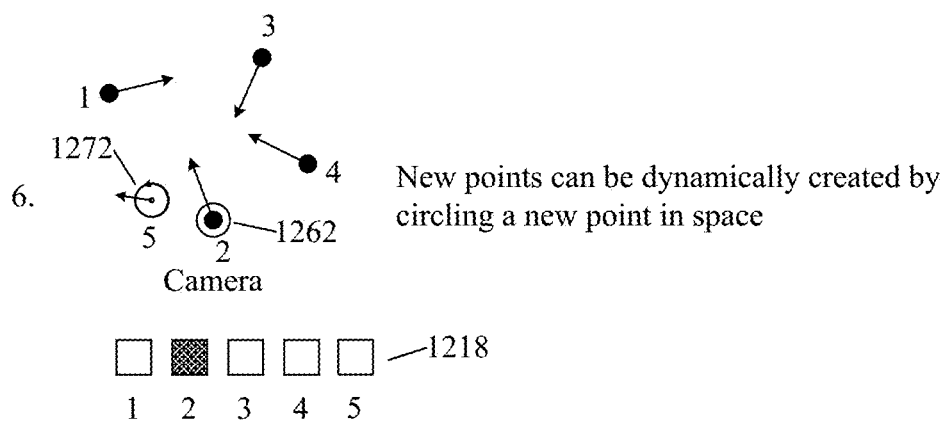
Figure 12C:
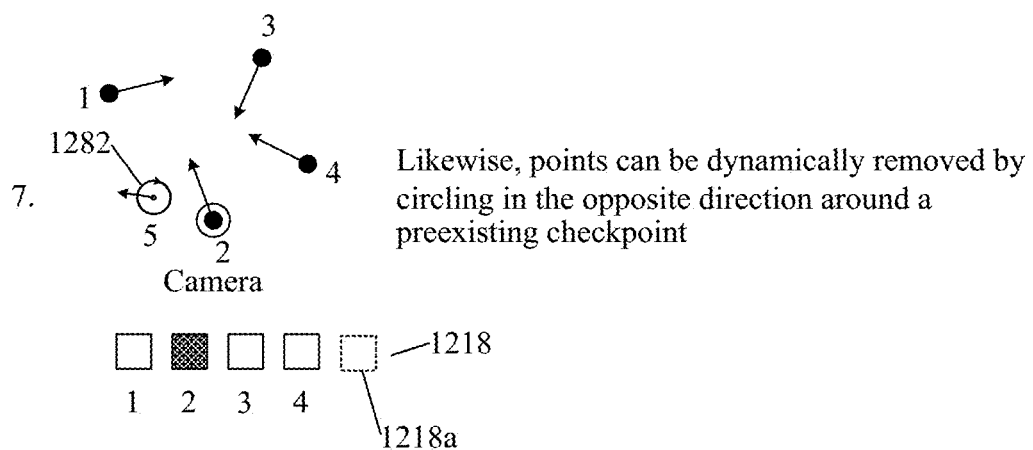

FIGS. 12A-12C illustrate defining and controlling multiple virtual cameras in a three dimensional (3D) sensor space. In one implementation, after setting the context to creating a camera, a user defines at least one point with a direction vector in virtual space 1208. This point and vector defines a "camera selector." The user can iterate through a plurality of such predefined camera controls using an array 1218 of selectors. In other implementations, iteration through checkpoints can be enabled by a visual interaction element, which represents at least one such-defined camera selector. In one implementation, interactions with camera selectors can be enabled by vector-space interactions with interaction elements. In some other implementations, cameras can be created or destroyed by circle gestures around the cameras in virtual space, their visual representation, or combinations thereof. In yet other implementations, circle gestures can be defined as the circle of best fit to contours as described herein.

FIG. 12A illustrates checkpoint camera controls in three frames. A so-called checkpoint sets a camera perspective, including location, view direction, focal length of the camera, and a selector box in an array of selector boxes. For instance, perspective 1208 is defined by a circle gesture in frame 1. The anchor is at the center of the circle. A menu, for instance, allows the user to further define the view direction and the focal length of a lens position at the center of the circle. Gestures provide alternatives for setting camera controls.

FIG. 12A frame 2 further illustrates using an array 1218 of selectors to select among the four checkpoints or perspectives created in this example.

FIG. 12A frame 3 further illustrates adding a fifth checkpoint to the first four. When the fifth checkpoint is added, represented by a point and vector, an additional selector box can be provided as part of the array of selector boxes.

FIG. 12B illustrates the manipulations of the camera in 4 frames. The first frame shows the creation of a circle with a center point and a direction. The second frame shows the creation of additional cameras for the example. And the third frame demonstrates the selector boxes created as part of an array 1218 of selector boxes for this example.

Frame 4 in FIG. 12B illustrates the selection of a camera 1244 via a selection box in array 1218 for manipulation. In this example, once the camera is selected it can be moved to a new point in space, its focal length can be modified, its vector can be changed, and any other attributes that have been assigned to it can be changed by the gestures identified in the technology disclosed.

FIG. 12C illustrates examples of other manipulations possible using the technology disclosed. Frame 5 is an example of selecting and modifying a different camera 1262 than the camera selected in FIG. 12B. Frame 6 illustrates the creation of a new camera 1272 while camera 2 1262 remains as the selected camera.

Frame 7 of FIG. 12C illustrates the removal of a camera 1272. A circle is drawn around the virtual camera 1282 in the opposite direction of the circle used to create the camera 1272. In this example, its selector box 1218a is deleted from the array 1218 of selectors.

Pluck and Release Camera Controls

Figure 13:
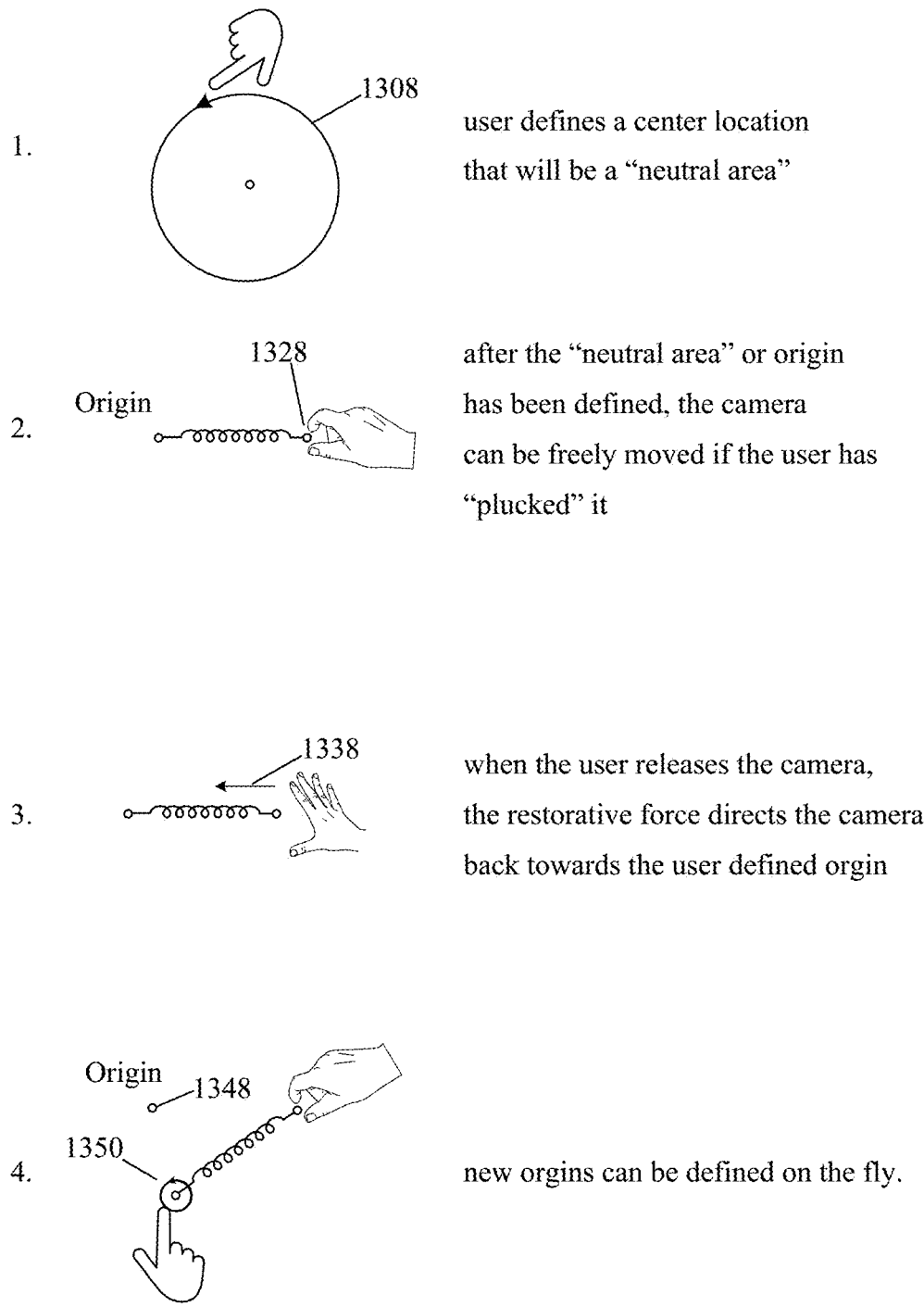
FIG. 13 illustrates pluck and release camera controls in a three dimensional (3D) sensor space.

FIG. 13 illustrates in 4 Frames a camera set in motion by pluck and release camera controls in a three dimensional (3D) sensor space. In Frame 1 a user defines a central location with reference to a salient property of a stroke. In one implementation, this property can be a location in virtual space of the center of a circle of best fit to the stroke 1308. In another implementation, this point can be the new center point of a camera. In yet other implementations, the user can grab and manipulate the camera as if it were a bob of uniform mass attached to a spring 1328, as shows in Frame 2. As illustrated in Frame 3, releasing the camera returns it to the center point 1338. Frame 4 illustrates an example of the selection of the origin 1348, and its movement to a new location 1350.

Sphere Grabbing Camera Manipulation

Figure 14:
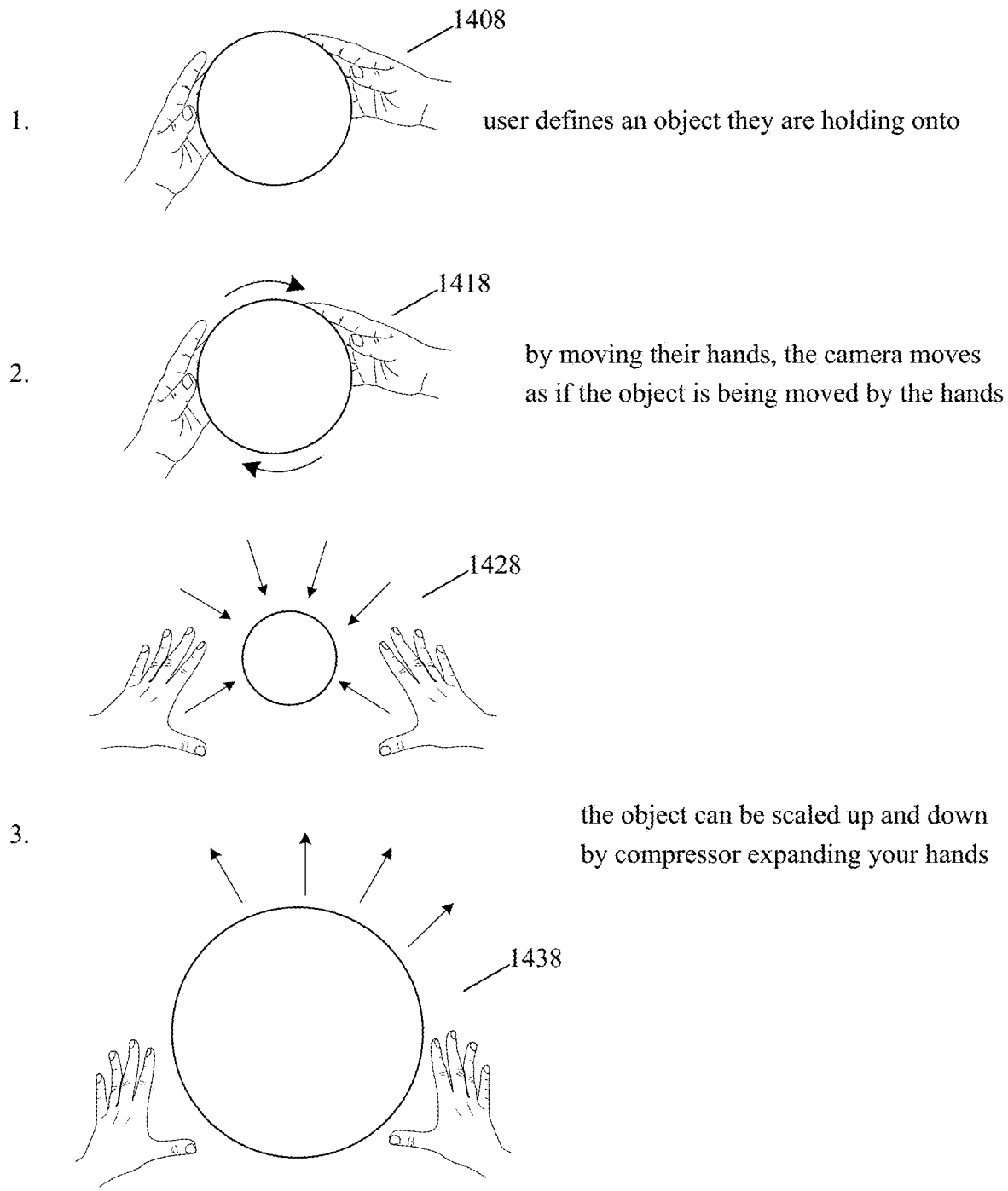
FIG. 14 illustrates a sphere grabbing camera manipulation in a three dimensional (3D) sensor space.

FIG. 14, in 4 Frames, illustrates a sphere grabbing camera manipulation in a three dimensional (3D) sensor space. A user describes a sphere in virtual space 1408. In one implementation, this sphere is the sphere of best fit, which is fit to a plurality of points on one hand. In other implementations this sphere is fit to a plurality of points on two hands. In yet further implementations, the sphere is defined in relation to the hand at the initialization of some "sensory" control, for example saying to the computer "define sphere" via voice controls, or looking at a predefined space in a predefined way (e.g. eye-tracking controls); disengagement gestures may be defined likewise.

Once the virtual sphere is described, a camera view is defined in relation to the sphere. In an implementation, the camera is defined at the center of the sphere, with view vector extending from the center of the sphere to the point on the surface of the sphere that is equidistant to a plurality of points on the user's hand(s). The sphere can be rotated, translated, and scaled to corresponds to movements of at least one camera control 1408, 1418, 1428, 1438. In other implementations, sphere includes any three-dimensional solid that can be fit to a plurality of points input from an MSCS FIGS. 7A, 7B, 7C, 8A, 8D, and 8E.

Path Creation Camera Control

Figure 15A:
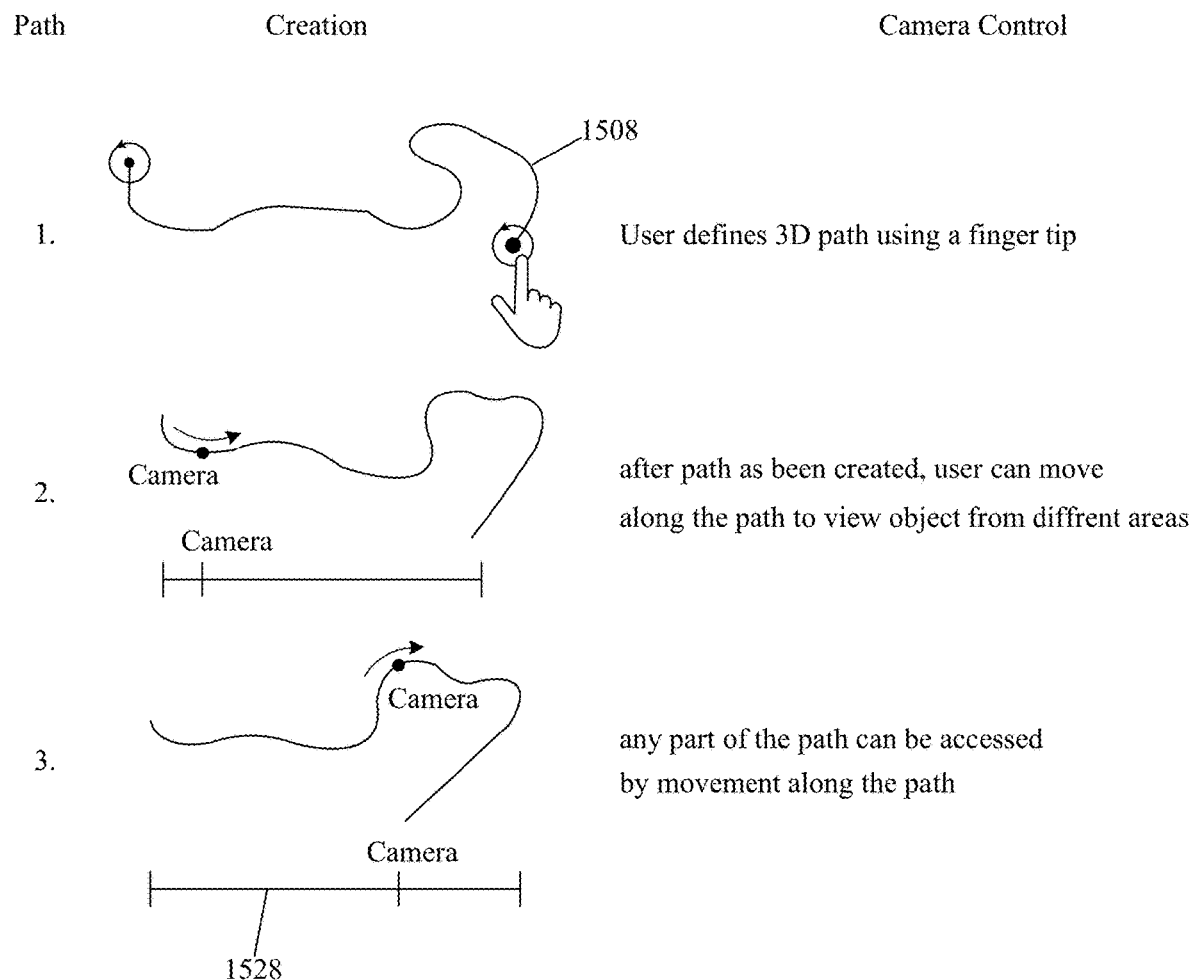

FIGS. 15A-15C illustrate path creation camera controls in a three dimensional (3D) sensor space. In frame 1 of FIG. 15A, a user defines a continuous contour 1508 through time as described above with respect to the MSCS. In one implementation the contour is defined by the movement of a user's finger through three-dimensional space during a delimited time window; in another implementation the contour is defined by the movement of the center of the user's palm. In frame 2, the camera traverses the defined contour

1508 at a fixed or varying speed from end to end; in frame 3, a user may perform a second gesture, for example a swipe from the left of the screen to the right, to position the camera at any point on the predefined contour 1528.

In FIG. 15B, movement of a camera along a specified path is shown with reference to an implementation alternative. As depicted in Frame 1 of FIG. 15B, the user creates a starting point of a path with a creation gesture, e.g., a circle, voice command or other gesture. In frame 2, the user indicates a path they wish to define by moving their hand (or portion thereof) through 3D space. In frame 3, the user ends the path with the same (or different) creation gesture. In frame 4, the camera can move along the path or 2D object in 3D space.

In FIG. 15C, movement of a camera along a specified path is shown with reference to a yet further implementation alternatives. As depicted in Frame 5 of FIG. 15C, the path is mapped to a straight line that the user can move easily along, thereby freeing the user from having to trace out the intricacies of the path in space. As depicted in Frame 6 of FIG. 15C, the camera remains attached to the path, but a force is applied in the direction of the tip of the user's index finger. As depicted in Frame 7 of FIG. 15C, the camera is not rigidly attached to the path, but is subject to a restorative force acting on it ($F_p$). The user is enabled to create a force proportional to the distance to the hand ($F_n$). As depicted in Frame 8 of FIG. 15C, the path is defined by a series of user created circles (or other shapes) that construct a Bezier curve based on a circle size and vector direction.

User Defined Vortex

Figure 16:
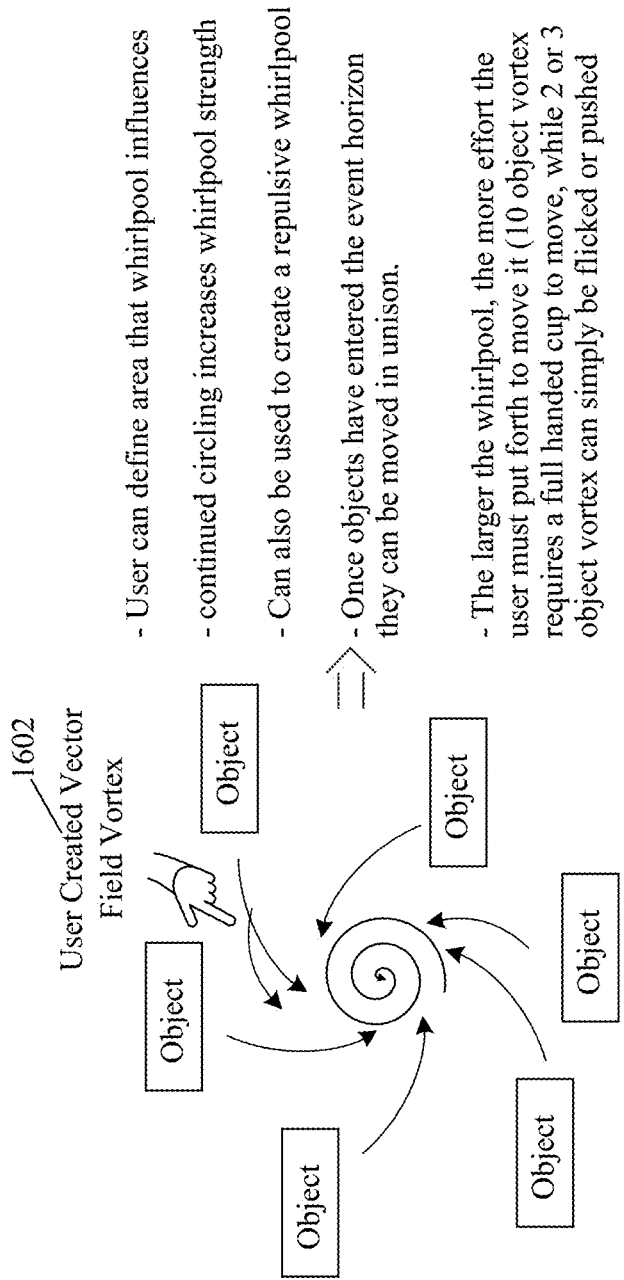
FIG. 16 illustrates an implementation where vectors on a control portion of a user's hand interact with vectors in the virtual field.

FIG. 16 illustrates an implementation where vectors on a control portion of a user's hand interact with vectors in the virtual field. The user is enabled to define the area, direction, strength and velocity of a whirlpool. This interaction creates a field disturbance. In one implementation, this field disturbance is a vortex 1602. The interaction of the field disturbance with a vector defined on a virtual object creates field disturbance control information. FIG. 16 shows a hand creating a field disturbance by making swirling motions in a virtual space. Directionality of the swirling motion can control the direction of the whirlpool, and whether objects caught up in the whirlpool converge to the center or spin off away from the center. The field disturbance interacts with vectors defined on objects in the virtual field, and moves them once the objects have entered the event horizon of the whirlpool. In another implementation, field disturbances themselves can be manipulated as virtual objects within the space. In one implementation, the larger the whirlpool, the more effort the use must put forth to move it (10 object vortex might require a full handed cup to move, while 2 or 3 object vortex can simply be a flick of a finger or push of a few fingers.

Figure 17:
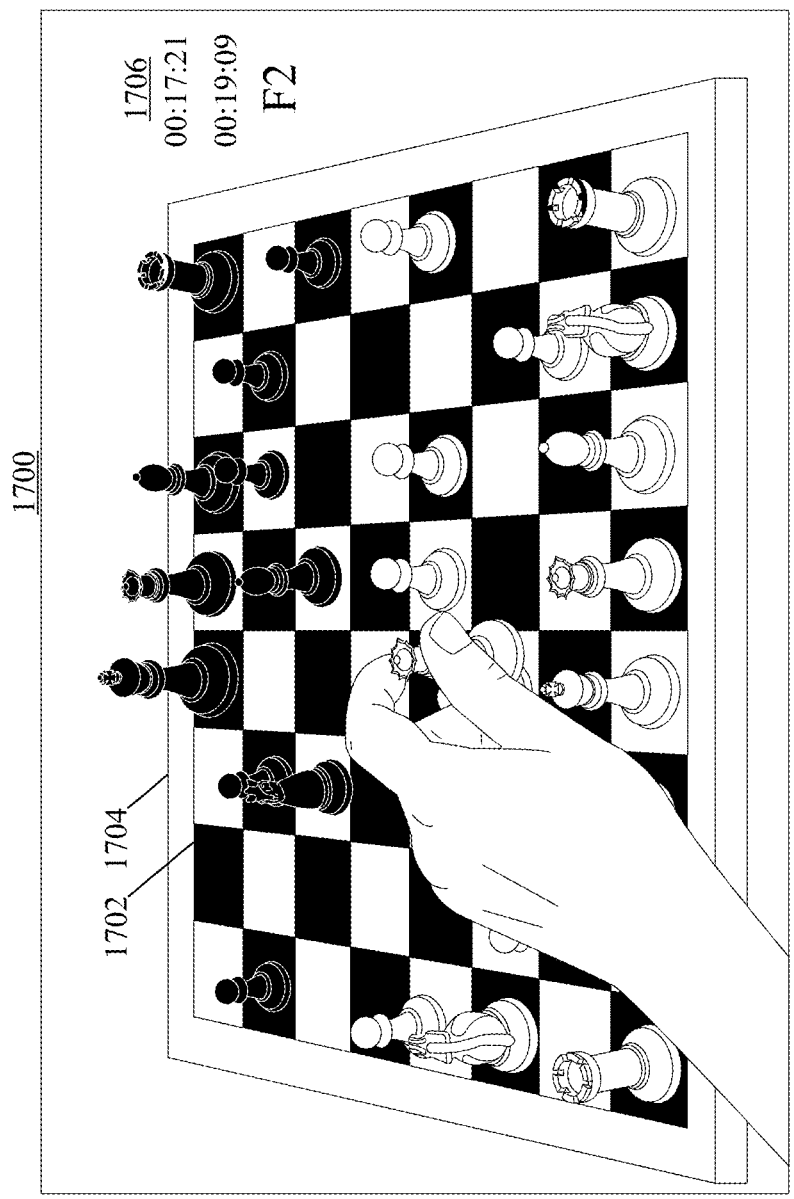
FIG. 17 illustrates an augmented reality application where a virtual space is overlaid on a physical space to create a synthetic space.

FIG. 17 illustrates an augmented reality application where a virtual space 1702 is overlaid on a physical space 1704 to create a synthetic space 1700. For example, virtual space 1702 includes chess game and timers 1706 (and/or other game information not shown in FIG. 17 for clarity sake) and is overlaid on physical space 1704, e.g., the table, to provide an augmented reality environment 1700. In one implementation, vectors can be defined on portions of the virtual space, the physical space, the synthetic space, or any combination thereof.

An augmented interaction refers to an interaction between vectors defined on at least a physical object portion of a user (e.g., the hand) and vectors defined on the synthetic space. In one implementation, an augmented interaction can modify positional, material, or other properties of object portions in synthetic space. In other implementations, vectors can be defined to extend outward on the user's thumb and index finger. Likewise radial vectors can be defined to extend out of the virtual chess pieces. When the vectors of the user's finger tips interact with the vectors of the chess pieces, an augmented interaction takes place, as shows in FIG. 17. For example, one or more vectors can indicate potential directions of motion of the selected chess piece to the user. The hand's motion can be described using vectors as well. The interaction of the two sets of vectors can determine whether the user is making a "legal" move and use this derived information to change the presentation from green (ok) to red (illegal).

Figure 18:
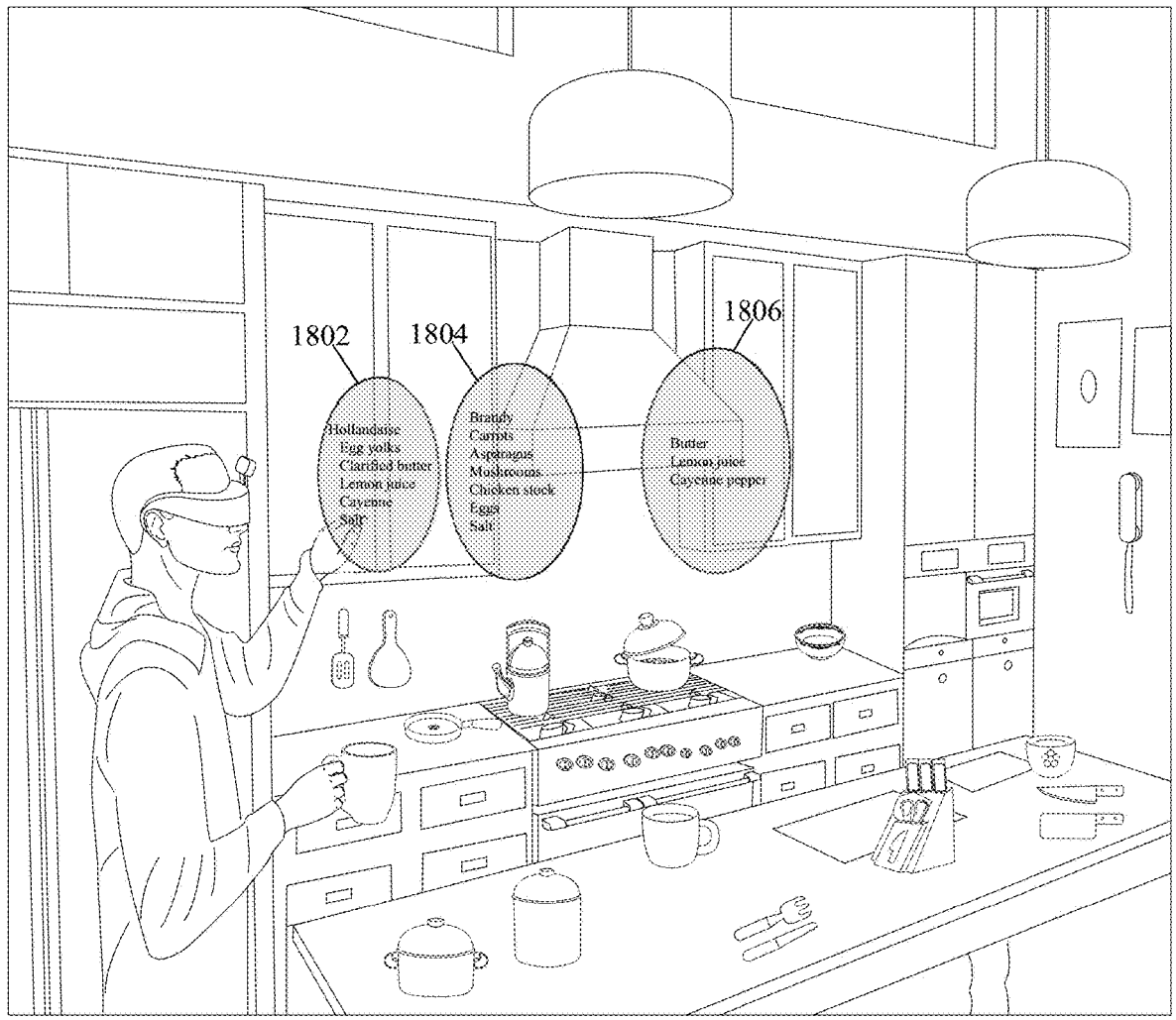
FIG. 18 illustrates an augmented interaction that is used to navigate a menu system.

FIG. 18 illustrates an implementation where an augmented interaction can be used to navigate a menu system. In FIG. 18, a virtual interaction space is defined by a user in the physical space and linked to other images created by a computer vision. The example shows in FIG. 18 shows a user creating radial-shape "interaction bubbles" with menu elements inside them 1802, 1804, 1806, which are response to user's gestures. For example, the user can select a recipe for a desired dish for dinner from menu 1802. A display window 1804 pulls up contents of the refrigerator and pantry, enabling the user to cross reference ingredients needed with foodstuffs on hand. A menu 1806 can be formed by the user based upon a difference between items in menu 1802 and 1804, generating a shopping list that can be downloaded to the user's personal device, uploaded to the cloud for access later, transmitted to the user's spouse for procuring on the way home from the office or various combinations thereof.

Reference in the specification to "one implementation" or "an implementation" means that a particular feature, structure, or characteristic described in connection with the implementation is included in at least one implementation of the technology disclosed. The appearances of the phrase "in one implementation" in various places in the specification are not necessarily all referring to the same implementation.

While the technology disclosed has been described by way of example and in terms of the specific implementations, it is to be understood that the technology disclosed is not limited to the disclosed implementations. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer implemented method of manipulating a virtual camera in a three-dimensional (3D) sensor space, the method including:
   receiving a definition defining parameters of a virtual camera;
   detecting a first control gesture of a control object that defines a starting point ($x_0$, $y_0$, $z_0$) in a three-dimensional (3D) sensor space for the virtual camera;
   detecting a second control gesture made by the control object that defines a continuous contour through time in the three-dimensional (3D) sensor space;
   detecting a third control gesture made by the control object that defines a finishing point ($x_1$, $y_1$, $z_1$) of the virtual camera in the three-dimensional (3D) sensor space;
   determining a continuous contour between the starting point and the finishing point; and
   moving the virtual camera along the continuous contour between the starting point and the finishing point.

2. The method of claim 1, further including determining a focal length of the virtual camera responsive to distance of a finger of a hand comprising the control object from the continuous contour.

3. The method of claim 2, further including defining a field of view and orientation of the virtual camera responsive to a detected orientation of the finger.

4. The method of claim 1, further including mapping the continuous contour to a straight line and moving the virtual camera along the straight line.

5. The method of claim 1, further including defining a plurality of points on the continuous contour to construct a Bezier curve responsive to respective sizes and directions of the points.

6. The method of claim 1, wherein the continuous contour is a complex curve including changes in each one of three dimensions.

7. The method of claim 1, wherein the parameters include: a focal length.

8. The method of claim 1, wherein the parameters include: an orientation.

9. The method of claim 1, wherein the parameters include: a field of view.

10. The method of claim 1, wherein the first control gesture and the second control gesture are separate instances of a same gesture.

11. The method of claim 1, wherein defining a starting point includes the first control gesture encompassing the starting point $(x_0, y_0, z_0)$.

12. The method of claim 11, wherein the first control gesture encompassing the starting point $(x_0, y_0, z_0)$ includes the starting point located within a region of space bounded by the first control gesture.

13. The method of claim 12, wherein the first control gesture is circular and encompassing the starting point $(x_0, y_0, z_0)$ includes the starting point located within the circular region of space bounded by the first control gesture.

14. The method of claim 11, wherein the first control gesture encompassing the starting point $(x_0, y_0, z_0)$ includes the starting point located tangent to a point on a path described by the first control gesture.

15. The method of claim 14, wherein the first control gesture is circular and encompassing the starting point $(x_0, y_0, z_0)$ includes the starting point located tangent to a point on the circular path described by the first control gesture.

16. The method of claim 1, wherein defining a finishing point includes the third control gesture encompassing the starting point $(x_1, y_1, z_1)$.

17. The method of claim 1, wherein moving the virtual camera along the continuous contour between the starting point and the finishing point includes the camera moving freely along a two-dimensional object in a three-dimensional space.

18. The method of claim 1, wherein no other gestures are required to define the staring point, finishing point and the continuous contour between the starting point and the finishing point.

19. A non-transitory computer readable medium storing instructions for manipulating a virtual camera in a three-dimensional (3D) sensor space, which instructions when executed by one or more processors perform actions including:
  receiving a definition defining parameters of a virtual camera;
  detecting a first control gesture of a control object that defines a starting point in a three-dimensional (3D) sensor space for the virtual camera;
  detecting a second control gesture made by the control object that defines a continuous contour through time in the three-dimensional (3D) sensor space;
  detecting a third control gesture made by the control object that defines a finishing point $(x_1, y_1, z_1)$ of the virtual camera in the three-dimensional (3D) sensor space;
  determining a continuous contour between the starting point and the finishing point; and
  moving the virtual camera along the continuous contour between the starting point and the finishing point.

20. A system, including:
  a stereoscopic image sensor for sensing movement of a control object including at least one human hand moving in a three-dimensional (3D) sensor space;
  one or more processors; and
  a memory storing instructions configured for:
    receiving a definition defining parameters of a virtual camera in a three-dimensional (3D) sensor space;
    detecting a first control gesture of a control object that defines a starting point $(x_0, y_0, z_0)$ for the virtual camera;
    detecting a second control gesture made by the control object that defines a continuous contour through time in the three-dimensional (3D) sensor space;
    detecting a third control gesture made by the control object that defines a finishing point $(x_1, y_1, z_1)$ of the virtual camera in the three-dimensional (3D) sensor space;
    determining a continuous contour between the starting point and the finishing point; and
    moving the virtual camera along the continuous contour between the starting point and the finishing point.

* * * * *